United States Patent [19]

Haid

[11] 4,388,686

[45] Jun. 14, 1983

[54] COMMUNICATION SYSTEM FOR DISTRIBUTED CONTROL ARRANGEMENT

[75] Inventor: William R. Haid, Hamilton, Mass.

[73] Assignee: General Electric Company, Lynn, Mass.

[21] Appl. No.: 198,901

[22] Filed: Oct. 20, 1980

[51] Int. Cl.³ .......................................... G06F 15/16
[52] U.S. Cl. ................................................. 364/200
[58] Field of Search ... 364/200 MS File, 900 MS File

[56] References Cited

U.S. PATENT DOCUMENTS 4,020,472  4/1977  Bennett et al. ................... 364/200
4,204,251  5/1980  Brudevold ....................... 364/200

Primary Examiner—Raulfe B. Zache
Attorney, Agent, or Firm—James W. Mitchell

[57] ABSTRACT

A communication system is disclosed for a distributed control arrangement comprising a plurality of communication nodes, each corresponding to a separate physically remote operating unit of a common installation. Each node includes a set of port buffers respectively associated with separate subsystems of the corresponding operating unit, a common node bus and a controller. Each port buffer is adapted to establish a 2-stage transfer link between its corresponding subsystem and the controller, in which the port buffer provides intermediate data storage. One port buffer of each node is coupled to a secondary station associated with that node which is slaved to a primary station. The primary station issues commands through a common data link to the secondary stations and communicates with selected subsystems associated with each node through the secondary station corresponding to that node.

26 Claims, 19 Drawing Figures

FIG. I

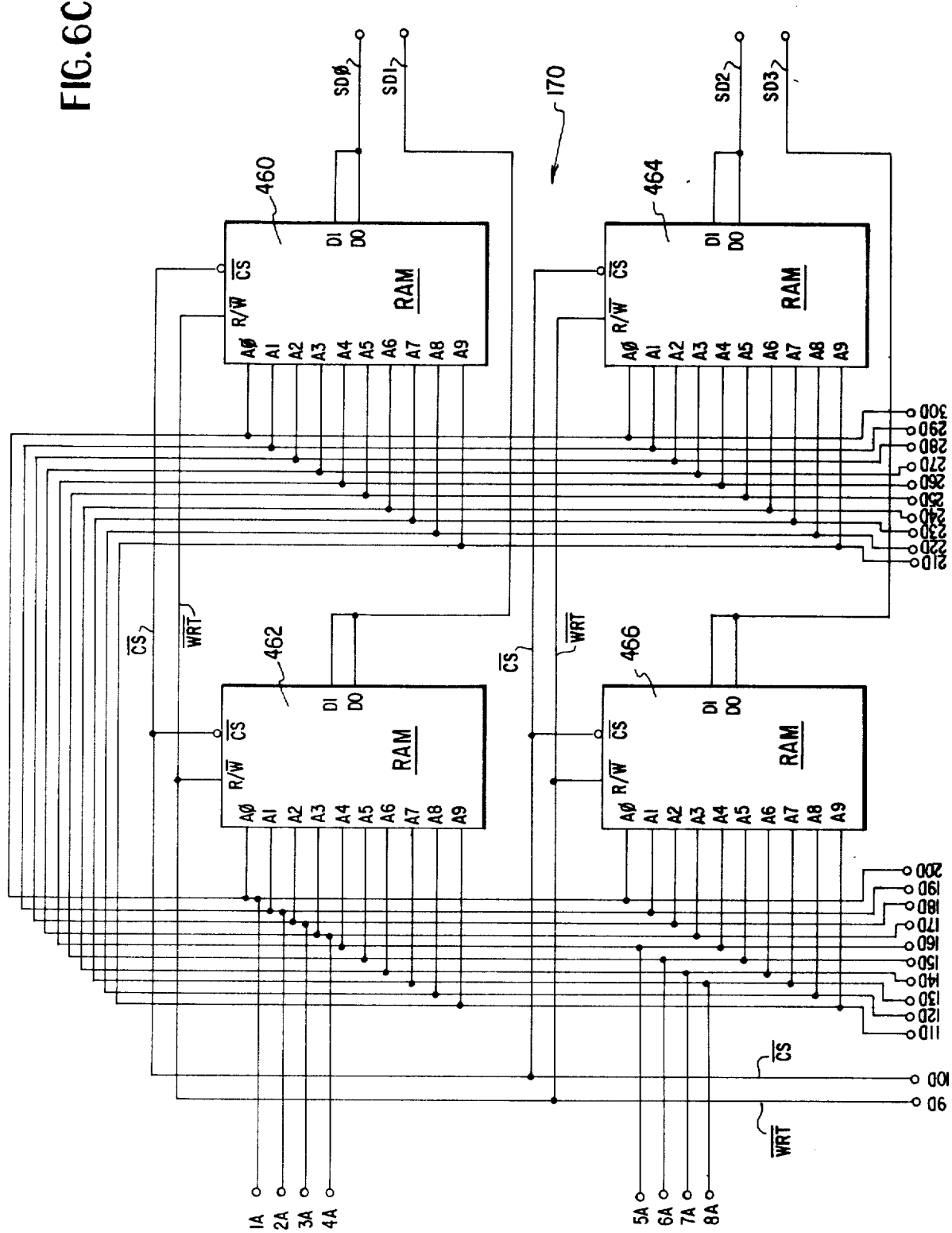

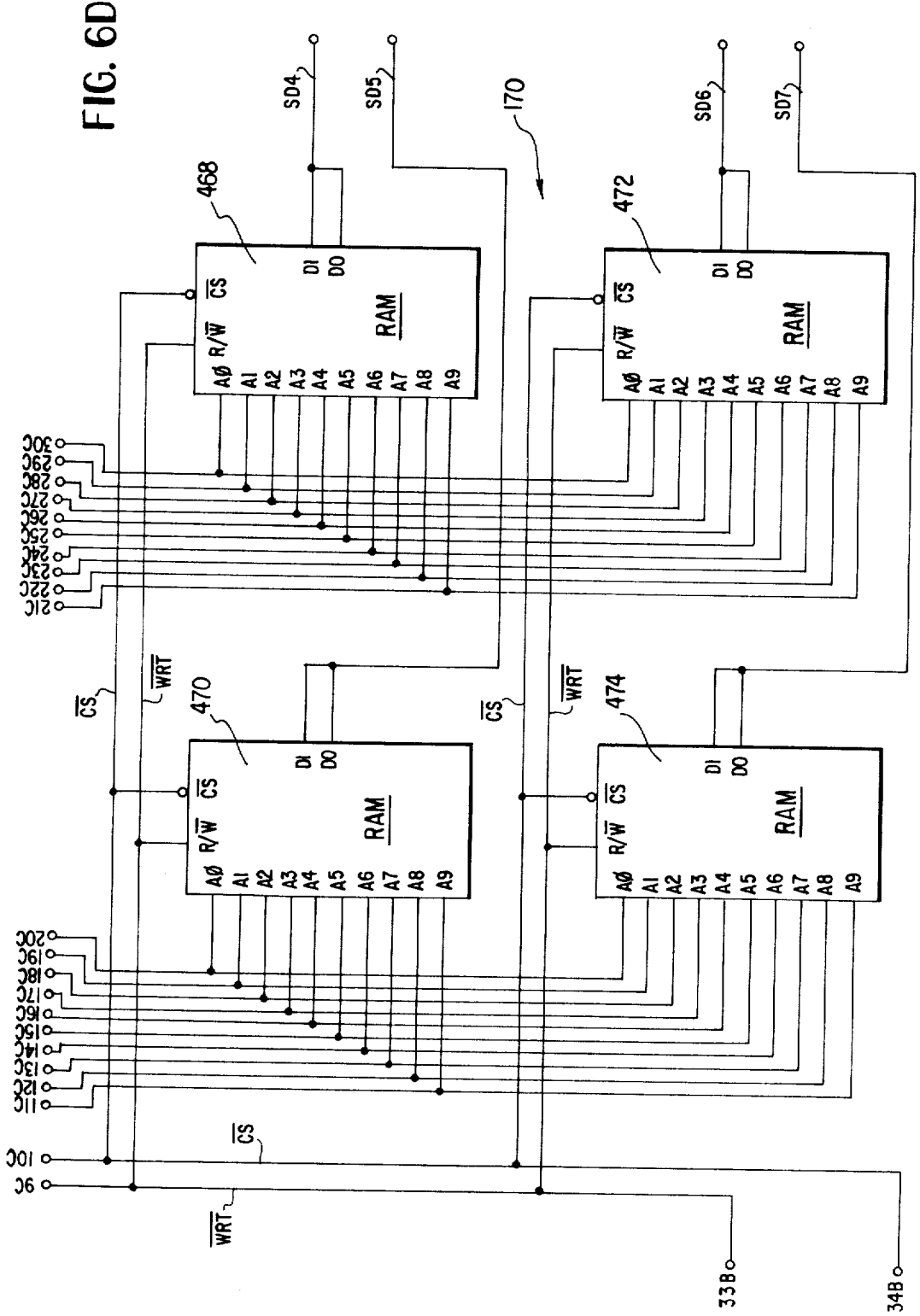

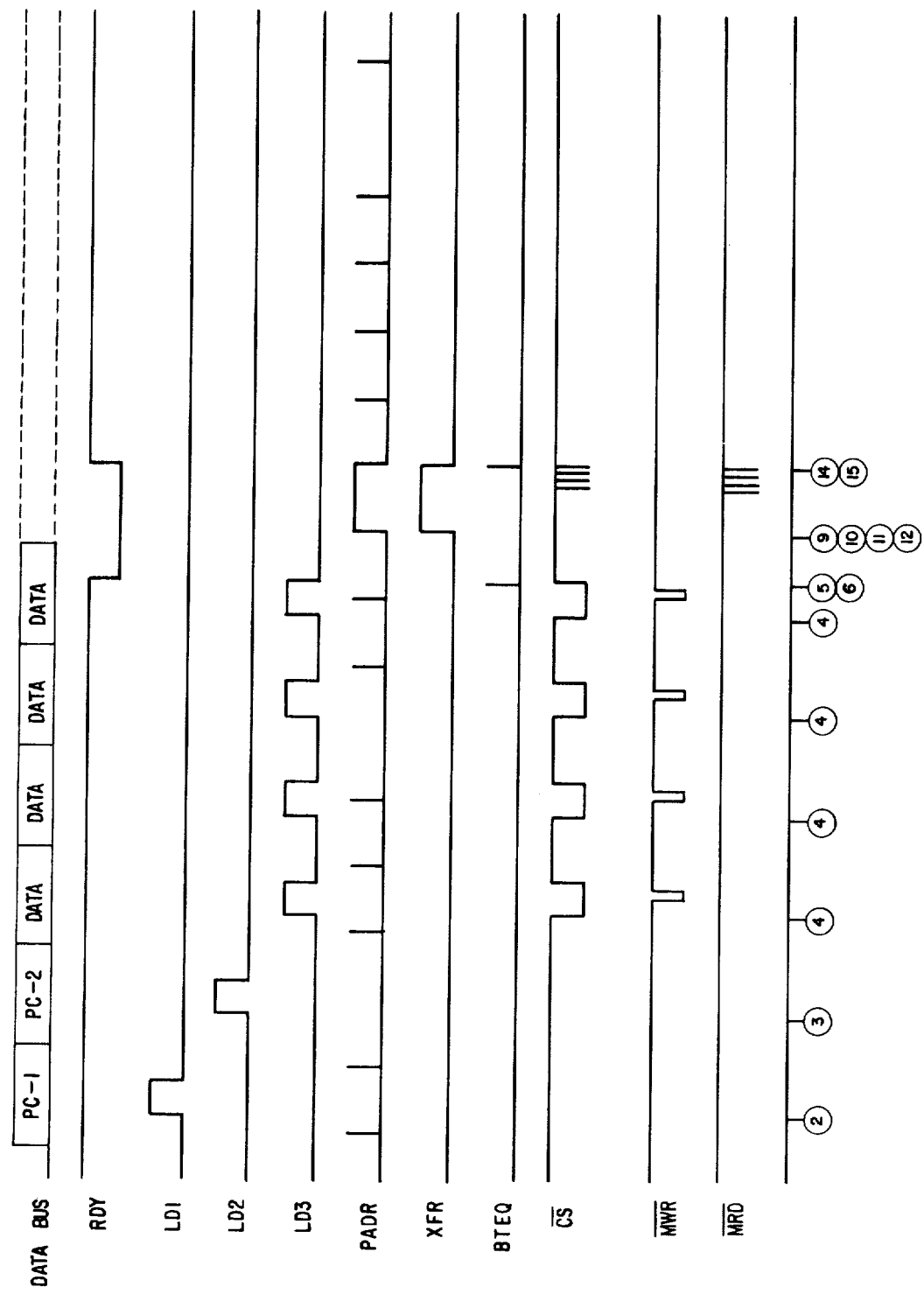
FIG. 11 WRITE OPERATION

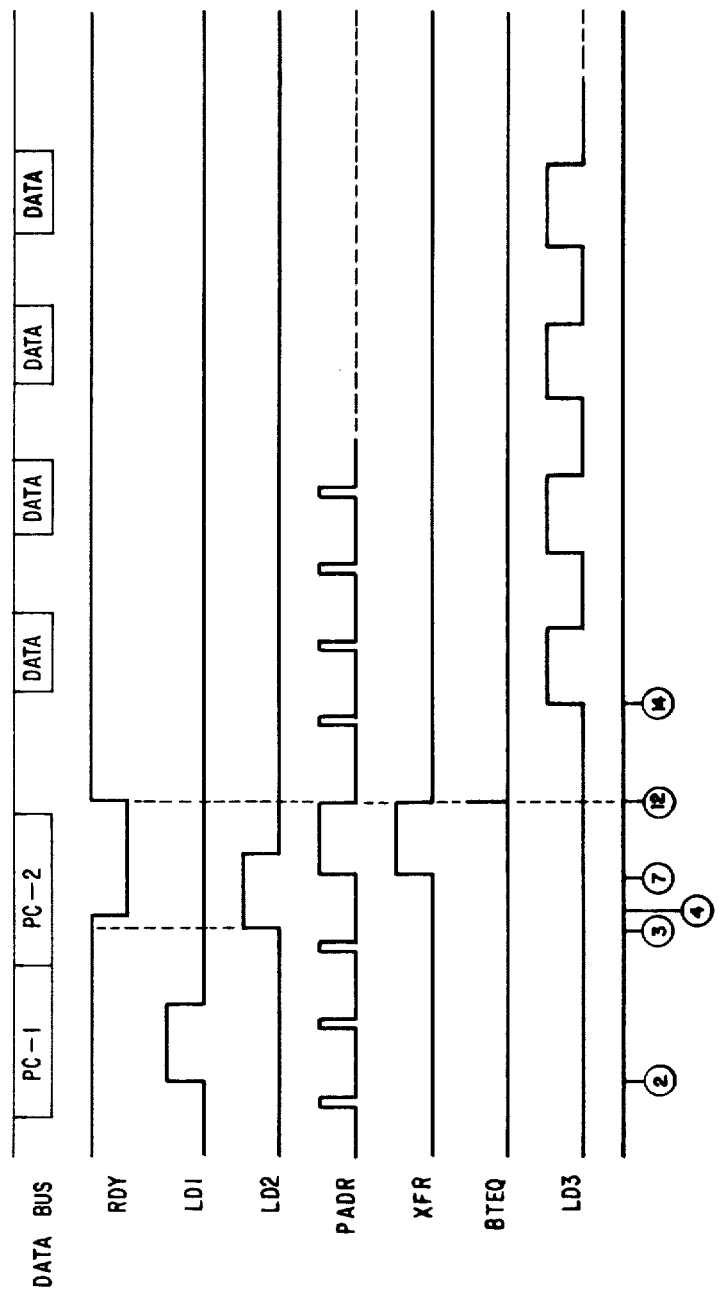

COMMUNICATION SYSTEM FOR DISTRIBUTED CONTROL ARRANGEMENT

The present invention relates in general to a communication system for a distributed control arrangement and to individual communication nodes of such a communication system, wherein each node enables a plurality of external circuits associated therewith to communicate through the node.

BACKGROUND OF THE INVENTION

The control of a large operating installation, such as an electric power generating plant or the like in which the respective operating units may be physically remote from each other, presents a number of problems that do not arise in more compact installations. For example, each operating unit may be controlled by a number of subsystems, each of which may constitute a separate data processor for performing a specific control function. The respective subsystems associated with an operating unit may be located in a common cabinet, or they may be physically remote from each other.

In the operation of such a distributed control arrangement, data must be collected from the respective subsystems of each operating unit, often asynchronously; the data must be recognized and perhaps processed; and responsive data or control signals must be transmitted to the same subsystem, or to other subsystems of either the same operating unit or of other operating units of the installation, in order to achieve the desired performance. Thus a communication system is required which is capable of handling the interchange and transfer of the various data and control signals.

In general, when two or more subsystems are in communication with each other in a communication system of the type that is found in use with prior art control arrangements, each data processor specifically addresses, (or is addressed by), the data processor with which information is to be exchanged. In order to hold the communication line between them open, the transmitting data processor must interrupt the receiving data processor if the latter is at that moment involved in another task. By its very nature, the interrupt command will conflict with the demands of the receiving data processor. For example, if the receiving unit is operating on a specific routine, the interrupt command will normally cause it to branch off on a subroutine and to leave the original routine unserviced until the communication with the transmitting data processor is complete.

Where multiple communications between data processors occur, as is the case in a distributed control arrangement for a large installation in which a relatively large number of subsystems is employed, the number of interrupt commands that must be issued is substantial. This may have important effects on the operation of the distributed control system, which may show up as a reduction in the speed of response. While the reduced speed may not be important in the operation of an electric power generating plant, the effect may be significant in other applications where the control system is critically dependent on a rapid response.

A characteristic feature of a prior art communication system in which interrupt orders must be issued to gain access to a receiving data processing system which may be engaged in another operation, is the requirement for setting up levels of priority, i.e. pre-established conditions under which interrupt orders will be honored. In a system where a large number of data processors are required to communicate with each other, as many as fifty separate priority levels may have to be established for this purpose. These priority levels, together with the required branch routines that must be established to enable the receiving data processor to hold its ongoing operation in abeyance pending the completion of the communication with the transmitting unit, serve to make the communication system considerably more complex to build, to operate and to maintain than is the case where interrupt commands do not have to be taken into account.

Another factor that tends to raise the level of complexity in prior art communication systems of the type under discussion, stems from the necessity of two uncoordinated data processors i.e. two uncoordinated subsystems, having to communicate with each other. This entails not only the requirement to subordinate the operation of the receiving data processor to that of the transmitting unit, (which may be the slower unit), but it also requires each processor to be familiar with certain information concerning the unit with which it is in communication. For example, a block of data stored at a certain address in the transmitting unit, may be written into a different location in the receiving unit, and be stored at yet another address in a third unit. Since there is no common discipline which requires that the same data be identified and stored in the same manner in each data processor, the requirement to cope with these situations increases the complexity of each data processor.

A further problem that may arise in prior art communication systems of the type under discussion, is the problem of obtaining a communication line when one is required. Since, for reasons of cost and complexity, the number of existing lines will generally be less than the number demanded at any given point of the operation, a priority system must be set up to prevent contention among competing subsystems for a line, together with suitable safeguards that will enable a subsystem to retain possession until its communication is complete. Here again, the necessity for the additional priorities and safeguards serve to raise the complexity and the cost of such a communication system.

The complexity of prior art communication systems, as discussed above, is largely responsible for elevating relatively simple system changes to the level of major problems that require undue amounts of time and effort to solve. For example, in a large operating installation it is not unusual to add an operating unit, or to withdraw one from operation. Since each operating unit is controlled by a plurality of subsystems, suitable modifications of the associated communication system are required by such a change. Where the latter system is complex, these modifications may entail changes in the priority levels with respect to interrupt commands. Changes with respect to access to the communication lines of the newly added subsystems may also be required or, if an operating unit is withdrawn, with respect to access to the subsystems that remain. Simply stated, the complexity of prior art communication systems of the type under discussion limits their flexibility to adapt easily to changes of the distributed control arrangement with which such systems are associated.

OBJECTS OF THE INVENTION

It is a primary object of the present invention to provide a new and improved communication system for a distributed control arrangement comprising a plurality of operating units, which is not subject to the foregoing disadvantages.

It is another object of the present invention to provide a communication system for a distributed control arrangement in which the asynchronously operating subsystems are capable of setting up communication links with each other without the necessity of interrupting the ongoing operation of the receiving subsystem.

It is a further object of the present invention to provide a communication system for a distributed control system wherein the necessity for setting up different priority levels for the respective operations is obviated.

It is also an object of the present invention to provide a communication system for a distributed control arrangement wherein the respective components communicate in accordance with a common discipline.

It is yet a further object of the present invention to provide a communication system for a distributed control arrangement wherein contention among competing subsystems for a limited number of communication lines is avoided.

It is an additional object of the present invention to provide a communication system for a distributed control arrangement which is sufficiently flexible to accommodate changes of the associated control arrangement without undue expenditure of time and effort.

It is still another object of the present invention to provide a communication system in which a separate communication node corresponds to each of a plurality of operating units of a common installation and wherein the system may comprise a selectively variable number of said nodes capable of communicating with each other through a common data link.

It is still a further object of the present invention to provide a communication system comprising a plurality of communication nodes in which each node is associated with a set of subsystems each of which is adapted to perform a different control function, wherein the nodes are coupled to a common data link through respective secondary stations, and wherein a primary station coupled to the data link is able to communicate on command with selected subsystems associated with each node.

It is yet another object of the present invention to provide a communication system comprising a plurality of communication nodes each associated with a set of external circuits adapted to perform different functions, wherein each node includes a common node bus, a controller, and a port buffer corresponding to each external circuit and adapted to establish a 2-stage transfer link between the external circuit and the controller.

It is yet a further object of the present invention to provide a communication node comprising a common node bus, a controller and a plurality of port buffers each corresponding to a separate circuit external to the node, wherein each port buffer is adapted to establish a 2-stage transfer in which information is transferred between the controller and a port buffer in synchronism with the controller clock, and wherein the timing of information transfers between the port buffer and its corresponding external circuit is determined by the latter.

SUMMARY OF THE INVENTION

In accordance with the foregoing objects, the present invention is directed to a communication system for a distributed control arrangement and to the structure and operation of communication nodes employed in such a communication system. Each node includes a common node bus, also referred to as a subsystem communication bus. Each circuit external to the node, i.e. each external subsystem or other external source associated with that node, is coupled to the node bus through a port buffer adapted to provide a 2-stage transfer link for data bytes. The operation of each external circuit and of its dedicated port buffer are relatively loosely tied to each other and permit the external circuit to operate in an asynchronous manner. The port buffer serves as translator between the protocol of the external circuit and that of the node. Traffic within the node, i.e., the transfer of data and/or control bytes from and to each node-connected external circuit, is regulated by a controller which is directly coupled to the common node bus and which prevents contention between competing port buffers for access to the node bus. The operation of the node controller and of the port buffers and tightly meshed, the latter operating in synchronism with the controller.

In the overall (global) communication system of the distributed control arrangement, where the latter includes a plurality of physically remote operating units, each node is associated with the set of subsystems of a separate operating unit. A separate pre-programmed secondary station is associated with each node but external thereto and it is coupled to the common node bus through a port buffer in substantially identical manner as the other external circuits of such node. All secondary stations interface with a common data link external to the node.

A programmable primary station also interfaces with the data link. By regulating all data and control signal traffic between the data link and each secondary station, the primary station exercises control over each secondary station and its associated node and prevents contention between secondary stations for access to the data link. The primary station thus commands access to selected ones of the external circuits associated with each node. The regulation of traffic within the node is, however, relegated to the local node controller.

With the communication system described above, ongoing operations of individual receiving subsystems are no longer subject to interruption at the request of the transmitting subsystems and hence the necessity for setting priority levels in this context is also eliminated. Similarly, contention between competing subsystems for access to the communication lines is avoided. As a consequence, the communication system which forms the subject matter of the present invention is superior in its implementation and operation to heretofore available systems of this type. Further, the system is less costly to implement, operate, and maintain and it is sufficiently flexible to accommdate changes of the associated control arrangement without undue expenditure of time and effort.

BRIEF DESCRIPTION OF THE DRAWINGS

FIGS 6A-6D jointly illustrate in greater detail the controller portion of the node of FIG. 4;

FIG. 11 illustrates certain waveforms pertinent to the READ operation of the apparatus shown in FIGS. 5 and 6; and FIG. 12 illustrates waveforms pertinent of the WRITE operation of the apparatus of FIGS. 5 and 6.

Figure 1:
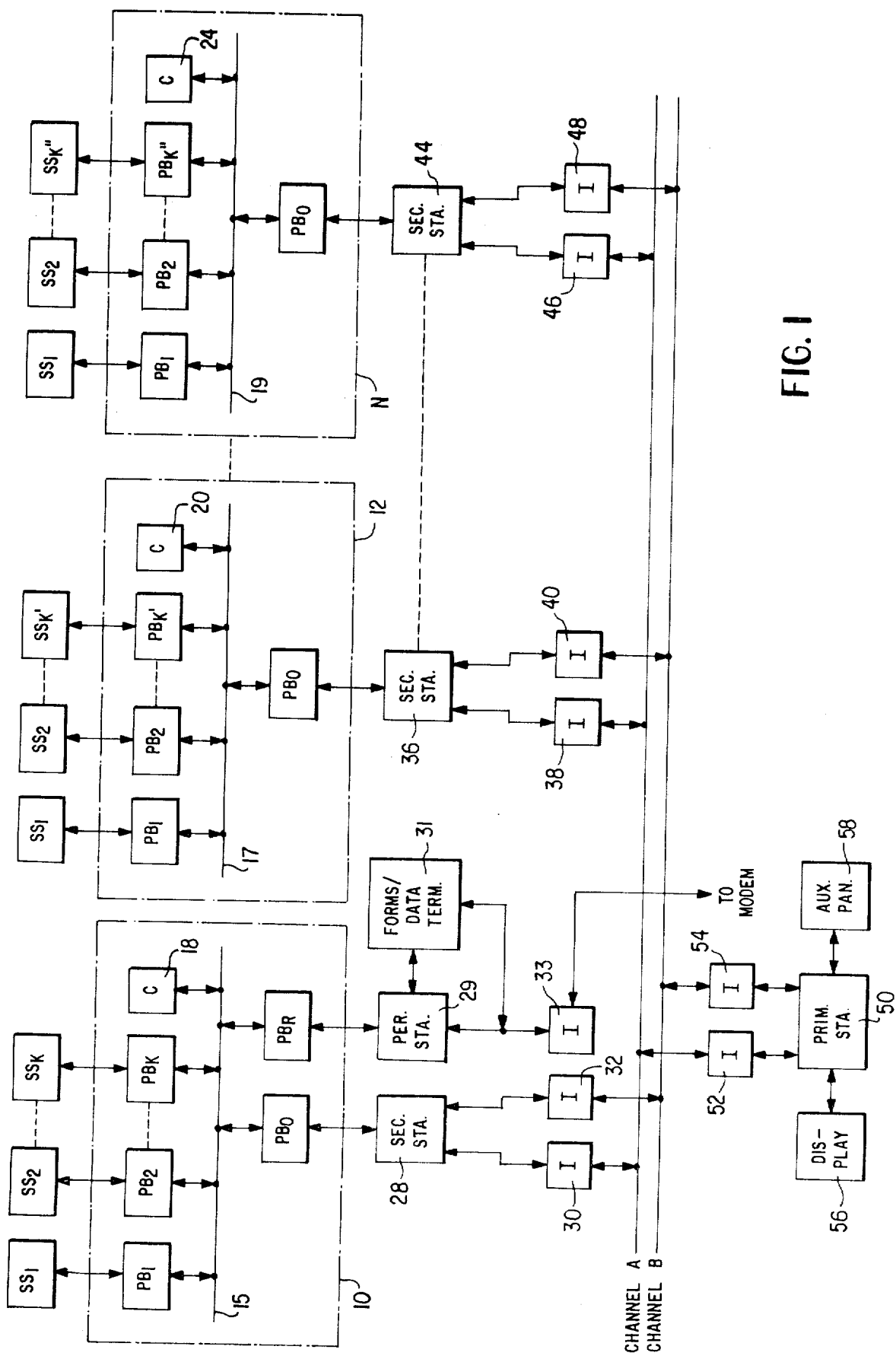
FIG. 1 is a block diagram of a global communication system which illustrates the environment in which the nodes operate.

With reference now to the drawings, the global communication system shown in FIG. 1 includes a plurality of nodes 10, 12 ... N, which, because they may correspond to physically remote operating units, may themselves be physically remote from each other. Each node is coupled to a common communication conduit or data link. Although a single communication channel is adequate for the purpose, a pair of redundant channels A and B may be used to enhance the overall reliability of the data link. In an exemplary embodiment of the invention, between four and eight nodes may be tied to the data link, using synchronous data link control (SDLC) protocol. However, the invention is not so limited and it will be understood that the number of nodes that may be tied to the data link using SDLC or another link control, may vary up to several hundred nodes.

Node 10 includes a common node bus 15. A controller 18 and a plurality of port buffers $PB_0$, $PB_1$, $PB_2$ ... $PB_K$ are coupled to node bus 15, each through a bidirectional connection. Each of port buffers $PB_1$ ... $PB_K$ communicates through a bidirectional coupling with a corresponding subsystem or other signal source external to the node, designated $SS_1$, $SS_2$ ... $SS_K$.

The communication system illustrated in FIG. 1 may operate in conjunction with different kinds of equipment, for example with a heat recovery steam generator set which is part of a combined cycle electric power generating plant. In such an installation the respective subsystems $SS_1$, $SS_2$ and $SS_K$ may comprise a feedwater flow control subsystem, a pressure control subsystem and a monitoring subsystem for the steam generator. Corresponding subsystems may be provided for a steam turbine and for other operating units of the power generating plant. Each subsystem typically includes a pre-programmed local data processing capability, whereby it performs a specific control function with respect to the corresponding operating unit by modifying signals collected from, or applied to, the operating unit. Thus, the number of subsystems associated with each node may vary and as many as sixteen subsystems may be coupled to the common node bus in a preferred embodiment of the invention.

In addition to the external subsystems mentioned above, the external circuits associated with each node may include one or more peripheral stations. In FIG. 1 a peripheral station 29 is shown associated with node 10.

Station 29 is coupled to node bus 15 by way of a port buffer $PB_R$. Although the invention is not so limited, in a typical example peripheral station 29 may be bidirectionally coupled through an asynchronous serial link to a data terminal 31, perhaps located at a physically remote site with respect to node 10.

Terminal 31 is coupled to the connection between peripheral station 29 and a driver/receiver isolation module 33. The latter may be further connected to a source of data signals, e.g. through a modem or the like, to translate between the signals of a commercial telephone line and of the peripheral station. In the example under consideration, terminal 31 may comprise a forms memory terminal adapted to provide information on a page form displayed by a CRT, or a page form printed by a printer in which certain blank spaces are filled in in accordance with data received from peripheral station 29, which in turn receives data instructions by way of the modem.

The external circuits associated with node 10 further include a secondary station 28 which is bidirectionally coupled to node bus 15 by means of a port buffer $PB_0$. Further, secondary station 28 is bidirectionally connected to redundant channels A and B of the data link, by means of a pair of line driver/receiver isolation modules 30 and 32.

Node 12, which corresponds to a separate one of the aforementioned plurality of operating units of the distributed control arrangement, is connected in substantially the same manner as node 10. Specifically, the external circuits comprising secondary station 36 and subsystems $SS_1$, $SS_2$ ... $SS_K$, are bidirectionally coupled to port buffers $PB_0$, $PB_1$, $PB_2$ ... $PB_K$, respectively. As previously pointed out, the total number of subsystems used may be different for each node.

The port buffers of node 12 are bidirectionally connected to a common node bus 17, to which a controller 20 is also directly coupled. Secondary station 36, which may have a pre-programmed data processing capability in the preferred embodiment of the invention, is further connected to communications channels A and B of the data link through a pair of isolation modules 38 and 40 respectively, substantially in the manner of station 28.

Node N is substantially identical to nodes 10 and 12, although the numbers of associated subsystems and their corresponding port buffers may differ. As shown, the node includes a common node bus 19 to which a controller 24 is directly connected. A set of port buffers $PB_1$, $PB_2$ ... $PB_K$ is tied to bus 19 and to a corresponding set of subsystems $SS_1$, $SS_2$ ... $SS_K$ respectively, the latter being external to the node. A secondary station 44, which is likewise external to node N, interfaces with channels A and B of the data link through modules 46 and 48 respectively, and is coupled to bus 19 through port buffer $PB_0$ of node N.

A primary station 50, which has programmable data processing capability in the preferred embodiment of the invention, is bidirectionally linked to redundant channels A and B of the data link through a pair of line driver/receiver isolation modules 52 and 54 respectively. In a preferred arrangement, the primary station may be bidrectionally connected to a display unit 56, as well as to an auxiliary panel 58.

The port buffers PB illustrated in FIG. 1 are preferably substantially identical to each other in construction, but differing from each other by the address decoding circuitry of each port buffer. Likewise, the controllers of the respective nodes and the secondary stations associated with the nodes may be standarized for a multinode communication system. Similarly, the isolation modules that connect the separate stations to data link channels A and B may all constitute substantially identical circuits.

Figure 2:
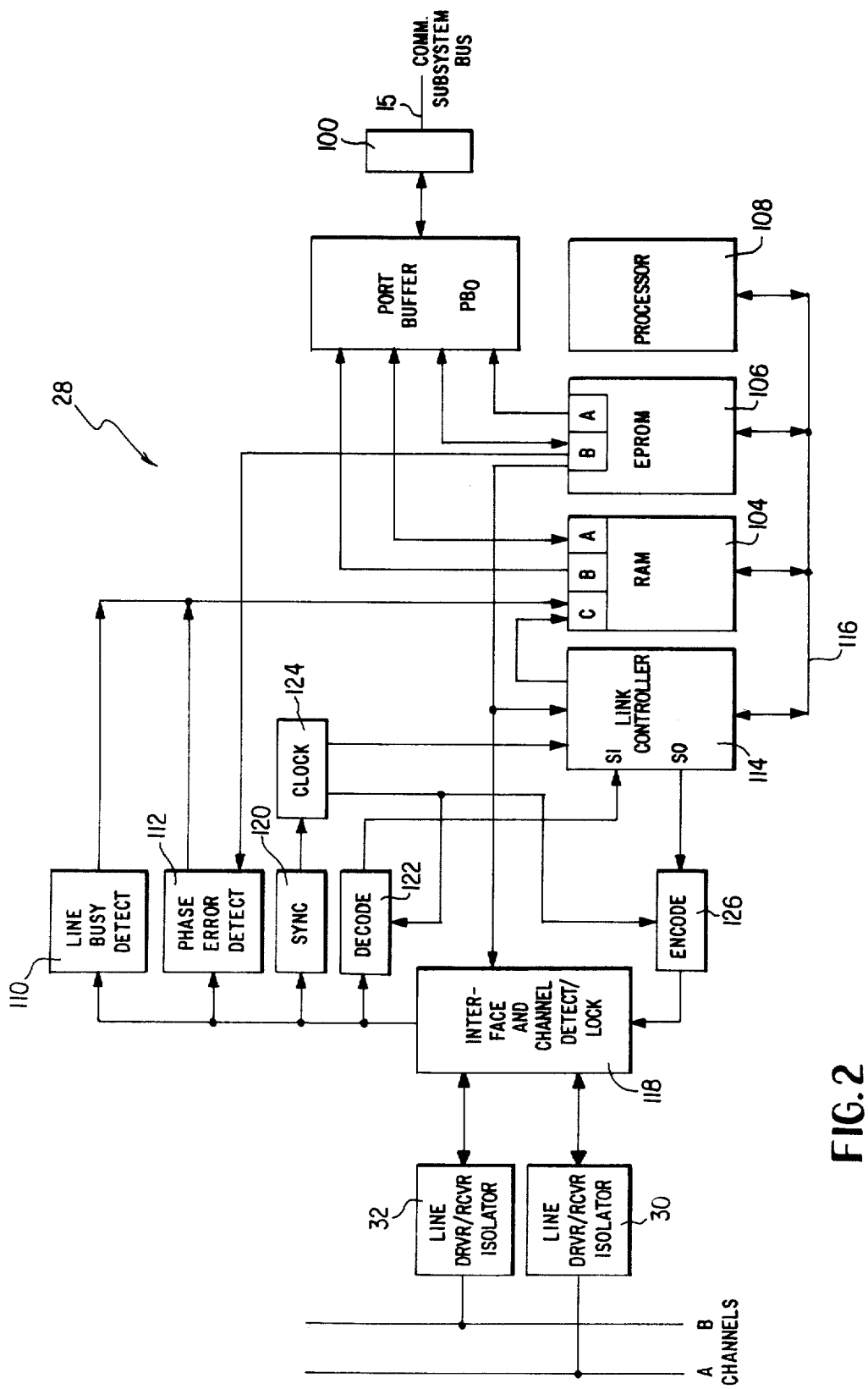
FIG. 2 illustrates in greater detail one of the secondary stations shown in the communication system of FIG. 1.

FIG. 2 illustrates one of the secondary stations, e.g. station 28 shown in FIG. 1, in greater detail. Wherever applicable, corresponding reference numerals from FIG. 1 have been retained. Port buffer PB$_0$ is seen to be bidirectionally coupled to node bus 15 by way of a bus connector 100. A random access memory 104, which is preferably of the type that is commercially available under the designation RAM-IO 8156, has 8-bit input/output ports A, B and C. IO port B is connected to apply control transfer information to port buffer PB$_0$. IO port C is connected to receive station status information from a line busy detect unit 110 and from phase error detect unit 112. IO port C is also coupled to a link controller 114, which is commercially available under the designation number 2652.

A preprogrammed memory 106, which is commercially available under the designation EPROM-IO 8755, has its IO port A connected to provide additional control transfer information to port buffer PB$_0$. The IO port B of memory 106, which is used for general station control, is connected to the port buffer control lines and it is further coupled to provide an output signal to phase error detect unit 112, to link controller 114 and to an interface and channel detect/lock unit 118. A data processor 108, which is commercially available under the designation number 8085, is bidirectionally coupled to a common bus 116 within secondary station 28. Units 104, 106 and 114 are similarly connected bidirectionally to common bus 116.

Interface and channel detect/lock unit 118 has its output connected to respective inputs of the aforesaid units 110 and 112, as well as to a synchronizing unit 120 and a decoding unit 122. The output of the synchronizing unit is coupled to a clock unit 124, which provides another input to link controller 114. A further clock output is coupled to an encoding unit 126, as well as to decoding unit 122. The output of decoding unit 122 is connected to the SI serial data input of link controller 114. The serial data output SO of the link controller provides a further input to an encoding unit 126, whose own output is coupled to unit 118. Unit 118 is bidirectionally coupled to communication channels A and B of the data link through line driver/receiver isolation units 30 and 32 respectively.

Figure 3:
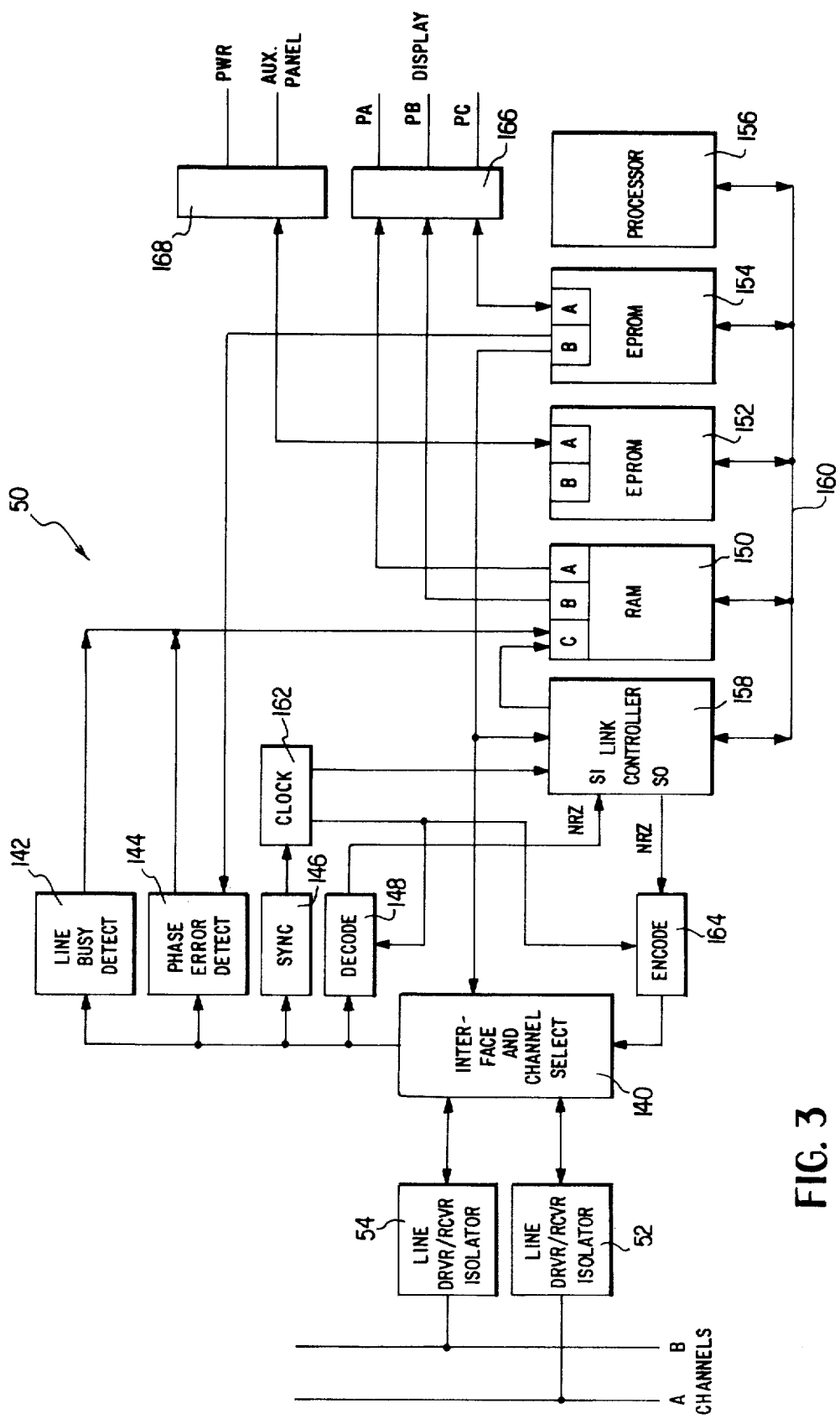
FIG. 3 illustrates in greater detail the primary station shown in FIG. 1.

FIG. 3 illustrates primary station 50 of FIG. 1 in greater detail, applicable reference numerals having been carried forward. An interface and channel select unit 140 is bidirectionally coupled to channels A and B of the data link by way of the aforesaid line driver/receiver isolation units 52 and 54 respectively. The output of unit 140 is coupled to a line busy detect unit 142, a phase error detect unit 144, a synchronization unit 146 and a decoding unit 148. The primary station further includes a random access memory 150, commercially available under the designation RAM-IO 8156; a pair of pre-programmed memories 152 and 154, each commercially available under the designation EPROM-IO 8755; a data processor 156, commercially available under the designation number 8085; and a link controller 158, which is commercially available under the designation number 2652. Units 150 to 158 are each bidirectionally coupled to a common bus 160.

Synchronization unit 146 has its output connected to a clock unit 162 which, in turn, has one output connected to link controller 158 and a second output connected to decoder 148, as well as to an encoding unit 164. Encoder 164 receives a further input for the serial data output 50 of link controller 158 and has its own output connected to unit 140. Link controller 158 receives the output of decoding unit 148 at its serial data input SI.

A further output of link controller 158 is connected to IO port C of RAM 150, which receives further inputs on the same terminal from line busy detect unit 142 and from phase error detect unit 144. A display subsystem interface connector unit 166 receives inputs from IO ports A and B of RAM 150. Further, unit 166 provides the display subsystem control interconnections to IO port A of EPROM 154. IO port B of the latter memory is coupled to an input of link controller 158, as well as to an input of interface and channel select unit 140. The last-mentioned B terminal further provides an input to phase error detect unit 144. Unit 166 is connected to a display unit by way of connections PA, PB and PC. A connector unit 168 provides input and output connections between the auxiliary panel and IO port A of preprogrammed memory 152.

Figure 4:
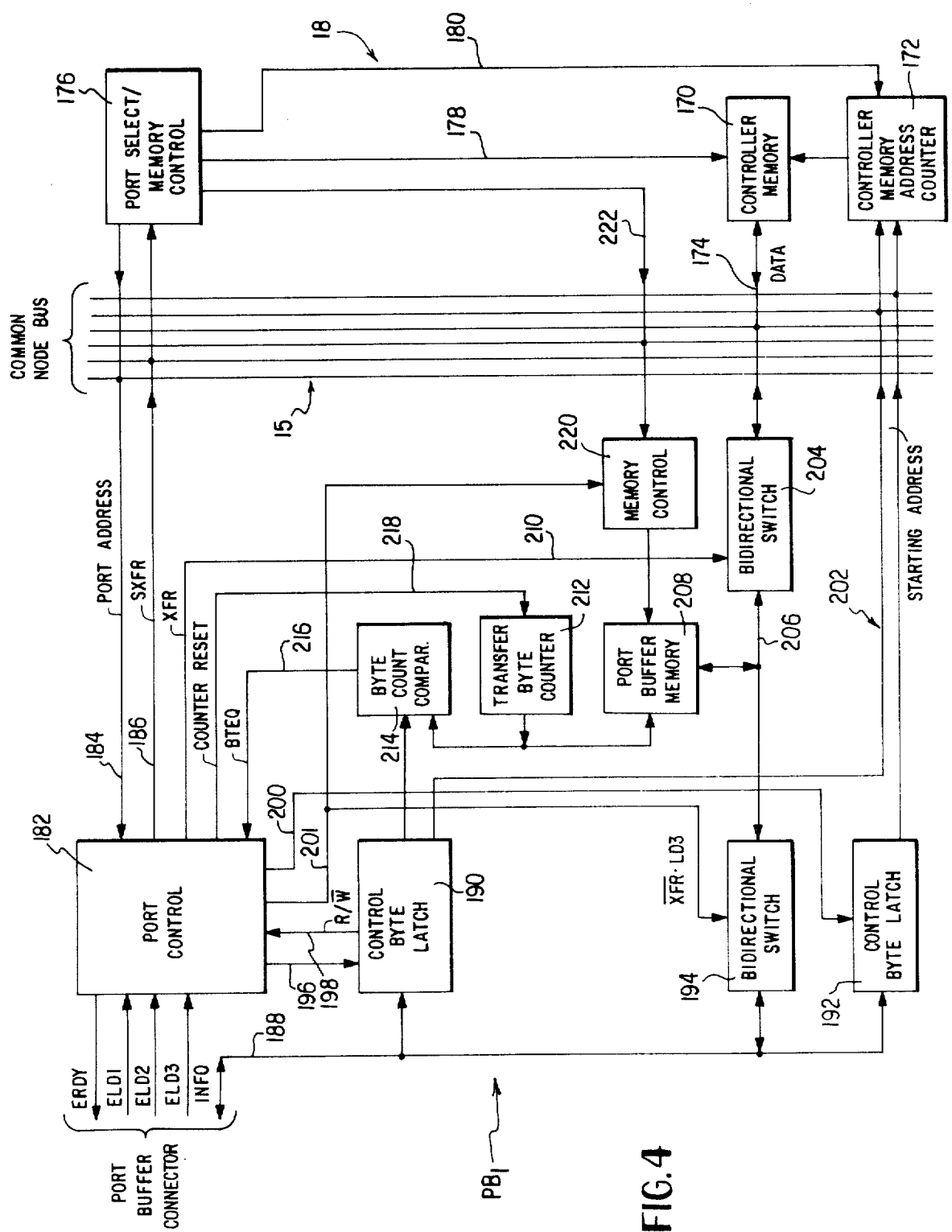
FIG. 4 illustrates a preferred embodiment of a communication node in block diagram form, simplified to include only a single port buffer.

FIG. 4 illustrates in block diagram form one of the nodes shown in FIG. 1, node 10 being taken as an example. Since all port buffers have substantially identical circuits except for the address decoding circuitry, the node illustrated in FIG. 4 is shown with only a single port buffer PB$_1$ in order to simplify the explanation. It will be understood, however, that a plurality of port buffers is employed in a typical node. As before, applicable reference numerals have been retained.

FIG. 4 represents a schematic illustration of the node in which controller 18 is to the right of node bus 15 in the drawing, while port buffer PB$_1$ is positioned to the left in the drawing. The controller comprises a controller memory 170 which is addressed by a controller memory counter 172 so as to either write 8-bit data bytes into memory 170 or to read such data bytes out by way of an 8-bit data bus 174. A port select/memory control unit 176 controls the operation of memory 170 and memory counter 172 through control lines 178 and 180 respectively.

The port buffer portion of the circuit shown in FIG. 4 includes a port control unit 182 which communicates with the external world, (in the case under discussion with subsystem SS$_1$), by means of a set of lines designated respectively ERDY, ELD1, ELD2 and ELD3. Unit 182 is further connected to port select/memory control unit 176 by way of a port address line 184, which further interconnects with bus 15. A control line 186 is adapted to apply control signal SXFR (transfer) to unit 176 and is likewise connected to common node bus 15.

Data is transferred to and from the external circuits, e.g. to or from subsystem SS$_1$, by way of an 8-bit information bus 188 which carries data as well as control information, as explained below. Bus 188 is connected to first and second control byte latches 190 and 192 and to a first bidirectional switch 194, which allows bidirectional data transfers between the port buffer memory and an external subsystem. Latch 190 is connected to receive signals from port control unit 182 by way of lines 196 and to apply a READ/WRITE signal R/W to unit 182 via line 198. Latch 192 is connected to port control unit 182 by means of a control line 200 which applies a signal XFR·LD2 to latch 192.

A control line 201 couples a signal XFR·LD3 to bidirectional switch 194, as well as to a memory control unit 220. A number of output connections of control byte latches 190 and 192 are combined to form a 10-bit address bus 202, which is coupled to controller memory address counter 172 as well as to node bus 15. Port select/memory control unit 176 in the controller circuit is connected to memory control unit 220 by way of a control line 222, which is further connected to bus 15. Unit 220 is coupled to port buffer memory unit 208.

A second bidirectional switch 204 is coupled to switch 194 by an 8-bit bus 206, which further connects bidirectionally to a port buffer memory 208. Switch 204 allows bidirectional data transfers between the port buffer memory and controller memory 170. A transfer signal XFR, derived from port control unit 182, is adapted to be applied to bidirectional switch 204 through a control line 210. Switch 204 is bidirectionally coupled to controller memory 170 by means of the aforesaid 8-bit data bus 174.

A byte count comparator 214 is coupled to control byte latch 190 as well as to port buffer memory 208 and to a transfer byte counter 212. The latter is further connected to receive a counter reset signal via control line 218. A byte count equal line 216 is adapted to couple signal BTEQ from unit 214 to port control unit 182.

Figure 5A:
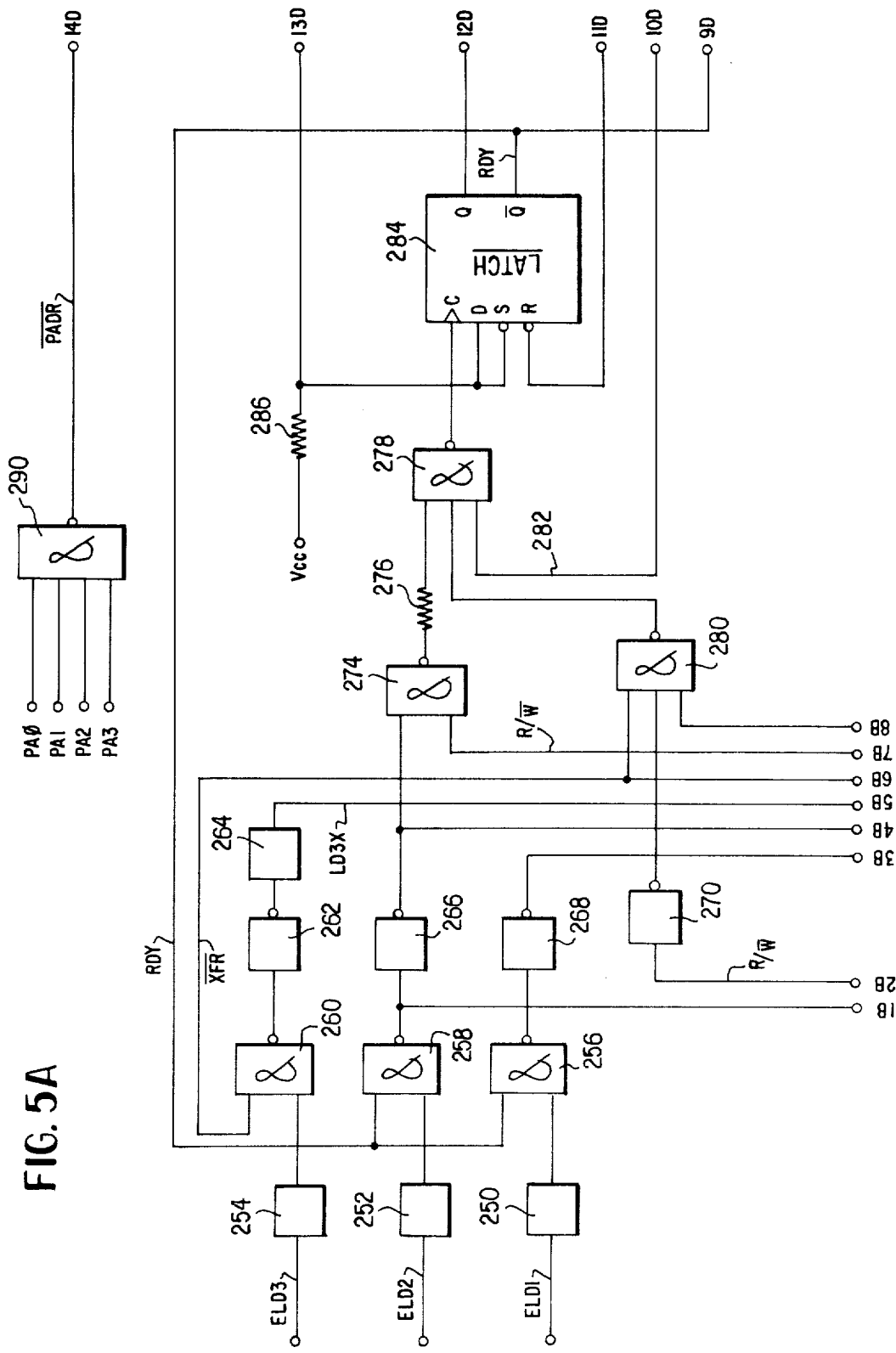
FIGS. 5A-5E jointly illustrate in greater detail the port buffer portion of the node shown in FIG. 4.

FIGS. 5A to 5E jointly illustrate the logic circuit of port buffer PB₁. Wherever applicable, the reference numerals employed in FIG. 4 have been retained. Although the magnitude and complexity of the port buffer logic circuit necessitate its illustration by means of five separate drawing Figures, the division into the circuit portions shown on the respective drawing Figures is determined by considerations such as ease of explanation, rather than by purely function considerations. In each instance, lines terminating in a circle designated by a number and a letter, are continued wherever the correspondingly numbered counterpart circle appears on the particular Figure called out by the letter. For example, the letter B of connections 1B, 2B, 3B, etc. of FIG. 5A are continued in FIG. 5B, specifically through connections 1A, 2A, 3A, etc. Similarly, the letter A in the latter designations points to FIG. 5A, i.e. to connections 1B, 2B, 3B, etc. Since each number/letter combination thus unequivocally designates the continuation of the connection, it is considered unnecessary in the discussion below to call them out specifically in each instance.

With reference now to FIG. 5A, control signals ELD1, ELD2, and ELD3, which are derived from the connected subsystem, are applied to a set of non-inverting buffers 250, 252 and 254 respectively. These buffers, which are used extensively throughout the circuit, provide no storage and may reside on a single chip in a preferred embodiment of the invention. These buffers, unless they also perform logical signal inversion, provide protection through isolation on the user side (subsystem side) of the system, as well as providing the ability to drive a higher load, e.g. one with higher capacitance.

The outputs of buffers 250, 252 and 254 are applied to a set of NAND gates 256, 258 and 260 respectively. NAND gate 260 receives a signal on its other input designated XFR. The output of gate 260 is applied to an inverting buffer 262 and a non-inverting buffer 264. The output signal of the latter buffer designated LD3X, is provided by signals LD3·XFR. NAND gates 258 and 256 each receive a "ready" signal at their other input, designated RDY. The output of gate 258 is applied to an inverting buffer 266 whose output signal is designated LD2·RDY. The output of NAND gate 256 is applied to an inverting buffer 268 whose output signal is designated. LD1·RDY. In a preferred embodiment of the invention, inverting buffers 262, 266 and 268 may be located on a common chip, together with a pair of inverting buffers 270 and 272, which are discussed below.

Signal LD2·RDY is applied to a latching circuit, specifically to a NAND gate 274 thereof which further receives signal R/W at another input thereof. The output of gate 274 is coupled to one input of a further NAND gate 278 by way of a resistor 276. An inverting buffer 270 receives signal R/W at its input and has its output connected to a NAND gate 280 of the aforesaid latching circuit. The latter gate further receives signal XFR at its input, as well as signal BTEQ. The output of NAND gate 280 is coupled to NAND gate 278, together with a further input designated 282.

The output of NAND gate 278 is applied to the clock input C of a "ready" latch 284 which completes the aforesaid latching circuit. Latch 284 preferably comprises one-half of a chip containing a pair of such latches. The D and S inputs of latch 284 are coupled to a pull-up resistor 286 which has a power supply voltage $V_{cc}$ applied thereto selected to be +5 V DC in a peferred embodiment of the invention. Ready latch 284 further receives a signal at its reset input R, the derivation of which will be explained in connection with FIG. 5D. Latch 284 also contains a pair of outputs Q and $\bar{Q}$. The aforesaid "ready" signal RDY is derived at output Q.

A set of address signals designated PA∅-PA3, derived from controller 18, is applied to a corresponding set of input terminals in FIG. 5A. These signals address a selected one of a maximum of sixteen port buffers tied to bus 15. As such, they must be decoded to provide the desired port buffer address signal PADR. In the illustrated embodiment, signals PA∅-PA3 are applied to a NAND gate 290, which provides the decoding function for a port buffer address which is binary 111. Each of the other port buffers requires a decoder suitable to the port buffer address.

Figure 5B:
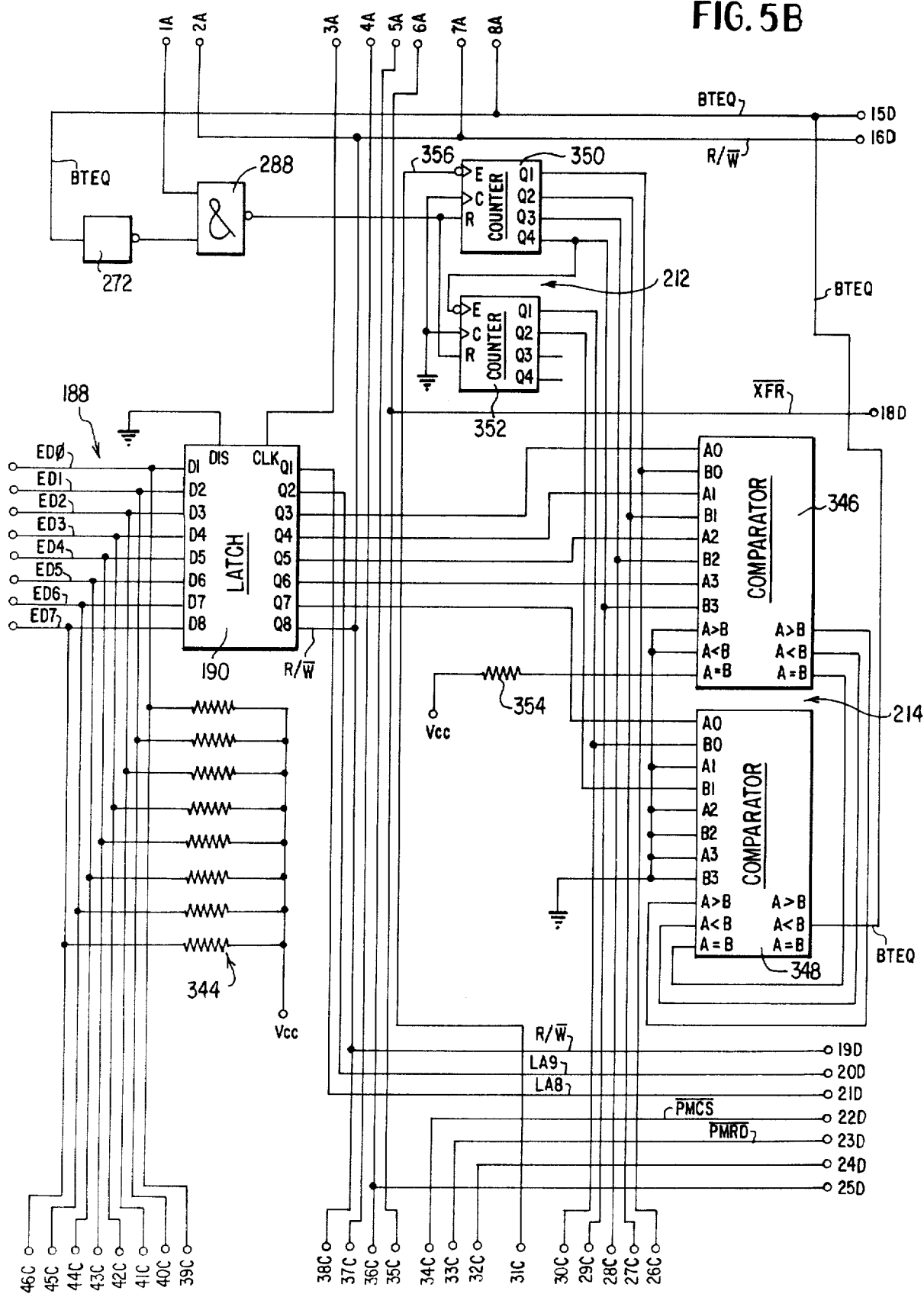
Figure 5C:
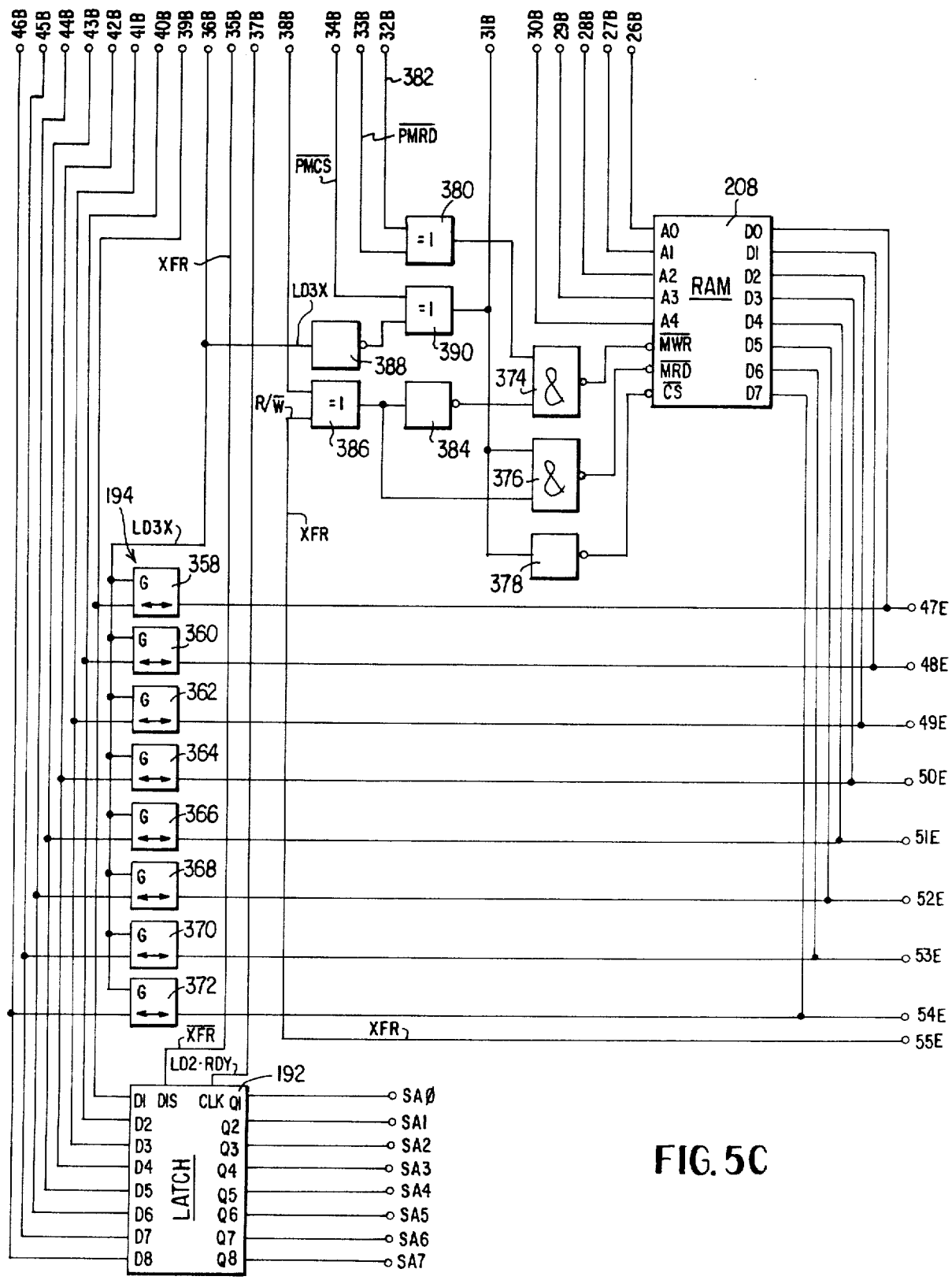
Figure 5D:
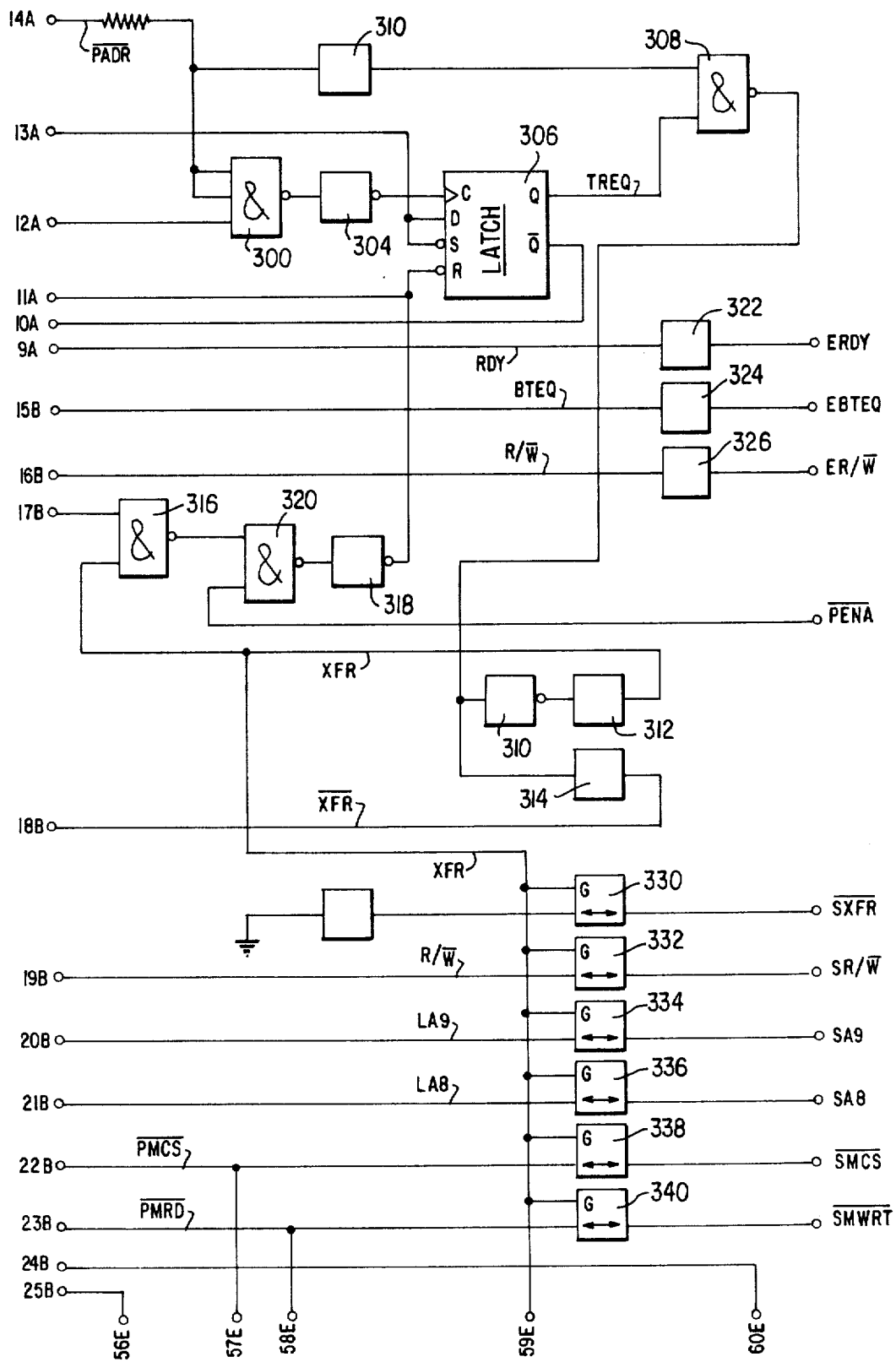

FIG. 5D includes a NAND gate 300 to whose input the aforesaid signal PADR is coupled by way of a resistor 302. A further input is received from the Q output of ready latch 284 in FIG. 5A. The output of gate 300 is coupled to an inverting buffer 304, which in turn is connected to the clock input C of a controller memory transfer request latch 306. Inputs D and S of latch 306 are coupled to receive reference voltage $V_{cc}$ as in the case of latch 284. The reset input R of latch 306, as well as of latch 284 in FIG. 5A, is connected to the output of an inverting buffer 318. In a preferred embodiment of the invention, latches 284 and 306 are located on a common chip that is commercially available under the designation 54C74. The Q output of transfer request latch 306, which provides a transfer request signal TREQ, is connected to one input of a NAND gate 308 whose other input is derived from an inverting buffer 310. The latter is connected to the aforesaid resistor 302 so as to receive signal PADR at its input.

The output of NAND gate 308 is connected to an inverting buffer 310, which is further connected to a non-inverting buffer 312. The output of the buffer 312 provides transfer signal XFR. The output of NAND gate 308 is also coupled to a non-inverting buffer 314 whose output signal is designated XFR. Signals XFR and BTEQ are coupled to the inputs of a NAND gate 316 whose output is coupled to a further NAND gate 320. A second input of the latter gate is coupled to an input terminal on which the signal PENA is provided. This signal is derived from the controller and it is indicative of a "power up" condition. The output of NAND gate 320 is connected to the input of the aforesaid inverting buffer 318 whose output, as explained above, is coupled to the reset inputs of latches 284 and 306.

Signal RDY, which is derived at the Q output of ready latch 284 in FIG. 5A, indicates in its high state that the port buffer is ready for a data transfer with respect to its connected subsystem. When signal RDY is low, it indicates that a data transfer is taking place between the port buffer and the controller memory. As shown in FIG. 5D, the RDY signal is coupled to an output terminal 323 by way of a non-inverting buffer 322 which provides isolation for the connected subsystem. The signal applied to terminal 323 is designated ERDY, the E prefix indicating a signal external to port buffer PB₁. In the example under consideration, this signal is applied to subsystem SS₁. Similarly, in conformance with the adopted convention, signals BTEQ and R/W are coupled to output terminals 325 and 327 respectively, by way of non-inverting buffers 324 and 326 respectively. The latter terminals thus provide signals EBTEQ and ER/W respectively, to the connected subsystem.

FIG. 5D further shows bidirectional switch 204 as being comprised of a set of gated bidirectional switch elements 330, 332, 334, 336, 338 and 340. The latter are coupled to corresponding terminals 331, 333, 335, 337, 339 and 341 respectively, for connection to the controller. Thus, signals SXFR, SR/W, SA9, SA8, are applied to the controller by way of terminals 331, 333, 335 and 337 respectively. Signals SMCS and SMWRT, which are derived from the controller, are applied to the port buffer by way of terminals 339 and 341 respectively. The prefix S in each of the aforesaid signals designates a connection to common node bus 15, which permits a transfer relative to the controller or relative to the port buffer.

Transfer signal XFR is coupled to the gate input G of each of bidirectional switches 330-340. The input/output connection of switch element 330 on the port buffer side is connected to ground by way of a non-inverting buffer 342. As a consequence, when bidirectional switch element 330 is gated by transfer signal XFR, the signal applied to the connected output terminal 331 will be the inverse of that signal, designated SXFR in the drawing. Signal XFR is local to the port buffer, while the prefix S of SXFR designates the node bus connection, as discussed above.

Bidirectional switch element 332 receives signal R/W at one connection thereof, such that signal SR/W is applied to the connected terminal 333 when switch 332 is gated by the transfer signal. Similar conditions pertain to the remaining bidirectional switch elements. Thus, the application of signal LA9 to switch element 334 results in the application of signal SA9 to terminal 335, the S prefix designating a connection to the controller by way of node bus 15. Switch element 336 receives signal LA8 at one connection and, when gated, it applies a corresponding signal SA8 to the connected terminal 337. The application of a signal SMCS to terminal 339 provides a signal PMCS at the port buffer side of switch element 338. The application of signal SMWRT to terminal 341 results in signal PMRD at the port buffer side of switch element 340. In the case of the signals applied to switch elements 334-340, the L prefix or the P prefix respectively, designate signals internal to the port buffer.

The circuit portion of the port buffer illustrated in FIG. 5B comprises first control byte latch 190, which preferably takes the form of an octal D flip flop commercially available under the designation 54C374. Latch 190 receives input signals ED∅-ED7 on an 8-bit input bus connected to latch input terminals D1-D8. The latch disable terminal DIS is grounded and its clock terminal CLK is connected to receive the aforesaid signal LD1·RDY which was derived from inverting buffer 268 in FIG. 5A. Reference voltage V_{cc} is coupled to the individual lines of the aforesaid input bus by means of resistors 344. Latch 190 further has a set of output terminals Q1-Q8. Control signals LA8, LA9 and R/W are derived at latch output terminals Q1, Q2 and Q8 respectively, whence they are applied to bidirectional switches 336, 334 and 332, as discussed in connection with FIG. 5D.

Byte count comparator 214 includes first and second comparator units 346 and 348 respectively, each commercially available in chip form under the designation 54C85. Output terminals Q3, Q4, Q5 and Q6 of control byte latch 190 are connected to inputs A0, A1, A2 and A3 respectively of comparator unit 346. Latch output terminal Q7 is connected to input A0 of comparator unit 348.

Transfer byte counter 212 comprises a pair of substantially identical counter units 350 and 352, each capable of providing a binary count from 0 to 15. In a preferred embodiment of the invention, both counter units 350 and 352 reside on a common chip which is commercially available under the designation CD4520. Input E of transfer byte counter unit 350 has an input line 356 connected thereto. The derivation of the signal so coupled to input E is discussed below in connection with FIG. 5C. Input E of counter unit 352 is connected to output Q4 of counter unit 350. Clock inputs C of both counter units 350 and 352 are connected to a common ground. Outputs Q1, Q2, Q3 and Q4 of counter unit 350 are connected to inputs B0, B1, B2 and B3 respectively of comparator unit 346. Outputs Q1 and Q2 of counter unit 352 are connected to inputs B0 and B1 respectively of comparator unit 348. The remaining outputs of counter unit 352 are not used.

Inputs A>B and A<B of comparator unit 346 are grounded together with inputs A1, A2, B2, A3 and B3 of commparator unit 348. Input A=B of comparator unit 346 has reference voltage V_{cc} coupled thereto by way of a resistor 354. Outputs A>B, A<B and A=B of comparator unit 346 are connected to correspondingly designated inputs of comparator unit 348. Outputs A>B and A=B of the latter comparator unit remain unused.

Signal BTEQ is derived at output A<B of comparator unit 348 and is coupled to an inverting buffer 272. The output of buffer 272 is connected to a NAND gate 288. The latter receives a further input from NAND gate 258 in FIG. 5A. The output of gate 288 is coupled to reset input R of both counter units 350 and 352.

FIG 5C illustrates control byte latch 192, which preferably takes the form of an octal D flip flop substantially identical to latch 190. The 8-bit input bus 188 which provides signals ED∅-ED7, is connected to input terminals D1-D8 respectively of latch 192. Signals SA∅—

SA7 are derived at output terminals Q1-Q8 respectively of latch 192 and serve as source address for the controller, as explained in greater detail below. The disable terminal DIS of latch 192 has signal XFR coupled thereto, while clock terminal CLK of the same latch receives signal LD2-RDY, as derived from the circuit portion discussed in connection with FIG. 5A.

Bidirectional switch 194 comprises bidirectional switch elements 358, 360, 362, 364, 366, 370 and 372, which are preferably implemented on a pair of substantially identical chips. Gate input G of each of the latter switch elements is connected to receive signal LD3X, which is derived from the circuit portion discussed in connection with FIG. 5A. One terminal of each of bidirectional switch elements 358-372 is connected to lines ED∅-ED7 respectively, of the 8-bit input bus which is coupled to the connected external subsystem. The terminals on the port buffer side of switch elements 358-372 are connected to terminals D∅-D7 of port buffer memory 208, as well as to corresponding terminals of a set of switch elements of bidirectional switch 204, which is shown in greater detail in FIG. 5E.

In a preferred embodiment of the invention, port buffer memory 208 constitutes a 32×8 random access memory. Input terminals A∅, A1, A2 and A3 of RAM 208 are connected to output terminals Q1, Q2, Q3 and Q4 respectively, of counter unit 350 of transfer byte counter 212. Input terminal A4 of RAM 208 is connected to output terminal Q1 of counter unit 352 of the same counter. Port buffer memory 208 further includes a set of input terminals designated MWR, MRD ad CS respectively, which are coupled to the outputs of a NAND gate 374, a NAND gate 376 and an inverting buffer 378 respectively. NAND gate 374 receives a first input from an EXCLUSIVE OR gate 380 which itself is connected to receive an input signal on line 382 and the aforesaid signal PMRD. A second input of NAND gate 374 is derived from an inverting buffer 384 which is connected to the output of a second EXCLUSIVE OR gate 386. The inputs of the latter gate are provided by signals XFR and R/W, both derived as previously discussed.

The aforesaid signal LD3X is applied to an inverting buffer 388 which provides one input of a third EXCLUSIVE OR gate 390. The other input of gate 390 is provided by signal PMCS, which is derived from the circuit of FIG. 5D, as discussed above. The output of gate 390 is applied to one input of NAND gate 376, as well as to inverting buffer 378. A second input of gate 376 is derived from the output of EXCLUSIVE OR gate 386.

Figure 5E:
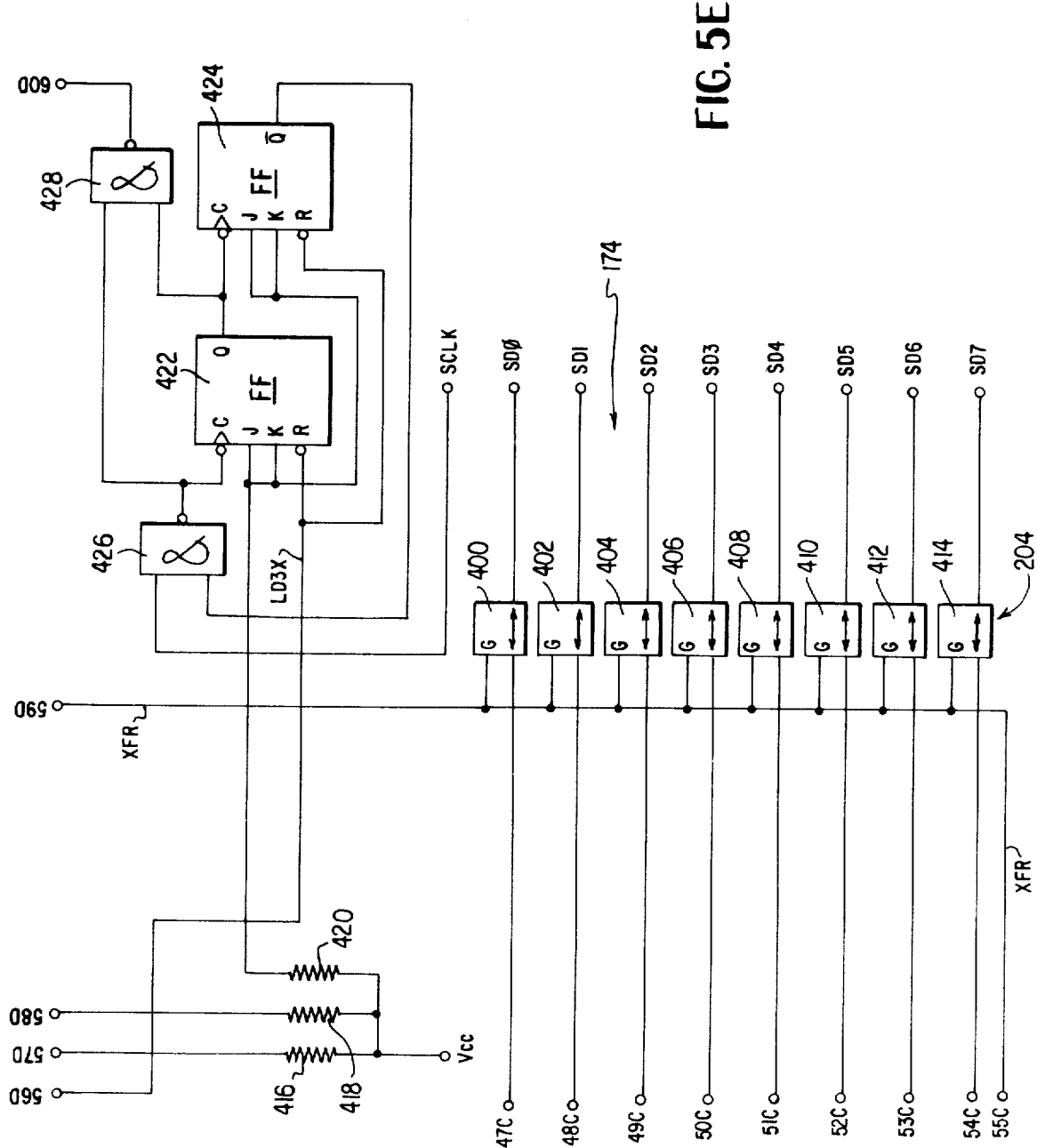

FIG. 5E shows bidirectional switch 204 which comprises a set of bidirectional switch elements 400, 402, 404, 406, 408, 410, 412 and 414, which are preferably implemented on a pair of substantially identical chips. Gate input G of each bidirectional switch element 400-414 receives the aforesaid signal XFR. The terminals located on the port buffer side of switch elements 400-414 are connected to corresponding terminals of bidirectional switch elements 358-373 as discussed above, as well as to terminals D∅-D7 of port buffer memory 208. The terminals of switch elements 400-414 which are located on the controller side are connected to an 8-bit bus 174 that carries signals SD∅-SD7 to the controller.

Reference voltage $V_{cc}$ is coupled to bidirectional switches 338 and 240 in FIG. 5D by means of resistors 416 and 418 respectively. A resistor 420 further couples reference voltage $V_{cc}$ to terminals J and K of a pair of flip flop circuits 422 and 424, which are preferably located on a common chip that is commercially available under the designation 54C107. The clock input C of flip flop 422 is coupled to the output of a NAND gate 426, one of whose inputs is coupled to output Q of flip flop 424. The other input signal coupled to gate 426 constitutes a clock signal derived from the controller and designated SCLK.

Both reset inputs R of flip flops 422 and 424 have signal LD3X coupled thereto, which was derived in the circuitry of FIG. 5A discussed above. Output Q of flip flop 422 is coupled to clock input C of flip flop 424, as well as to one input of a NAND gate 428 which receives a further input from the output of NAND gate 426. The output of gate 428 is coupled to line 382 in FIG. 5C, which constitutes one input of EXCLUSIVE OR gate 380.

Figure 6A:
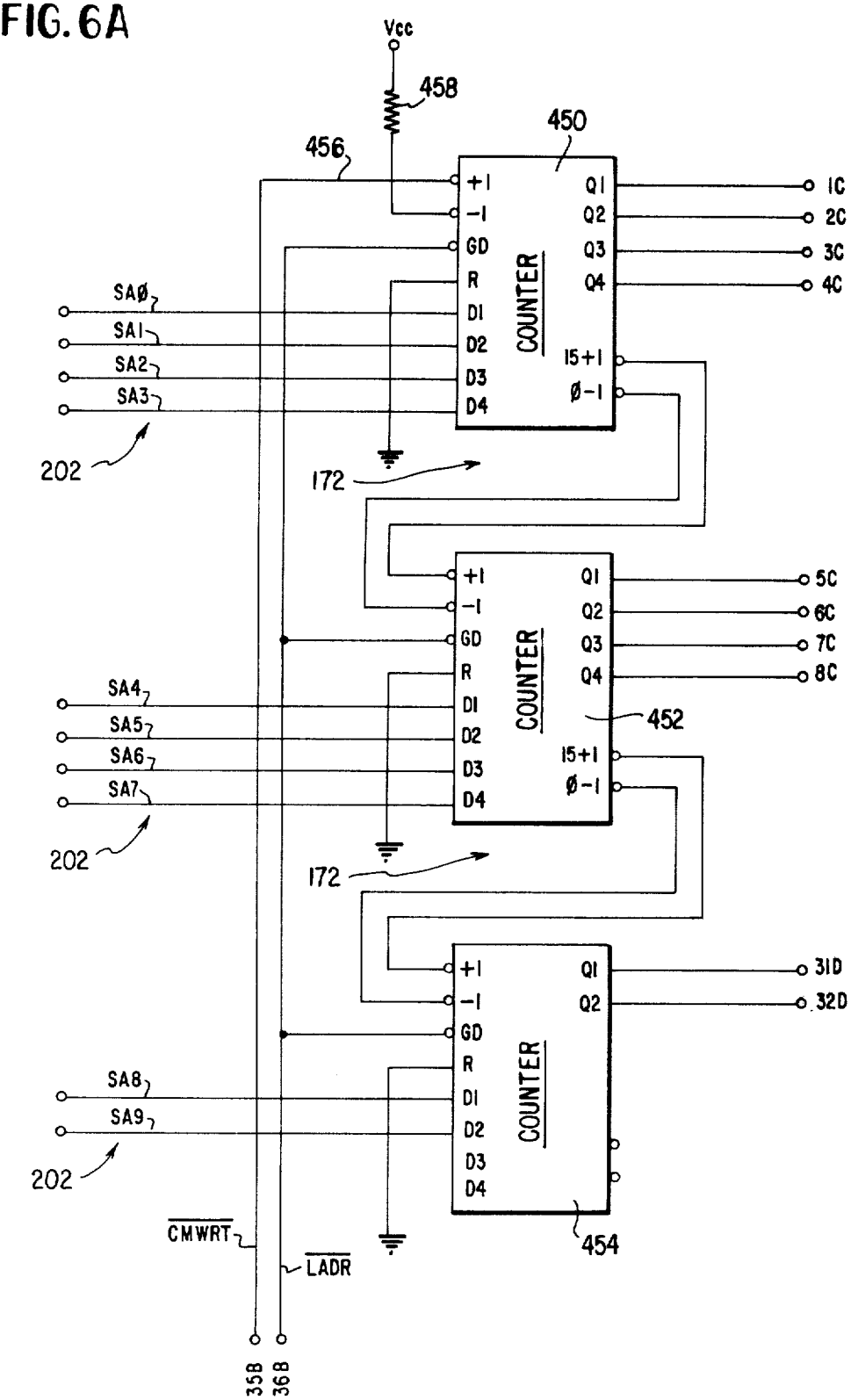

FIGS. 6A-6D illustrate in greater detail the controller portion of the node shown in FIG. 4, wherein applicable reference numerals have been carried forward. FIG. 6A illustrates controller memory address counter 172, which is seen to comprise three substantially identical address counter units 450, 452 and 454. Each of the latter counter units comprises a chip that is commercially available under the designation 54C193 and which is capable of providing a binary count 0-15. The respective address units each have a set of input terminals designated +1, −1, GD, R and D1, D2, D3 and D4. Each of counter units 450 and 452 has output terminals designated Q1, Q2, Q3, Q4, as well as an output terminal pair 15+1 and ∅−1. Counter unit 454 has output terminals designated Q1 and Q2. Input terminal +1 of address counter unit 450 is coupled to a line 456, which applies a signal whose derivation is explained in connection with the discussion of FIG. 6B below. Input terminal −1 of the same address counter unit has reference voltage $V_{cc}$ coupled thereto by way of a resistor 458. In the case of address counter unit 452, input terminals +1 and −1 are connected to output terminals 15+1 and ∅−1 of address counter unit 450. Similarly, input terminals +1 and −1 of address counter unit 454 are connected to output terminals 15+1 and ∅−1 of unit 452. Terminal GD in all three address counter units 450, 452 and 454 is connected to receive a signal LADR, which is derived from the circuit portion discussed in connection with FIG. 6B. Input terminal R in all of the address counter units is grounded.

The 10-bit input bus 202, which is connected to terminals D1-D4 of address counter units 450 and 452 and to terminals D1 and D2 of unit 454, applies address signals SA∅-SA7, derived in FIG. 5C, to units 450 and 452. Further, control signals SA8 and SA9, which are derived from bidirectional switching elements 336 and 334 respectively in FIG. 5D, are applied to input terminals D1 and D2 of unit 454.

The Q outputs of address counter units 450, 452 and 454 are connected by way of a 10-bit bus to controller memory 170, which is illustrated in FIGS. 6C and 6D. As shown, the controller memory comprises eight substantially identical 1K×1 RAM chips numbered 460, 462, 466, 468, 470, 472 and 474, which are individually available under the designation 6508. Each chip is seen to have ten input terminals, of which terminals A∅, A1, A2 and A3 are connected to output terminals Q1, Q2, Q3 and Q4 respectively, of address counter unit 450. Input terminals A4, A5, A6 and A7 of each controller memory chip are connected to output terminals Q1, Q2, Q3 and Q4 respectively, of address counter unit 452.

Output terminals Q1 and Q2 of address counter unit 454 are connected to input terminals A8 and A9 respectively, of each controller memory chip.

As shown in FIGS. 6C and 6D, each controller memory chip further includes a pair of control terminals designated R/W and CS respectively, which are adapted to receive control signals WRT and CS respectively. Further, each controller memory chip comprises a pair of read in/read out terminals DI and DO, tied together and connected to a single controller Data input/output terminal. The signals written into or read out from controller memory chips 460, 462, 464 and 466 are designated SD$, SD1, SD2 and SD3 respectively. For controller chips 468, 470, 472 and 474 these signals are designated SD4, SD5, SD6 and SD7 respectively.

Figure 6B:
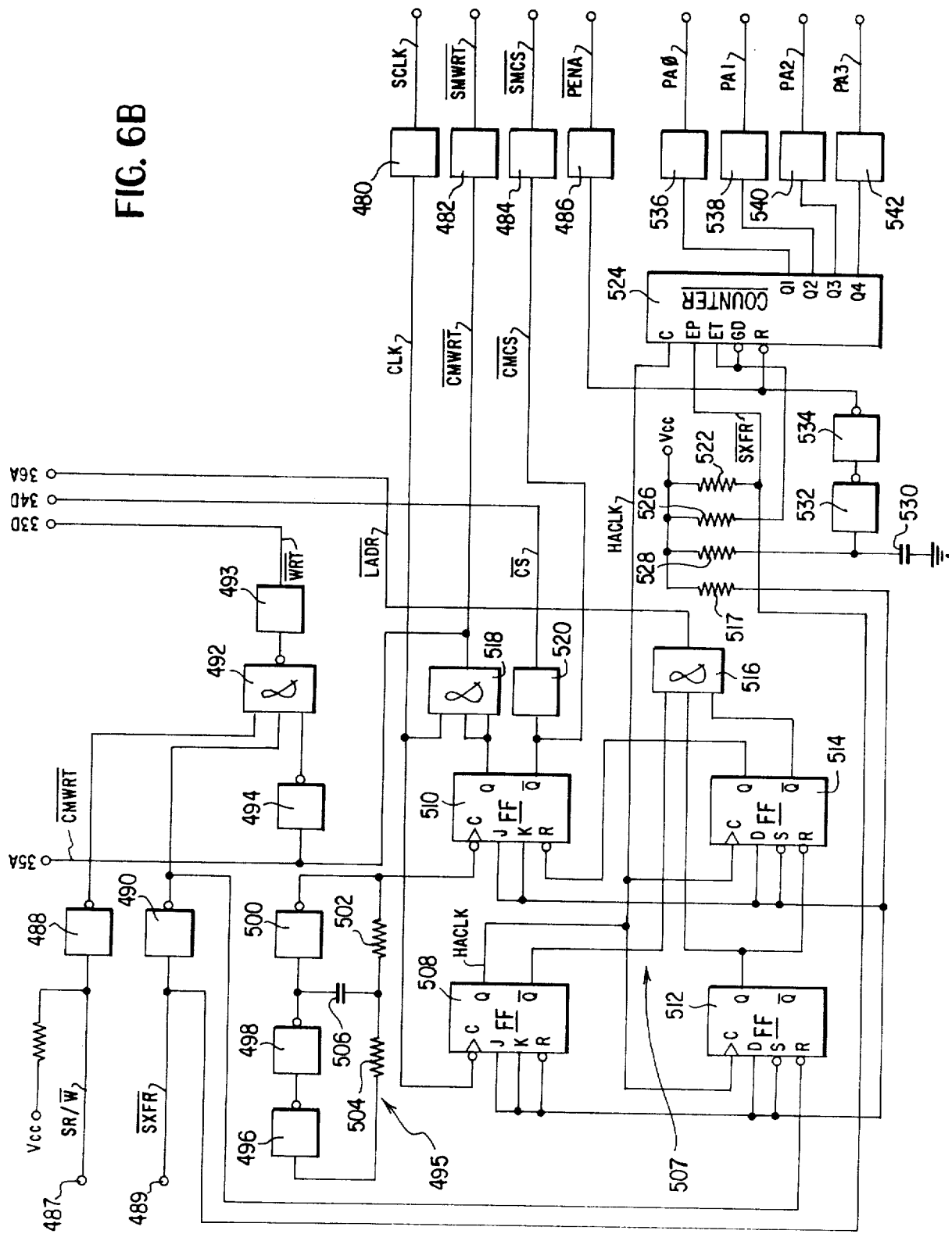

The control circuitry illustrated in FIG. 6B includes a pair of input terminals 487 and 489 to which the aforesaid signals SR/W and SXFR respectively, are applied. Signals SR/W and SXFR, which are derived from bidirectional switching elements 332 and 330 respectively in FIG. 5D, are coupled to a pair of inverting buffers 488 and 490 respectively. Buffer 488 further has reference voltage $V_{cc}$ resistively coupled to its input. The outputs of buffers 488 and 490 are applied to a pair of inputs of a NAND gate 492, which further receives the output of an inverting buffer 494. The output of gate 492 is applied to a non-inverting buffer 493 which provides the aforementioned signal WRT for application to the R/W input of each of controller memory chips 460–472.

A clock oscillator 495 is capable of providing a signal frequency of approximately 500 KHz and comprises three series-connected inverting buffers 496, 498 and 500. The output of buffer 500 is fed back to the input of buffer 496 by means of a pair of resistor 502 and 504 connected in series with each other. The latter resistors, which each have a value of 10 K ohms in a preferred embodiment of the invention, have their junction point coupled to the output of buffer 498 by means of a capacitor 506 which preferably has a value of 100 pf. Clock oscillator 495 generates signal CLK at the output of buffer 500, which is coupled to a non-inverting buffer 480 to provide a corresponding signal SCLK for application to the port buffer, as shown in FIGS. 6B and 5E. The output of the clock oscillator is further connected to a timing circuit 507 adapted to generate timing signals. Specifically, the output of inverting buffer 500 is coupled to clock input C of each of a pair of J-K flip flops 508 and 510, which are preferably implemented on a common chip commercially available under the designation 54C108. Timing circuit 507 includes a further pair of D flip flops 512 and 514, which are commercially available under the designation 54C74 and which likewise reside on a common chip. Inputs J, K and R of flip flop 508, inputs J and K of flip flop 510 and inputs D and S on each of flip flops 512 and 514 are connected in common to a resistor 517 to which reference voltage $V_{cc}$ is applied. Output Q of flip flop 508 provides a signal, designated HACLK in the drawing, which has one-half the clock frequency provided by clock oscillator 495. Signal HACLK is applied to clock input C of flip flops 512 and 514 and to the clock input of a port address counter 524.

The Q output of flip flop 508 is coupled to a NAND gate 516, which receives further inputs from the Q output of flip flop 512 and the Q output of flip flop 514. The aforementioned signal LADR is generated at the output of gate 516. The Q output of flip flop 510 is coupled to a NAND gate 518 which receives a further input from the output of clock oscillator 495. A signal CMWRT is provided at the output of gate 518, which is applied to the input of inverting buffer 494, as well as to line 456 in FIG. 6A. Signal CMWRT is further coupled to a non-inverting isolation buffer 482, which provides a corresponding signal, designated SMWRT (system memory write), at its output for application to bidirectional switch element 340 in FIG. 5D.

Output Q of flip flop 510 provides a signal CMCS, which is applied to a non-inverting buffer 520. The latter buffer provides the aforesaid signal CS at its output for application to the identically designated control terminals of the respective memory chips illustrated in FIGS. 6C and 6D. Signal CMCS is further coupled to a non-inverting buffer 482, to provide the aforesaid signal SMCS at the output thereof for application to bidirectional switching element 338 in FIG. 5D. Outputs Q of flip flop 512 and 514 are coupled to the reset inputs R of latches 514 and 510 respectively. Input R of flip flop 512 is connected to the output of inverting buffer 490.

Port address counter 524 is capable of providing a binary count 0–15 and is incremented by the application of signal HACLK to its clock input C. A further input terminal, designated EP, is connected to receive signal SXFR from terminal 489, as well as reference voltage $V_{cc}$ by way of a resistor 522. Reference voltage $V_{cc}$ is also applied to jointly connected input terminals ET and GD of counter 524 by way of a resistor 526. An RC network comprising a resistor 528 connected in series with a capacitor 530 is coupled between voltage $V_{cc}$ and ground. The junction point of the resistor/capacitor combination is coupled to the input of an inverting buffer 532, whose output is connected to a further inverting buffer 534. The output of buffer 534 is connected to the reset input R of port address counter 524 and to a non-inverting buffer 486. A port enable signal PENA is derived is derived at the output of buffer 486.

Port address counter 524 comprises a set of outputs Q1, Q2, Q3 and Q4, which are connected to non-inverting isolating buffers 536, 538, 540 and 542 respectively. Signals PA$, PA1, PA2 and PA3, which were discussed in connection with FIG. 5A, are derived at the output of these buffers.

In the operation of the preferred embodiment of the global communication system illustrated in FIG. 1, primary station 50, which may have a programmable data processing capability in a preferred embodiment of the invention, exercises control over its satellite secondary stations 28, 36 . . . 44, to which it is selectively coupled by way of the data link represented by communications channels A and B. The secondary stations, which may have a pre-programmed data processing capability, operate in synchronism with the primary station in accordance with SDLC (syndronous data link control) protocol. Thus, all data transfers that involve the data link are performed under SDLC protocol. A data transmission may contain up to five data frames, each frame containing the necessary control bytes plus a data block having up to 32 data bytes.

The primary station contains the source and the destination addresses for all data and it issues commands to selected secondary stations for data transfers. The secondary stations in the global communication system are slaved to the primary station and are only capable of responding to primary station commands. They do not themselves initiate any data transfers with respect to the primary station and, accordingly, there can be no contention between competing secondary stations for access to the data link.

Prior to each transmission, the primary station initializes the secondary station which is addressed. Under the adopted protocol, each transfer, whether to or from a secondary station, must be acknowledged to the primary station. If not, the addresed secondary station will again be initialized. Thus, the timing of the secondary stations is tightly controlled by the primary station. The primary station executes a time-out routine following each transmission, with the time tailored to each expected response.

The function and operation of the primary and secondary stations within the global communication system, as well as their structure, are believed to be sufficiently clear from the discussion and drawings herein to convey a full understanding of the present invention to one skilled in the art. To preclude any questions of completeness of this disclosure, the software documentation for the primary and secondary stations is provided in Appendix A and B respectively.

By virtue of the access afforded each secondary station to its associated node, as explained in greater detail hereinbelow, the primary station is able to receive information provided by the external subsystems, or by the external peripheral port buffers. Likewise, the primary station can transmit signals to these external circuits. Accordingly, it is the primary station which controls the operation of the physically remote operating units linked by the global communication system. However, notwithstanding the preeminent function of the primary station in the global communication system, each node controls all traffic within such node and all traffic with its associated external circuits. Thus, the node has an independent existence apart from the overall communication system and it is capable of performing its assigned communication tasks relative to its associated subsystems even if a failure of the global communication system were to occur. Accordingly, such a failure will not cause the control functions performed by the respective subsystems of the distributed control arrangement to fail instantly. The respective operating units will be able to carry on their assigned functions for either a limited time period or on a limited function basis.

If the failure of the global communication system were to continue at length, the performance of the respective operating units would, of course, deteriorate due to the absence of any control exercised by the primary station. It should be noted, however, that the external subsystems are made aware of the condition of other connected subsystems, including the communication system, by the timely modification of particular locations in the controller memory. Each subsystem is assigned the responsibility of maintaining a special byte in memory indicative of its condition. Further it is the responsibility of these subsystems to monitor the memory locations of interest and, when a failure to update is noted, to act appropriately. Depending on the nature of the information which is no longer available or current, the subsystem may continue to operate in a limited manner, go into a hold mode, or shut down the system altogether.

As previously explained, each port buffer serves as a translator between the protocol of the external circuit and the protocol and the node. Specifically, port buffer $PB_O$ converts SDLC-formated data to make it acceptable to node 10. In similar manner, port buffer $PB_R$ serves to translate to protocol of an asynchronous serial link, in this case employing a universal asynchronous receiver/transmitter (UART), to make it acceptable to node 10. In this capacity, each port buffer is adapted to establish a 2-stage bidirectional transfer link between the corresponding external circuit, e.g. between subsystem $SS_1$ and controller 18, in which the port buffer provides intermediate data storage. On a WRITE command the port buffer addressed by the controller, e.g. port buffer $PB_1$, after accepting data from its connected external subsystem $SS_1$, transfers the data to the controller memory for storage, all under the control exercised by controller 18. On a READ command, the addressed port buffer $PB_1$ receives information from the controller memory and makes it available to the connected external subsystem $SS_1$. In either case, in accordance with the protocol of the node, subsystem $SS_1$ must previously have entered a READ or WRITE transfer request. It should be noted that a request for a data transfer between a port buffer and the controller may arise asynchronously and a data transfer between a port buffer and a subsystem (or other external circuit) may be performed asynchronously. However, transfer of data between the port buffer and the controller will occur only in synchronism with the controller clock.

Figures 7, 8, 9, 10:
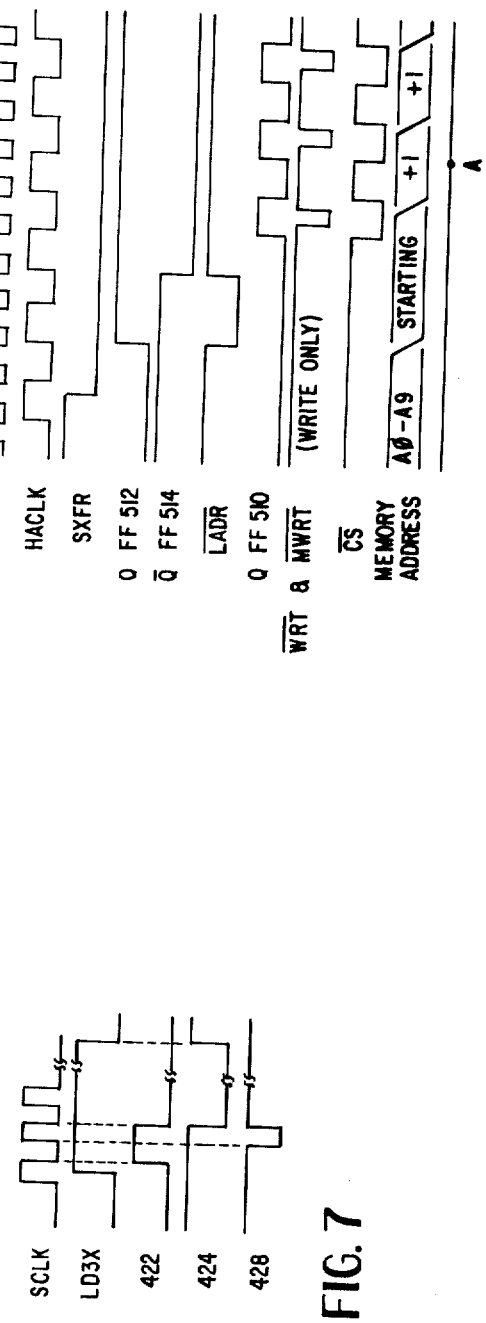
FIG. 7 shows certain waveforms illustrative of the operation of a portion of the circuit of FIG. 5E.
FIG. 8 shows certain waveforms illustrative of the relationship between corresponding signals generated by the circuit shown in FIG. 6B.
FIG. 9 shows certain waveforms illustrative of the signals applied to the circuit shown in FIGS. 6C and 6D.
FIG. 10 illustrates a preferred format of the control word used in connection with a data transfer.

As shown in FIG. 10, bit 7 of the first control byte PC-1 indicates whether the instruction is a READ or a WRITE command and thus establishes the direction of data transfer. The first control byte further includes a 5-bit count, indicative of the number of data bytes to be transferred. Bit #6 of control byte PC-1 is the most significant bit and bit #2 is the least significant bit. The two final bits of control byte PC-1, together with the eight bits of the second control byte PC-2, contain the address of the first data byte to be transferred.

The 2-byte control word is entered into the port buffer on the 8-bit information bus 188, one byte at a time. This is represented by signals ED∅-ED7, which are applied in parallel and stored in latches 190 and 192. (See FIGS. 4, 5B AND 5C.) As will become clear from the explanation below, only the 10-bit address and the R/W bit are passed on to the controller. The byte count remains in the port buffer which controls the number of data bytes transferred in either direction between itself and the controller, as well as during transfers from an external circuit to the port buffer.

If the first bit of control byte PC-1 denotes a WRITE operation, i.e. if information is to be written into controller memory 170, data bytes are entered into the port buffer directly following the second control byte. The number of data bytes so entered must equal the byte count defined in the control bytes. If the first bit of the first control byte indicates a READ operation and data is to be read out from controller memory 170, a short wait period follows after the second control byte. This allows data from the controller memory to be transferred to the port buffer. In a preferred embodiment of the invention, the wait period is normally less than 1 millisecond. The number of data bytes so transferred to the port buffer must again equal the byte count defined by the control bytes.

As stated above, two control bytes must be entered into the port buffer for each transfer request. If ERDY is high, (FIGS. 4 and 5D), the first 8-bit control byte is entered into control byte latch 192, (FIGS. 4 and 5C), when signal ELD2 goes high. If the first control byte denotes a WRITE command, the port buffer expects the following byte(s) to be data from the connected subsystem for transfer into controller memory 170. (See FIGS. 4, 6C and 6D). If the first control byte denotes a READ command, the high state of ELD2 will trigger ready latch 284 (FIG. 5A) and set the port buffer to expect data from the controller. Triggering of the ready latch causes signal RDY to go low, thereby preventing further data entries into the control byte latches until the data transfer from the controller memory to the port buffer has been completed.

It is a feature of the present invention that the second control byte latch, i.e. latch 192, has a high impedance output state when the disable input DIS of the latch is high. Accordingly, until DIS goes low, latch 192 will not produce the address stored therein on its output. This feature allows the outputs of the second control byte latch of the respective port buffers of node 10 to be operated in parallel on the node bus 15. The output of the port buffer to the bus is enabled only when signal XFR, which is applied to the control byte latch 192, goes low.

As previously explained, port buffer PB$_1$ includes first and second bidirectional switches 194 and 204 respectively, each comprising a set of bidirectional switch elements. The purpose of these switches is to prevent tying input data bus 188 directly to system data bus 174. The operation is such that, when one set of switch elements allows an information transfer, the other set is disabled. The bidirectionality of the individual switch elements allows information to flow from the connected external subsystem to port buffer memory 208, or from the latter memory to the connected subsystem. Similarly, the bidirectional switch elements of switch 204 allow information to flow from port buffer memory 208 to controller memory 170, or in reverse. Bidirectional switch elements 400–414 are enabled when information transfer signal XFR is high. Switch elements 358–372 of switch 194 are enabled when XFR is high and coincident with signal ELD3 to provide signal LD3X.

The byte count stored in control byte latch 190 is compared by byte count comparator 214 with the count of transfer byte counter 212. The latter is incremented upon the transfer of each data byte through line 356. Incrementing occurs on the falling edge of the waveform of either signal LD3X which is derived from the connected subsystem, or of signal SMCS derived from the controller. The output of transfer byte counter 212 is further used to address port buffer memory 208.

As will be seen from FIG. 5C, line 356 derives its signals from the output of EXCLUSIVE OR gate 390 which, when high, further enables port buffer memory 208. Thus, transfer byte counter 212 is incremented when LD3X≠PMCS, i.e. it is incremented from either the connected subsystem or from the controller, depending on the direction of data flow. Specifically, signal LD3X is used to read from, or write data into, port buffer memory 208 with respect to the connected subsystem SS$_1$, or with respect to some other external circuit, e.g. a secondary station. Signal PMCS is used to read data from or write data into the port buffer memory with respect to controller memory 170.

Byte count comparator 214 monitors the output of transfer byte counter 212 to determine when this count exceeds the 5-bit byte count loaded into control byte latch 190 by the connected subsystem SS$_1$. When that point is reached, output A<B of comparator unit 348 generates a byte count equal signal BTEQ which performs a number of functions:

(1) Resets transfer byte counter 212 through inverting buffer 272 and NAND gate 288, to prepare the counter for the next data transfer.
(2) Clocks ready latch 284 by way of NAND gates 280 and 278, if data is being written into the controller memory.
(3) Resets ready latch 284 by way of NAND gates 316 and 320 and inverting buffer 318, provided transfer byte counter 212 was used to transfer data between the port buffer and the controller.
(4) Signals the external subsystem by way of terminal 325 that all data bytes have been transferred between the port buffer and the subsystem.

In connection with the functions enumerated above, it should be noted that the number count of bytes to be transferred is latched into control byte latch 190 more than once during a WRITE operation and consequently signal BTEQ is asserted more than once during such an operation. The controller does not count bytes. The number count remains in the port buffer and only it knows how many bytes are to be transferred. Thus, it is the port buffer and not the controller which shuts off the latter when the count of data bytes actually transferred equals the number count defined in the first control byte. Conversely, the port buffer has no clock of its own for timing the transfer of data bytes thereto. Accordingly, signal SMCS, which occurs in synchronism with the controller clock pulses, is used when the data transfer is from or to the controller. This arrangement illustrates the dual utilization of existing circuit components by the controller and the port buffer, which serves to reduce the overall cost and increase the operating speed of the system. Further, it shows the closely meshed timing relationship which exists between the operation of the controller and of the port buffer. In turn, this permits the timing relationship between the port buffer and the external subsystem to remain loose, so that data transfers between them may be timed by the subsystem out of synchronism with the controller clock.

Transfer byte counter 212 is incremented on the falling edge of the waveform of each LD3 pulse. Accordingly, signal BTEQ is generated on the falling edge of the last LD3 pulse. Upon the generation of the aforesaid BTEQ signal, the data stored in random access port buffer memory 208 is ready to be moved into the controller. The coincident relationship of signals XFR high, (data not presently being transferred between the controller and the buffer); R/W low, (WRITE condition); and BTEQ asserted, (a pulse); sets the ready latch. If the port buffer address is not coincident, the ready latch will set the transfer request latch to assert transfer request signal TREQ.

When now the address of the port buffer in question, i.e. PB$_1$, comes up during the polling procedure, signal SXFR goes low and stops the polling. Further, signal SXFR loads the 10-bit starting address SA$\emptyset$ to SA9 into controller memory address counter units 450, 452 and 454. This action enables writing into controller memory 170 to take place. The actual pulses that write into the controller, i.e., pulses CS, are counted by the port buffer's transfer byte counter 212. When the byte count is again "equal," signal SXRF goes high. It stops the writing into the controller memory and it releases the controller to continue its sequential polling of the port buffers.

Transfer byte counter 212 supplies the buffer address for each data byte stored by the 32×8 random access port buffer memory 208. In the following discussion it must be kept in mind that READ and WRITE commands are issued with respect to controller memory 170, rather than with respect to the port buffer memory. Within the framework of these commands, the port buffer memory has four separate modes of operation:

(1) READ command. Data bytes, (not control bytes), flow from controller memory 170 to port buffer memory 208. The port buffer memory is being written into.
(2) READ command. Data bytes flow from port buffer memory 208 to external subsystem SS$_1$. The contents of the port buffer memory are being read out.
(3) WRITE command. Data bytes flow from external subsystem SS$_1$ to port buffer memory 208. The port buffer memory is being written into.
(4) WRITE command. Data bytes flow from port buffer memory 208 to controller memory 170. The contents of the port buffer memory are being read out.

The READ and WRITE operations outlined above will become clear with reference to FIGS. 11 and 12 in which waveforms are illustrated for a number of pertinent signals. The encircled numbers on the time scale at the bottom of these Figures refer to selected points in time. These are set forth in greater detail below in the respective tabulations of the complete sequence of events of both operations.

WRITE OPERATION

1. Port buffer ready for transfer, READ or WRITE: RDY.
2. First control byte entered: LD1·RDY.
3. Second control byte entered: LD2·RDY.
4. Data byte(s) entered: LD3·XFR.
5. Byte count equal to control word byte count: BTEQ.
6. Ready disabled-latched: RDY=BTEQ·XFR·R/W
7. Port address not asserted: PADR.
8. Transfer request-latched: TREQ=RDY·PADR.
9. Port address asserted: PADR.
10. Transfer enabled: XFR (& SXFR)=TREQ·PADR.
11. Port address held.
12. Transfer starting address.
13. As long as SXFR is true (SXFR), controller controls transfer of data from buffer memory to system memory at controller clock rate. The port's "BTEQ" terminates transfer when:
14. Byte count equal to control word byte count: BTEQ.
15. Ready enabled: RDY=BTEQ·XFR. Ready and transfer request latches cleared.

In the WRITE operation tabulated above and illustrated in FIG. 11, the initial events apply to the first stage of the transfer link established by the port buffer, wherein the latter interfaces with external subsystem SS$_1$. As shown, the "ready" signal RDY is asserted, indicative of the fact that the port buffer is ready for either a READ or a WRITE transfer. Initially, the first control byte PC-1 is placed on information bus 188, comprising signals ED$\emptyset$-ED7. Thereafter, signal LD1 is asserted over a separate line. This occurs at point (2) in FIG. 11 and effects the latching of control byte PC-1 into control byte latch 190 on the rising pulse edge.

As previously explained in connection with the discussion of FIG. 10, the first control byte PC-1 contains a READ/WRITE bit as well as the number count of bytes to be transferred. The assertion of signal LD1 at point (2) concurrently moves this information to the input of byte count comparator 214. The 5 bits that define the number count now remain at the input of the byte count comparator until such time as the external subsystem provides control signal LD1 again, i.e. preceding the subsequent data transfer. At such time, the assertion of control signal LD1 will place a new count into latch 190 and into comparator 214.

The second control byte PC-2 is subsequently placed on bus 188. The subsequent control signal, i.e. signal LD2, is also provided on a separate control line by the subsystem. When the signal LD2 is asserted, as shown at point (3) in FIG. 11, control byte PC-2 is latched into control byte latch 192 on the rising pulse edge.

Subsequent information transferred by bus 188 consists exclusively of data bytes. Upon the assertion of signal LD3 at each point (4) in FIG. 11, bidirectional switch 194 is opened and the first data byte is placed into port buffer memory 208. Specifically, a pulse is generated internally on the output of NAND gate 428. This pulse, which is illustrated in FIG. 7, effects the actual writing of data into port buffer memory 208. As signal LD3 is reset, transfer byte counter 212 is incremented, such that the second data byte will be placed into the next location of port buffer memory 208.

Each time counter 212 is incremented, a new byte count is placed on the input of byte count comparator 214. A continuous comparison is made between the number count stored in the comparator and the count of the newly transferred byte.

When the last data byte arrives, (the fourth data byte in the example under consideration), byte count comparator 214 determines equality and prevents any further data bytes from being transferred by closing off the port buffer. Specifically, the fall of the fourth LD3 pulse will cause transfer byte counter 212 to increment to 5. Thus, output B becomes larger than output A in comparator 214 and a BTEQ pulse is generated, as shown at point (5) in FIG. 11. In essence, the generation of the BTEQ pulse in the first portion of the WRITE operation indicates that all of the data bytes defined by the number count in control byte PC-1 have in fact been written into the port buffer. The port buffer must now be closed and this is done by letting signal RDY go low, as indicated at point (6) in FIG. 11.

Since the data transfer between the external subsystem and the port buffer occurs asynchronously, signal LD3 comes at an arbitrary time. Signal LD3X is a function of signal LD3 and XFR and thus its timing is determined by the timing of LD3. As shown in FIG. 5E, LD3X is applied to the reset input of flip flop 422. The latter is part of a circuit constituted by units 422, 424, 426 and 428, whose pertinent waveforms are shown in FIG. 7. The purpose of this circuit is to allow a settling time delay following the opening of bidirectional switch 194 before actually writing into port buffer memory 208. The use of the controller clock signal SCLK is a convenient means to clock flip flops 422 and 424, thereby achieving an appropriate delay period after the assertion of LD3. The pulse output of gate 428 provides the actual writing signal.

During the remainder of the write operation, the data moved into the port buffer is further moved through the second stage of the established transfer link to controller memory 170. The latter transfer is carried out in synchronism with the controller clock. The duration of the transfer is a function of the controller clock period, the byte count and the number of port buffers at the node. The total transfer period, i.e. the time in which the port buffer is not available to the external subsystem, is indicated by the interval during which signal RDY is low, i.e. from point (5) to point (14) in FIG. 11. The actual transfer, the setup time in the controller and the movement of data, all take place while the port buffer address is held high (PADR), i.e. from point (11) to point (15) in FIG. 11.

The remainder of the period during which RDY is low, point (5) to point (9) in FIG. 11, represents the time it takes, during the polling of the port buffers by the controller, to reach this port buffer after its transfer request has been asserted. This latter time period is variable to the extent of the number of other port buffers requesting concurrent transfers in the same controller polling cycle. It will be noted that there is a significant difference between the time noted with respect to FIG. 11 to enter data from an external subsystem to the port buffer, and the time required to transfer data from the port buffer to the controller. In a standard, and practical, application, the data may be entered into the port buffer under 8080 or 8085 type microprocessor (software) control. By contrast, the transfer between the port buffer and the controller occurs under hardware control. In the preferred embodiment of the invention, the transfer rate of the port buffer/controller will be at least eight times faster than the external subsystem/port buffer transfer capability.

Transfer signal XFR is generated as the result of an existing transfer request TREQ and the port buffer's address PADR. Signal XFR, in turn, generates signal SXFR, which stops the controller polling at the address of this port buffer. Transfer of data between the port buffer and the controller takes place while the address is held. A unique timing relationship must thus exist between TREQ and PADR, before XFR can be generated. This will be clear with reference to the discussion above concerning the generation of signal TREQ. PADR must not be coincident with the initial transition of the ready latch. The setting of the transfer request latch, (see FIG. 5D), is blocked unless PADR is in the low state. This requirement prevents a condition that could occur where, if PADR were about to go low again as TREQ goes high, there may be insufficient time for SXFR to stop the polling sequence. The circuit described effectively prevents such an ambiguous condition from arising.

Chip select signal CS for port buffer memory 208 is generated by signal LD3 and it is therefore synchronous with the latter. Write signal MWR, applied to memory 208, is also generated by LD3. However, MWR is delayed an appropriate time by the circuit shown in FIG. 5E, as explained in connection with the discussion of that Figure. Read signal MRD, applied to memory 208, remains high while the external subsystem is writing data into the port buffer.

At point (9), transfer signal XFR is asserted and remains positive until the end of the negative RDY signal, which occurs at point (14). This causes SXFR (FIG. 6B) to go low and stop counter 524. As a consequence, the port address is held during this interval and signal PADR is asserted throughout. As long as signal XFR remains high, the controller controls the transfer of data from port buffer memory 208 to controller memory 170.

As indicated in FIG. 11, a delay occurs between point (9) and the transfer of the first data byte to the controller memory, shown by the first CS pulse. This delay takes into account the interval required for the specified controller memory address to be loaded. The port buffer polling sequence and the loading operation must both occur before data bytes can actually be transferred to controller memory 170.

As successive bytes are transferred in clock pulse synchronism from the port buffer memory into the controller memory, transfer byte counter 212 is incremented. When the fourth byte is transferred, in the example under consideration at point (14), pulse BTEQ is again generated. The function of this pulse at this particular time is to terminate the WRITE operation by terminating further data transfers between the port buffer and the controller memory. Signal RDY again becomes positive at point (14) and XFR goes low while SXFR goes high. PADR goes low and hence the port buffer address polling is again allowed to continue.

It should be noted that in the WRITE operation described above there is no participation by the external subsystem after the last data byte is entered. It is only necessary that the external subsystem test the state of the ready line, (RDY), when another transfer is desired.

READ OPERATION

1. Port ready for transfer, READ or WRITE: RDY.
2. First control byte entered: LD1·RDY.
3. Second control byte entered: LD2·RDY.
4. Ready disabled-latched: RDY=LD2·RDY·R/W+(-BTEQ·XFR·R/W).
5. Port address not asserted: PADR.
6. Transfer request-latched: TREQ=RDY·PADR.
7. Port address asserted: PADR=PA∅·PA1·PA2·PA3.
8. Transfer enabled: XFR (& SXFR)=TREQ·PADR.
9. Port address held (stop counter in controller).
10. Transfer starting (source) address: XFR.
11. As long as SXFR is true (SXFR), controller controls transfer of data to buffer memory at controller clock rate. Port's "BTEQ" terminates transfer when:
12. Byte count equal to control word byte count: BTEQ.
13. Ready enabled: RDY=BTEQ·XFR. Ready and transfer request latches cleared.
14. Data transferred to subsystem, each byte: LD3·XFR.

In the READ operation tabulated above and illustrated in FIG. 12, control bytes PC-1 and PC-2 are transferred into the port buffer in identical manner as was the case for the WRITE operation. At this point, the port buffer knows that the READ request has been entered (R/W=1). It also knows how many bytes are to be read out from the controller memory and the address where these bytes are stored. As before, control bytes PC-1 and PC-2 are latched in on the rising (leading) edge of pulses LD1 and LD2 respectively, which occur at points (2) and (3) respectively in FIG. 12. Once these control bytes have been transferred to the port buffer from the external subsystem, "ready" signal RDY goes low. The first stage of the 2-stage transfer link established by the port buffer is now cut off by the low state of RDY so that communications between the external subsystem and the port buffer are disabled. Simultaneously, the second stage of the transfer link is enabled, permitting communication between the port buffer and the controller.

The period during which RDY remains low, i.e. the time interval between points (4) and (12) in FIG. 12, is a function of the number of active port buffers simultaneously requesting access to the data contained in the controller memory, as well as the number count of each. In one example of the invention, with four port buffers on the bus, the average access time may be on the order of 200 microseconds. At point (7) port address signal PADR for this port buffer is asserted and will be held until the data transfer from the controller to the port buffer is complete. Simultaneously with PADR, transfer signal XFR goes high and enables the transfer of the requested information from the controller memory to the port buffer.

Successive data bytes are read out of controller memory through bidirectional switch 204 and into port buffer memory 208. Their location in controller memory 170 is determined by the starting address previously latched into latches 190 and 192, which determines the initial count of controller memory address counter 172. Successive bytes so transferred to the port buffer are counted by transfer byte counter 212 and compared by comparator 214 against the number count previously loaded in by control byte PC-1 via latch 190. When the proper number of data bytes has been transferred, signal BTEQ is generated at point (12). This results in the termination of transfer by resetting the transfer request latch 306, which in turn lowers signal XFR, raises SXFR, disables the READ operation of controller memory 170 and releases the polling counter 524. The foregoing action causes signal RDY to be asserted so as to close the second stage and open the first stage of the transfer link. More specifically, further communications between the controller and the port buffer are shut off and communications between the port buffer and the external subsystem are enabled.

Since the subsequent transfer of data from the port buffer to the external subsystem may occur asynchronously, the data read out from the controller memory into the port buffer memory during the first portion of the READ operation is held in the port buffer memory until such time as it is read out upon the initiative of the external subsystem. Such readout occurs by way of bidirectional switch 194 and data bus 188, whenever signal LD3 is asserted by the external subsystem. Thus, on each rising edge of an LD3 pulse a data byte is placed on the data bus to the external subsystem. While LD3 is held high, the external subsystem may read the data byte. Upon each falling edge of the LD3 pulse transfer byte counter 212 is incremented. Upon the rising edge of the next LD3 pulse the subsequent byte will be read out.

It will be clear from the foregoing explanation, that the readout of data bytes from the controller memory occurs in synchronism with the controller clock. However, the subsequent readout from the port buffer memory into the external subsystem is determined by the timing of the LD3 pulse provided by the external subsystem. Since the external subsystem originally provided the number count defined by control byte PC-1 for the READ operation, a count of the data bytes transferred from port buffer memory 208 to the external subsystem is not made. Accordingly no BTEQ signal is generated at the conclusion of the READ operation.

The READ operation discussed above further evidences the closely linked operational relationship between the port buffer and the controller. The controller memory clock is used to read data bytes out of the controller memory and into the port buffer and it thus determines the timing of this operation. The clock also controls port address memory counter 524 which sequentially polls successive port buffers and which stops at a given port buffer address to permit a data transfer to be completed. However, the controller does not keep track of the number of data bytes read out of the controller memory and it depends on the port buffer, specifically on transfer byte counter 212 and comparator 214, to do so.

When the signal derived at the output of EXCLUSIVE OR gate 390 is high, i.e. when LD3X≠PMCS, a low signal is applied to port buffer memory chip select input CS which serves to enable memory 208. The MRD input of port buffer memory 208 imposes a further condition on the operation of this memory. Specifically, the output of EXCLUSIVE OR gates 390 and 386 must both be high before memory 208 is enabled. The additional condition thus requires that the inputs of gate 386 not be the same, i.e. R/W≠XFR. Since XFR is high only for a transfer in the second stage of the transfer link, i.e. between the port buffer and the controller memory, (modes (1) and (4) above), the application of a signal to input MRD assures that the port buffer is not simultaneously involved in a data transfer in both stages, i.e. with both the controller and the subsystem.

Transfer request latch 306, (FIG. 5D), together with ready latch 284 (FIG. 5A), prepares the port buffer for synchronization with the controller so that a data transfer may properly take place. Both of these latches constitute positive edge triggered flip flops in the preferred embodiment of the invention. This means that when the clock input C of either latch goes from ZERO to ONE, the Q output will be forced to correspond to the D input, in this case a high signal level.

In order for ready latch 284 to be latched, the conditions set forth below, which follow from the previous discussion, must be present:

$$LD2(\uparrow) \cdot RDY \cdot R/W + BTEQ(\uparrow) \cdot XFR \cdot R/W$$

If either of the conditions above is present, transfer request latch 306 and signal TREQ can be triggered by ready latch 284 via NAND gate 300 and inverting buffer 304. Such triggering will occur only if the controller is not currently addressing the port buffer, as determined by signal PADR in FIG. 5A. Both the ready latch 284 and the transfer request latch 306 are reset at the completion of a data transfer, i.e. when all data bytes have been transferred, at which time signal BTEQ is generated.

As already discussed, transfer request signal TREQ will be generated by latch 306 only if RDY is disabled and the port buffer address is not present. This is an important requirement since it provides adequate time for transfer signal XFR to stop port address counter 524, (FIG. 6B), at the address of the particular port buffer that is to be addressed. Signal XFR, in turn, goes true when the appropriate port address PADR comes up only if all conditions for a data transfer between the controller memory and the addressed port buffer have been previously met. In a preferred embodiment of the invention a maximum of sixteen substantially identical port buffers are connected to the common node bus of each node. The respective port buffers differ from each other only in the decoding circuitry associated with each port buffer, which decodes the port buffer's unique address from signals PA∅-PA3 to obtain signal PADR.

As discussed above, controller 18 includes a clock oscillator 495 and a connected timing circuit 507, which act to synchronize the various functions of the controller, as well as the data transfers to and from the controller memory. The waveforms generated by these circuits are best explained with reference to FIG. 8. As shown, clock signal CLK, which is derived at the output of oscillator 495, has a frequency twice that of signal HACLK, which is obtained at the Q output of flip flop 508 of timing circuit 507. The latter flip flop can change states only when the clock signal changes from logic ONE to logic ZERO, or on the falling edge of the CLK waveform applied to the C input of flip flop 508. As shown, a slight delay is introduced at this point so that the rising edge of the HACLK waveform trails slightly behind the corresponding falling edge of CLK. As the HACLK signal is applied to clock input C of port address counter 524, the latter counts continuously from 0–15 to poll every port buffer on node bus 15. If a port buffer is ready to transfer, (as indicated by signal TREQ, FIG. 5D), counter 524 will continue to count until that port buffer's address is reached. At that time the port buffer generates a signal SXFR, (FIGS. 5D and 8), which will force port address counter 524 to stop at that address and enable flip flop 512, (FIG. 6B), to change states on the next rising pulse edge of signal HACLK. The Q output of flip flop 512 remains high until signal SXFR again goes high and resets this flip flop.

The high signal state of output Q of flip flop 512 enables flip flop 514 to change state on the next rising pulse edge of the HACLK signal. As is apparent from FIG. 8, the time difference between the change of state of flip flops 512 and 514 is the pulse interval for signal LADR which is derived at the output of NAND gate 516. This pulse loads the initial 10-bit data address into counter units 450, 452 and 454 of memory address counter 172. When flip flop 514 changes states, its Q output goes high. This action enables flip flop 510, due to the connection of its reset input R to the Q output of flip flop 514. Thus, flip flop 510 now changes state with every falling pulse edge of the CLK signal.

The Q output of flip flop 510 generates signal CS, shown in FIG. 8, which is applied to the appropriately designated inputs of the respective memory chips of controller memory 170. The corresponding signal PCMS in FIG. 5C is applied to chip select input CS of port buffer memory 208, by way of EXCLUSIVE OR gate 390 and inverting buffer 378.

As explained in connection with the discussion of FIG. 5C, signal PMCS is also used to pulse port buffer memory inputs MRD on a WRITE instruction. The Q output of flip flop 510 is combined with signal CLK in NAND gate 518 to provide signal CMWRT at its output, shown as signal MWRT and WRT in FIG. 8. One function of signal CMWRT is to clock controller memory address counter 172 on a rising pulse edge, as best shown by the appropriately designated memory input signal waveforms of FIG. 8. A further function of this signal is to clock input MWR of port buffer memory 508 on a READ command. Signal WRT is applied to input R/W of the respective memory chips of controller memory 170, which are enabled by the application of each WRT pulse.

Controller memory address counter 172 comprises three synchronous 4-bit binary counter units 450, 452 and 454 in the preferred embodiment of the invention, which are cascade-connected for a 10-bit output signal. When input GD goes to logic ZERO, signals SA∅–SA9 load these counter units with the initial data address, i.e. the starting address originally provided by control bytes PC-1 and PC-2. Thereafter, the output of each of these counter units is incremented whenever input +1 of counter unit 450 sees a positive going transition of signal CMWRT.

The output of the respective address counter units is applied to the eight memory chips of controller memory 170. In this way, the bytes entered consecutively on lines SD∅–SD9 will be stored at consecutive addresses in the respective memory chips. The latter form a 1024 byte random access memory. The same 10-bit address is placed on the address input A∅–A9 of each chip by controller memory address counter 172. When chip select signal CS goes low, the input address is latched into each memory chip. The output DO of each chip is enabled if R/W remains in a high state, representative of a READ operation. If signal R/W goes to ZERO, chip output DO is disabled and data can then be written into the chip during a WRITE operation.

The time relationships of the respective signals that control the operation of memory 170 will become clear from a consideration of FIG. 9, which illustrates in greater detail some of the waveforms shown in FIG. 8. The various values of specific time intervals called out in these Figures refer to design margins adopted for a specific implementation of the invention and are beyond the scope of the present discussion. It is noted that signal CS has a period of 2t, where $t = 1/f_{osc}$. Although some waveforms appear in both of these Figures, they are not drawn to the same time scale. To provide a frame of reference, point A is indicated in both Figures and marks the instant when the address is latched into controller memory 170.

Assuming that a valid address is applied to memory chips 460–474 of controller memory 170, the memory chip select signal CS is seen to latch this address into the memory on the falling edge of the waveform. As indicated in FIG. 9, valid data is available from the port buffer at this time for readout from the latter. This data is written into the addressed memory location upon the next-occurring rising edge of WRT. Thereafter the address is incremented by address counter 172, as schematically indicated by the zero point crossover of waveforms A∅–A9. Upon the occurrence of the next falling edge of signal CS, the incremented address is latched into controller memory 170. Subsequent valid data which is read out of the port buffer can be written into the newly addressed memory locations.

During the readout of controller memory 170, the address of the particular memory location which is to be read out, is again latched into this memory on the falling edge of waveform CS, i.e. at point A. Shortly thereafter, data from the addressed location becomes available and it is read out on the next falling edge of clock pulse CLK and transferred to the port buffer.

From the foregoing explanation of a preferred embodiment, it will be clear that the invention lends itself to different variations, changes and substitutions. For example, the invention is not limited to the use of 16 port buffers per communication node. Thus, counter 524 may be modified to provide expanded port addressing which could accommodate more than 16 port buffers on the common node bus. It is also feasible to assign more than one address to a given port buffer in order to enhance its priority with respect to other port buffers regarding access to the controller. In such a case, the decoder of the port buffer in question will provide a PADR signal whenever any of the addresses assigned to it comes up at the output of counter 524.

Although 1K controller memory chips, (actually 1024 bits), are used in a preferred embodiment of the invention, the controller memory could be readily expanded to use chips having greater storage capacity, e.g. 2K, 4K chips, etc. Likewise, information transfers can be expanded from the present maximum of 32 bytes, e.g. to 64 or 128 bytes, etc. Further, the 8-bit information bus could be expanded to handle 16 bits, or even 32 bits of data at a time. In such a case, the two control bytes could be entered with a single transfer.

The port buffers, which are illustrated and discussed herein as separate circuits, may be incorporated into direct conversion circuits if desired, for example analog/digital or digital/analog converters in addition to their present function of converting between different protocols such as parallel/serial, asynchronous/synchronous, etc.

While the logical implementation of the invention shown utilizes CMOS logic families, other types of component technology may be used. For example, TTL technology may be used if it is desired to increase the operating speed of the system.

Depending on the particular operating environment, it may be desirable to use various signals developed during the operation of the system disclosed herein for different purposes, e.g. as operation indicators, or to drive various external devices. For example, signal BTEQ is developed during the READ and WRITE operations whenever the byte count of the transferred bytes equals the number count loaded in by the control byte PC-1. Such a signal, or a derivative thereof, could be used in the operation of an external interrupt-driven system to initiate direct memory access to appropriately designed external computer systems.

It will be clear fom the discussion above that the communication system disclosed herein provides an economical, simple and flexible arrangement for dealing with the problem of enabling the respective components of a distributed control system to communicate with each other without any interruption of the ongoing operations. As discussed above, prior art systems of this type are forced to establish multiple priority levels to deal with interruptions of ongoing operations, which increases the complexity and cost of implementing, operating and maintaining such systems. Moreover, the present invention avoids contention between competing subsystems for access to the communication lines and it can readily accommodate additions and deletions with respect to the distributed control arrangement with which it is associated.

From the foregoing discussion of the communication system which forms the subject matter of the present invention, it will be apparent that numerous substitutions, variations, changes and equivalents will now occur to those skilled in the art, all of which fall within the true spirit and scope embraced by the invention. Accordingly, it is intended that the invention be limited only by the scope of the appended claims.

APPENDIX A

```
LOC   OBJ        LINE        SOURCE STATEMENT

1   $MACROFILE PAGEWIDTH<80> MOD85
                  2   ;COMM PRIMARY STATION MAIN PROGRAM
                  3   ;THIS PROGRAM WILL READ FROM ONE STA-
                  4   ;STATION AND WRITE TO THREE. FRAME COUNT
                  5   ;AND DATA BYTE COUNT ARE VARIABLE.
                  6   ;THE SHIFTING BIT HAS BEEN INCLUDED.
                  7
                  8             NAME DATA
                  9   $         INCLUDE(:F1:PSSMAC.SRC)
              =  10   ;MACROFILE PAGEWIDTH<80> MOD85
              =  11   ;COMM PRIMARY STATION MACRO FILE(NO END)
              =  12
80E9          =  13   ACKN  EQU 80E9H          ;EXPECTED ACKNOWLEDGE
80E8          =  14   BALT  EQU 80E8H          ;UTILITY PATTERN FOR CHSN
80D3          =  15   BYCNT EQU 80D3H          ;FRAME BYTE COUNT
80EE          =  16   CRBC  EQU 80EEH          ;CONTROL RCVD BYTE CNT
80C8          =  17   CRVC  EQU 80C8H          ;START OF CONTROL RCVD FRAME
80EC          =  18   CSCS  EQU 80ECH          ;CONTROL FRM STATION STATUS
80ED          =  19   CSTA  EQU 80EDH          ;CONTROL FRM RECEIVER STATUS
80D2          =  20   CTBC  EQU 80D2H          ;CONTROL XMTD BYTE COUNT
80CD          =  21   CXMT  EQU 80CDH          ;START OF CONTROL XMTD FRAME
80E7          =  22   CYCL  EQU 80E7H          ;CYCLE COUNTER
80E3          =  23   ECNT  EQU 80E3H          ;ERROR COUNT-LAST CYCLE
80E2          =  24   FAULT EQU 80E2H          ;FAULTS THIS SUB-CYCLE
80E1          =  25   FMCNT EQU 80E1H          ;FRAME COUNT PER TRANSMISSION
8000          =  26   FRMA  EQU 8000H          ;FIRST FRAME IN DLB-TOP OF RAM
80E0          =  27   LFRM  EQU 80E0H          ;LAST FRAME ADDRESS,XMT OR RCV
80DF          =  28   NEST  EQU 80DFH          ;NEXT AND LAST FLAGS
80E4          =  29   DBCNT EQU 80E4H          ;SPECIFIED DATA BYTE COUNT
80DE          =  30   DLYA  EQU 80DEH          ;UTILITY COUNTER
80DD          =  31   DLYB  EQU 80DDH          ;MAJOR CYCLE DELAY
80E6          =  32   DISPA EQU 80E6H          ;DISPLAY PORT A BUFFER
80E5          =  33   DISPB EQU 80E5H          ;DISPLAY PORT B BUFFER
C000          =  34   RCVD  EQU 0C000H         ;RECEIVED DATA REGISTER
C800          =  35   RCVS  EQU 0C800H         ;RECEIVED STATUS REGISTER
80EA          =  36   RPCNT EQU 80EAH          ;VAL OF FRAME CNTR ON REPEAT REQ
80EB          =  37   RPFRM EQU 80EBH          ;VAL OF FRAME REF ON REP REQ
80DB          =  38   STADD EQU 80DBH          ;STATION ADDRESS (NUMBER)
80D4          =  39   STCNT EQU 80D4H          ;STATION COUNT
80DC          =  40   SHBT  EQU 80DCH          ;SHIFTING BIT FOR 1023
80D9          =  41   STRTH EQU 80D9H          ;STARTING ADDRESS, HI-ORD
80D8          =  42   STRTL EQU 80D8H          ;STARTING ADDRESS, LO-ORD
80D7          =  43   TORQ  EQU 80D7H          ;TIME OUT AND REPEAT COUNTER
80D5          =  44   TSTP  EQU 80D5H          ;TEST A & B FAULT LIST
80D6          =  45   TSTC  EQU 80D6H          ;TEST CYCLE
80DA          =  46   STAT  EQU 80DAH          ;LOW ORDER ADDR OF STATUS BYTE
D000          =  47   XMTD  EQU 0D000H         ;TRANSMITTER DATA REGISTER
              =  48
              =  49   ;EXTRN XMTCD,RCVCD,FDADD,MSGCHK
              =  50   ;EXTRN SNRM,IFRMS,READ,WRITE
              =  51   ;EXTRN SBTST,TEST
              =  52
              =  53   ;SUBROUTINE  LOCATIONS
              =  54   ;XMTCD 4000
              =  55   ;RCVCD 406A
              =  56   ;FDADD 41A8
              =  57   ;MSGCHK 4277
              =  58   ;TEST 4482
              =  59   ;SNRM 4565
              =  60   ;IFRMS 45B1
              =  61   ;READ 461E
              =  62   ;WRITE 475C
              =  63   ;SBTST 41F2
              =  64
```

```
=   65  START MACRO
=   66          LOCAL NEXT
=   67          LXI  SP,80FFH
=   68          MVI  A,0FH
=   69          OUT  02H           ;SET DATA DIR.-DISP. CONT. (00)
=   70          MVI  A,0FFH
=   71          OUT  03H           ;SET DATA DIR.-STA. CONT. (01)
=   72          OUT  43H           ;SET DATA DIR.-ERROR STORAGE(41)
=   73          MVI  A,0F0H
=   74          OUT  42H           ;SET DATA DIR.-AUX. PANEL(40)
=   75          MVI  A,03H
=   76          OUT  80H           ;SET DATA DIR. (81,82,83)
=   77          MVI  A,08H
=   78          STA  0E800H        ;SET PRIMARY STATION MODE
=   79          MVI  A,01H
=   80          STA  SHBT          ;SET SHBT PATTERN FOR 1023
=   81          STA  CYCL          ;INITIALIZE CYCLE COUNT
=   82          STA  TSTC          ;INITIALIZE TEST CYCLE COUNT
=   83          STA  STCNT         ;INITIALIZE STATION COUNT
=   84          MVI  A,0AAH
=   85          STA  BALT          ;SET CHANNEL CHANGE UTILITY
=   86          XRA  A
=   87          OUT  00H           ;CLEAR DISPLAY CONTROL
=   88          STA  FAULT         ;CLEAR FAULT COUNT
=   89          JMP  START1        ;STA., ETC.
=   90          ORG  0038H
=   91          JMP  0000H
=   92  START1  LDA  CYCL          ;CYCLE COUNT
=   93          DCR  A
=   94          STA  CYCL
=   95          JNZ  NEXT
=   96          XRA  A
=   97          OUT  41H           ;CLEAR ERROR STORAGE(DPE&CRC)
=   98          LDA  SHBT
=   99          RLC
=  100          STA  SHBT
=  101          MVI  A,0AH         ;TEMP. CYCLE COUNT.(CHANGE TO
=  102          STA  CYCL          ;CHANGE RATE OF SHBT
=  103  NEXT:   CALL SBTST
=  104          XRA  A
=  105          STA  ECNT          ;CLEAR CYCLE ERROR COUNT
=  106          LDA  BALT          ;CHANNEL CHANGE UTILITY
=  107          RLC
=  108          STA  BALT
=  109          ANI  20H
```

LOC   OBJ      LINE        SOURCE STATEMENT

```
=  110          OUT  01H           ;SET CHANNEL
=  111          ENDM
=  112
=  113  COMSYS MACRO
=  114                             ;READ LOC. 0-63 FROM TURBINE
=  115                             ;AUTO-START TO SGC A AND B;
=  116                             ;READ LOC. 64-95 FROM SGC A
=  117                             ;TO STC AND SGC B
=  118          MVI  A,03H
=  119          STA  STCNT         ;STATION COUNT=3
=  120          MVI  A,00H         ;1ST SEQUENCE
=  121          STA  STRTH
=  122          STA  STRTL         ;STARTING ADDR.=0
=  123          MVI  A,32
=  124          STA  DBCNT         ;DATA BYTE COUNT=32
=  125          MVI  A,02H
=  126          STA  FMCNT         ;FRAME COUNT=2
=  127          MVI  A,01H
=  128          STA  STADD         ;STATION ADDRESS, 0F(STC)
=  129          CALL READ          ;READ ADDR. 0 TO 63 (000-03F)
=  130          MVI  A,02H
=  131          STA  STADD         ;STATION ADDRESS, 5A(SGC-A)
=  132          CALL WRITE         ;WRITE TO ADDR. 0 TO 63
=  133          MVI  A,03H
```

```
-       = 134               STA STADD       ;STATION ADDRESS, BB(SGC-B)
-       = 135                               ;LOCATED IN LAB
-       = 136               CALL WRITE      ;WRITE TO ADDR. 0 TO 63
-       = 137               MVI A,00H       ;2ND SEQUENCE
-       = 138               STA STRTH
-       = 139               MVI A,40H
-       = 140               STA STRTL       ;STARTING ADDRESS=64
-       = 141               MVI A,32
-       = 142               STA DBCNT       ;DATA BYTE COUNT=32
-       = 143               MVI A,01H
-       = 144               STA FMCNT       ;FRAME COUNT=1
-       = 145               MVI A,02H
-       = 146               STA STADD       ;2ND STA. ADDR. 5A, SGC A
-       = 147               CALL READ       ;READ ADDR. 64-95 (040-05F)
-       = 148               MVI A,01H
-       = 149               STA STADD       ;1ST STA. ADDR. 0F, STC
-       = 150               CALL WRITE      ;WRITE TO ADDR. 64-95
-       = 151               MVI A,03H
-       = 152               STA STADD       ;3RD STA. ADDR. BB, SGC B
-       = 153               CALL WRITE      ;WRITE TO ADDR. 64-95
-       = 154               MVI H,0FFH      ;7US DEL. PER H INC
-       = 155               MVI L,02H       ;1.8MS DEL. PER L INC
-       = 156       STEPA:DCR H
-       = 157               JZ STEPB
-       = 158               JMP STEPA
-       = 159       STEPB:DCR L
-       = 160               JZ BEGEND
-       = 161               JMP STEPA
-       = 162               ENDM
-       = 163
-       = 164
-       = 165
-       = 166 FINISH MACRO
-       = 167               LOCAL TSTIN,TSTAT,TSTWO,THEND,TSTCON
-       = 168               LOCAL CLRA,CLRB,CLRC,XX
-       = 169       BEGEND:IN 40H           ;GET AUX PANEL IN
-       = 170               CMA
-       = 171               ANI 07H         ;MASK FOR ANY INPUT
-       = 172               JZ THEND        ;IF NONE THEN BYPASS DISPLAY
-       = 173               ANI 04H         ;ELSE MASK FOR STATUS REQ.
-       = 174               JZ TSTIN        ;IF NOT STATUS THEN GO TO
-       = 175                               ;TEST REQUESTS
-       = 176               IN 00H          ;GET DISPLAY CONTROL
-       = 177               ANI 11H         ;MASK FOR XFR REQ & ACK
-       = 178               ORA A
-       = 179               JZ TSTAT        ;IF XFR REQ & ACK ARE BOTH
-       = 180                               ;NOT SET THEN LOAD DISPLAY
-       = 181               CPI 11H
-       = 182               JNZ TSTCON      ;IF XFR REQ OR ACK IS NOT
-       = 183                               ;SET THEN BYPASS STAT DISPLAY
-       = 184               XRA A           ;ELSE RESET XFR REQ(BOTH MUST
-       = 185                               ;BE SET)
-       = 186               OUT 00H
-       = 187               IN 40H          ;GET AUX PANEL INPUTS
-       = 188               ANI 0BFH        ;ACKNOWLEDGE STAT REQUEST
-       = 189               ORI 80H         ;AND CLEAR ALARM
-       = 190               OUT 40H         ;SETTING BIT 6(REVERSE LOGIC)
-       = 191               JMP TSTCON      ;GO TO TEST CONTINUE
-       = 192       TSTAT:LDA DISPA         ;GET PORT A DISPLAY BUFFER
-       = 193               OUT 81H         ;OUT TO DISPLAY SUBSYSTEM
-       = 194               LDA DISPB       ;GET PORT B
-       = 195               OUT 82H         ;OUT TO DISPLAY
-       = 196               MVI A,05H       ;DATA/DATA DISPLAY CONTROL
-       = 197               OUT 00H         ;OUTPUT CODE TO DISPLAY
-       = 198               JMP TSTCON
-       = 199       TSTIN:IN 40H            ;GET AUX PANEL INPUTS
-       = 200               CMA
-       = 201               ANI 01H         ;MASK FOR TEST ONE
-       = 202               JZ TSTWO        ;IF NOT TEST ONE THEN TST TWO
-       = 203               IN 01H          ;ELSE GET STATION CONTROL
-       = 204               ORI 20H         ;SET CHANNEL SELECT FOR TST 1
-       = 205               OUT 01H
```

```
= 206            CALL TEST          ;TEST SUBROUTINE
= 207            JMP TSTCON
= 208   TSTWO   IN 01H              ;GET STATION CONTROL
= 209            ANI 0DFH           ;RESET CHANNEL SELECT FOR
= 210            OUT 01H            ;TEST TWO
= 211            CALL TEST
= 212            JMP TSTCON
= 213   THEND   LDA STCNT           ;GET STATION COUNT
= 214            STA TSTC           ;REINITIALIZE TEST CYCLE CNT
= 215            IN 40H             ;GET AUX PANEL IO
= 216            ORI 70H            ;CLEAR STAT AND TEST REQUEST
= 217            OUT 40H            ;PUSH BUTTON LAMPS
= 218            XRA A              ;NULL
= 219            OUT 00H            ;CLR ANY TRANSFER REQUEST
- 220                               ;THE FOLLOWING CLEARS THE ALARM AND
= 221                               ;SETS THE DISPLAY BUFFER IN LIEU OF
= 222                               ;A STAT REQUEST. IF NO ERROR FLAGS
= 223                               ;HAVE BEEN SET DURING A FULL TRANS-
= 224                               ;MISSION CYCLE. IF FLAGS HAVE BEEN
= 225                               ;SET THEN THEY ARE SIMPLY REINIT'ZD
= 226   TSTCON  LDA TORQ            ;GET TM OUT & REPT REQS
= 227            ANI 0A0H           ;MASK FOR CURRENT TIME OUTS
= 228            JNZ CLRA           ;IF T.O. THEN CLEAR BY CHANL
= 229            LDA TORQ
= 230            ANI 50H            ;MASK FOR LAST CY. T.O.
= 231            JNZ XX             ;ELSE NEXT TEST
= 232            LDA TORQ
= 233            ANI 0FH            ;MASK FOR REPT REQS
= 234            JNZ CLRC           ;IF REPT REQS THEN REINIT
= 235            STA TORQ           ;ELSE CLEAR ALL OF TORQ
= 236            LDA FAULT          ;GET FAULT FLAGS
= 237            ORA A              ;COMPARE WITH NO FAULT
= 238            JNZ CLRC           ;IF FAULT THEN REINIT
= 239            IN 40H             ;GET AUX PANEL IO
= 240            ORI 80H            ;CLEAR ALARM(NEG LOGIC)
= 241            OUT 40H            ;EXECUTE ALARM OFF
= 242            MVI A,19H          ;DISPLAY CODE FOR ALL STATS OK
= 243            STA DISPA          ;SET DISPLAY PORT A BUFFER
= 244            XRA A              ;NULL
= 245            STA DISPB          ;CLR DISPLAY PORT B BUFFER
= 246            JMP START1         ;RETURN TO TOP OF CYCLE
= 247   CLRA    ANI 20H             ;MASK FOR CURRENT CH A T.O.
= 248            JNZ CLRB           ;IF A THEN CHECK B ALSO
= 249            LDA TORQ
= 250            ANI 0CFH           ;CLEAR CH A TIME OUTS
= 251            STA TORQ
= 252   CLRB    LDA TORQ
= 253            ANI 80H            ;MASK FOR CURRENT CH B T.O.
= 254            JNZ CLRC           ;IF B THEN REINITIALIZE
= 255            LDA TORQ
= 256            ANI 3FH            ;CLEAR CH B TIME OUTS
= 257            STA TORQ
= 258   CLRC    LDA TORQ
= 259            ANI 50H            ;CLEAR CURRENT T.O.
= 260            STA TORQ
= 261            XRA A
= 262            STA FAULT
= 263            JMP START1
= 264   XX      XRA A
= 265            STA TORQ
= 266            STA FAULT
= 267            JMP START1
= 268            ENDM
  269            EXTRN XMTCD,RCVCD,FDADD
  270            EXTRN MSGCHK,SNRM,IFRMS,READ
  271            EXTRN WRITE,FRTST,TEST
  272
  273            ASEG
  274            ORG 0000H
```

```
                    275        START
0000 31FF80         276+       LXI  SP,'80FFH
0003 3E0F           277+       MVI  A,0FH
0005 D302           278+       OUT  02H              ;SET DATA DIR -DISP  CONT. (00)
0007 3EFF           279+       MVI  A,0FFH
0009 D303           280+       OUT  03H              ;SET DATA DIR -STA  CONT. (01)
000B D343           281+       OUT  43H              ;SET DATA DIR -ERROR STORAGE(41)
000D 3EF0           282+       MVI  A,0F0H
000F D342           283+       OUT  42H              ;SET DATA DIR -AUX. PANEL(40)
0011 3E03           284+       MVI  A,03H
0013 D380           285+       OUT  80H              ;SET DATA DIR (81,82,83)
0015 3E08           286+       MVI  A,08H
0017 3200E8         287+       STA  0E800H           ;SET PRIMARY STATION MODE
001A 3E01           288+       MVI  A,01H
001C 32DC80         289+       STA  SHBT             ;SET SHBT PATTERN FOR 1023
001F 32E780         290+       STA  CYCL             ;INITIALIZE CYCLE COUNT
0022 32D680         291+       STA  TSTC             ;INITIALIZE TEST CYCLE COUNT
0025 32D480         292+       STA  STCNT            ;INITIALIZE STATION COUNT
0028 3EAA           293+       MVI  A,0AAH
002A 32E880         294+       STA  BALT             ;SET CHANNEL CHANGE UTILITY
002D AF             295+       XRA  A
002E D300           296+       OUT  00H              ;CLEAR DISPLAY CONTROL
0030 32E280         297+       STA  FAULT            ;CLEAR FAULT COUNT
0033 C33B00         298+       JMP  START1           ;STA , ETC.
0038               299+        ORG  0038H
0038 C30000         300+       JMP  0000H
003B 3AE780         301+ START1:LDA CYCL             ;CYCLE COUNT
003E 3D             302+       DCR  A
003F 32E780         303+       STA  CYCL
0042 C25400         304+       JNZ  ??0001
0045 AF             305+       XRA  A
0046 D341           306+       OUT  41H              ;CLEAR ERROR STORAGE(DPE&CRC)
0048 3ADC80         307+       LDA  SHBT
004B 07             308+       RLC
004C 32DC80         309+       STA  SHBT
004F 3E0A           310+       MVI  A,0AH            ;TEMP. CYCLE COUNT (CHANGE TO
0051 32E780         311+       STA  CYCL             ;CHANGE RATE OF SHBT
0054 CD0000    E    312+ ??0001:CALL SBTST
0057 AF             313+       XRA  A
0058 32E380         314+       STA  ECNT             ;CLEAR CYCLE ERROR COUNT
005B 3AE880         315+       LDA  BALT             ;CHANNEL CHANGE UTILITY
005E 07             316+       RLC
005F 32E880         317+       STA  BALT
0062 E620           318+       ANI  20H
0064 D301           319+       OUT  01H              ;SET CHANNEL
                    320        ASEG
                    321        COMSYS
                    322+                             ;READ LOC. 0-63 FROM TURBINE
                    323+                             ;AUTO-START TO SGC A AND B;
                    324+                             ;READ LOC. 64-95 FROM SGC A
                    325+                             ;TO STC AND SGC B.
0066 3E03           326+       MVI  A,03H
0068 32D480         327+       STA  STCNT            ;STATION COUNT=3
006B 3E00           328+       MVI  A,00H            ;1ST SEQUENCE
006D 32D980         329+       STA  STRTH
0070 32D880         330+       STA  STRTL            ;STARTING ADDR =0
0073 3E20           331+       MVI  A,32
0075 32E480         332+       STA  DBCNT            ;DATA BYTE COUNT=32
0078 3E02           333+       MVI  A,02H
007A 32E180         334+       STA  FMCNT            ;FRAME COUNT=2
007D 3E01           335+       MVI  A,01H
007F 32DB80         336+       STA  STADD            ;STATION ADDRESS. 0F(STC)
0082 CD0000    E    337+       CALL READ             ;READ ADDR. 0 TO 63 (000-03F)
0085 3E02           338+       MVI  A,02H
0087 32DB80         339+       STA  STADD            ;STATION ADDRESS. 5A(SGC-A)
008A CD0000    E    340+       CALL WRITE            ;WRITE TO ADDR. 0 TO 63
008D 3E03           341+       MVI  A,03H
008F 32DB80         342+       STA  STADD            ;STATION ADDRESS. BB(SGC-B)
                    343+                             ;LOCATED IN LAB
0092 CD0000    E    344+       CALL WRITE            ;WRITE TO ADDR. 0 TO 63
0095 3E00           345+       MVI  A,00H            ;2ND SEQUENCE
0097 32D980         346+       STA  STRTH
```

```
009A 3E40        347+           MVI  A,40H
009C 320B80      348+           STA  STRTL          ;STARTING ADDRESS=64
009F 3E20        349+           MVI  A,32
00A1 32E480      350+           STA  DBCNT          ;DATA BYTE COUNT=32
00A4 3E01        351+           MVI  A,01H
00A6 32E180      352+           STA  FMCNT          ;FRAME COUNT=1
00A9 3E02        353+           MVI  A,02H
00AB 320B80      354+           STA  STADD          ;2ND STA. ADDR. 5A; SGC A
00AE CD0000   E  355+           CALL READ           ;READ ADDR. 64-95 (040-05F)
00B1 3E01        356+           MVI  A,01H
00B3 320B80      357+           STA  STADD          ;1ST STA. ADDR. 0F; STC
00B6 CD0000   E  358+           CALL WRITE          ;WRITE TO ADDR. 64-95
00B9 3E03        359+           MVI  A,03H
00BB 320B80      360+           STA  STADD          ;3RD STA. ADDR. BB; SGC B
00BE CD0000   E  361+           CALL WRITE          ;WRITE TO ADDR. 64-95
00C1 26FF        362+           MVI  H,0FFH         ;7US DEL. PER H INC
00C3 2E02        363+           MVI  L,02H          ;1.8MS DEL. PER L INC
00C5 25          364+   STEPA:  DCR  H
00C6 CACC00      365+           JZ   STEPB
00C9 C3C500      366+           JMP  STEPA
00CC 2D          367+   STEPB:  DCR  L
00CD CAD300      368+           JZ   BEGEND
00D0 C3C500      369+           JMP  STEPA
                 370            ASEG
                 371            FINISH
00D3 DB40        372+   BEGEND: IN   40H            ;GET AUX PANEL IN
00D5 2F          373+           CMA
00D6 E607        374+           ANI  07H            ;MASK FOR ANY INPUT
00D8 CA2C01      375+           JZ   ??0005         ;IF NONE THEN BYPASS DISPLAY
00DB E604        376+           ANI  04H            ;ELSE MASK FOR STATUS REQ.
00DD CA0C01      377+           JZ   ??0002         ;IF NOT STATUS THEN GO TO
                 378+                               ;TEST REQUESTS
00E0 DB00        379+           IN   00H            ;GET DISPLAY CONTROL
00E2 E611        380+           ANI  11H            ;MASK FOR XFR REQ & ACK
00E4 B7          381+           ORA  A
00E5 CAFE00      382+           JZ   ??0003         ;IF XFR REQ & ACK ARE BOTH
                 383+                               ;NOT SET THEN LOAD DISPLAY
00E8 FE11        384+           CPI  11H
00EA C23B01      385+           JNZ  ??0006         ;IF XFR REQ OR ACK IS NOT
                 386+                               ;SET THEN BYPASS STAT DISPLAY
00ED AF          387+           XRA  A              ;ELSE RESET XFR REQ(BOTH MUST
                 388+                               ;BE SET)
00EE D300        389+           OUT  00H
00F0 DB40        390+           IN   40H            ;GET AUX PANEL INPUTS
00F2 E6BF        391+           ANI  0BFH           ;ACKNOWLEDGE STAT REQUEST
00F4 F680        392+           ORI  80H            ;AND CLEAR ALARM
00F6 D340        393+           OUT  40H            ;SETTING BIT 6(REVERSE LOGIC)
00F8 C33B01      394+           JMP  ??0006         ;GO TO TEST CONTINUE
00FB 3AE680      395+   ??0003  LDA  DISPA          ;GET PORT A DISPLAY BUFFER
00FE D381        396+           OUT  81H            ;OUT TO DISPLAY SUBSYSTEM
0100 3AE580      397+           LDA  DISPB          ;GET PORT B
0103 D382        398+           OUT  82H            ;OUT TO DISPLAY
0105 3E05        399+           MVI  A,05H          ;DATA/DATA DISPLAY CONTROL
0107 D300        400+           OUT  00H            ;OUTPUT CODE TO DISPLAY
0109 C33B01      401+           JMP  ??0006
010C DB40        402+   ??0002: IN   40H            ;GET AUX PANEL INPUTS
010E 2F          403+           CMA
010F E601        404+           ANI  01H            ;MASK FOR TEST ONE
0111 CA2001      405+           JZ   ??0004         ;IF NOT TEST ONE THEN TST TWO
0114 DB01        406+           IN   01H            ;ELSE GET STATION CONTROL
0116 F620        407+           ORI  20H            ;SET CHANNEL SELECT FOR TST 1
0118 D301        408+           OUT  01H
011A CD0000   E  409+           CALL TEST           ;TEST SUBROUTINE
011D C33B01      410+           JMP  ??0006
0120 DB01        411+   ??0004  IN   01H            ;GET STATION CONTROL
0122 E6DF        412+           ANI  0DFH           ;RESET CHANNEL SELECT FOR
0124 D301        413+           OUT  01H            ;TEST TWO
0126 CD0000   E  414+           CALL TEST
0129 C33B01      415+           JMP  ??0006
012C 3AD480      416+   ??0005  LDA  STCNT          ;GET STATION COUNT
012F 32D680      417+           STA  TSTC           ;REINITIALIZE TEST CYCLE CNT
0132 DB40        418+           IN   40H            ;GET AUX PANEL IO
```

```
0134 F670      419+            ORI 70H          ;CLEAR STAT AND TEST REQUEST
0136 D340      420+            OUT 40H          ;PUSH BUTTON LAMPS
0138 AF        421+            XRA A            ;NULL
0139 D300      422+            OUT 00H          ;CLEAR ANY TRANSFER REQUEST
               423+                             ;THE FOLLOWING CLEARS THE ALARM AND
               424+                             ;SETS THE DISPLAY BUFFER IN LIEU OF
               425+                             ;A STAT REQUEST, IF NO ERROR FLAGS
               426+                             ;HAVE BEEN SET DURING A FULL TRANS-
               427+                             ;MISSION CYCLE. IF FLAGS HAVE BEEN
               428+                             ;SET THEN THEY ARE SIMPLY REINIT'ZD
013B 3AD780    429+??0006:     LDA TORQ         ;GET TM OUT & REPT REQS
013E E6A0      430+            ANI 0A0H         ;MASK FOR CURRENT TIME OUTS
0140 C26F01    431+            JNZ ??0007       ;IF T.O. THEN CLEAR BY CHANL
0143 3AD780    432+            LDA TORQ
0146 E650      433+            ANI 50H          ;MASK FOR LAST CY. T.O.
0148 C29B01    434+            JNZ ??0010
014B 3AD780    435+            LDA TORQ         ;ELSE NEXT TEST
014E E60F      436+            ANI 0FH          ;MASK FOR REPT REQS
0150 C28C01    437+            JNZ ??0009       ;IF REPT REQS THEN REINIT
0153 32D780    438+            STA TORQ         ;ELSE CLEAR ALL OF TORQ
0156 3AE280    439+            LDA FAULT        ;GET FAULT FLAGS
0159 B7        440+            ORA A            ;COMPARE WITH NO FAULT
015A C28C01    441+            JNZ ??0009       ;IF FAULT THEN REINIT
015D DB40      442+            IN 40H           ;GET AUX PANEL IO
015F F680      443+            ORI 80H          ;CLEAR ALARM(NEG LOGIC)
0161 D340      444+            OUT 40H          ;EXECUTE ALARM OFF
0163 3E19      445+            MVI A,19H        ;DISPLAY CODE FOR ALL STATS OK
0165 32E680    446+            STA DISPA        ;SET DISPLAY PORT A BUFFER
0168 AF        447+            XRA A            ;NULL
0169 32E580    448+            STA DISPB        ;CLR DISPLAY PORT B BUFFER
016C C33B00    449+            JMP START1       ;RETURN TO TOP OF CYCLE
016F E620      450+??0007:     ANI 20H          ;MASK FOR CURRENT CH. A T.O.
0171 C27C01    451+            JNZ ??0008       ;IF A THEN CHECK B ALSO
0174 3AD780    452+            LDA TORQ
0177 E6CF      453+            ANI 0CFH         ;CLEAR CH. A TIME OUTS
0179 32D780    454+            STA TORQ
017C 3AD780    455+??0008:     LDA TORQ
017F E680      456+            ANI 80H          ;MASK FOR CURRENT CH. B T.O.
0181 C28C01    457+            JNZ ??0009       ;IF B THEN REINITIALIZE
0184 3AD780    458+            LDA TORQ
0187 E63F      459+            ANI 3FH          ;CLEAR CH. B TIME OUTS
0189 32D780    460+            STA TORQ
018C 3AD780    461+??0009:     LDA TORQ
018F E650      462+            ANI 50H          ;CLEAR CURRENT T.O.
0191 32D780    463+            STA TORQ
0194 AF        464+            XRA A
0195 32E280    465+            STA FAULT
0198 C33B00    466+            JMP START1
019B AF        467+??0010:     XRA A
019C 32D780    468+            STA TORQ
019F 32E280    469+            STA FAULT
01A2 C33B00    470+            JMP START1
               471             END
```

PUBLIC SYMBOLS

EXTERNAL SYMBOLS
| | | | | | | | |
|---|---|---|---|---|---|---|---|
| FDADD | E 0000 | IFRMS | E 0000 | MSGCHK | E 0000 | RCVCD | E 0000 |
| READ  | E 0000 | SBTST | E 0000 | SNRM   | E 0000 | TEST  | E 0000 |
| WRITE | E 0000 | XMTCD | E 0000 | | | | |

USER SYMBOLS
| | | | | | | | |
|---|---|---|---|---|---|---|---|
| ACKN   | A 80E9 | BALT   | A 80E8 | BEGEND | A 00D3 | BYCNT  | A 80D3 |
| COMSYS | + 0008 | CRBC   | A 80EE | CRVC   | A 80C8 | CSCS   | A 80EC |
| CSTA   | A 80ED | CTBC   | A 80D2 | CXMT   | A 80CD | CYCL   | A 80E7 |
| DBCNT  | A 80E4 | DISPA  | A 80E6 | DISPB  | A 80E5 | DLYA   | A 80DE |
| DLYB   | A 80DD | ECNT   | A 80E3 | FAULT  | A 80E2 | FDADD  | E 0000 |
| FINISH | + 0000 | FMCNT  | A 80E1 | FRMA   | A 8000 | IFRMS  | E 0000 |
| LFRM   | A 80E0 | MSGCHK | E 0000 | NEST   | A 80DF | RCVCD  | E 0000 |

```
RCVD    A C000    RCVS    A C800    READ    E 0000    RPCNT   A 80EA
RPFRM   A 80EB    SBTST   E 0000    SHBT    A 80CC    SNRM    E 0000
STADD   A 80DB    START   + 0000    START1  A 403B    STAT    A 80DA
STCNT   A 80D4    STEPA   A 00C5    STEPB   A 00CC    STRTH   A 80D9
STRTL   A 80D8    TEST    E 0000    TORQ    A 80D7    TSTC    A 80D6
TSTP    A 80D5    WRITE   E 0000    XMTCD   E 0000    XMTD    A D000

ASSEMBLY COMPLETE.   NO ERRORS
           1 $MACROFILE PAGEWIDTH(80) MOD85
           2 ;COMM PRIMARY STATION SUBROUTINE FILE
           3
           4
80E9       5 ACKN  EQU 80E9H            ;EXPECTED ACKNOWLEDGE
80E8       6 BALT  EQU 80E8H            ;UTILITY PATTERN FOR CHSN
80D3       7 BYCNT EQU 80D3H            ;FRAME BYTE COUNT
80EE       8 CRBC  EQU 80EEH            ;CONTROL RCVD BYTE CNT
80C8       9 CRVD  EQU 80C8H            ;START OF CONTROL RCVD FRAME
80EC      10 CSCS  EQU 80ECH            ;CONTROL FRM STATION STATUS
80ED      11 CSTA  EQU 80EDH            ;CONTROL FRM RECEIVER STATUS
80D2      12 CTBC  EQU 80D2H            ;CONTROL XMTD BYTE COUNT
80CD      13 CXMT  EQU 80CDH            ;START OF CONTROL XMTD FRAME
80E7      14 CYCL  EQU 80E7H            ;CYCLE COUNTER
80E3      15 ECNT  EQU 80E3H            ;ERROR COUNT-LAST CYCLE
80E2      16 FAULT EQU 80E2H            ;FAULTS THIS SUB-CYCLE
80E1      17 FMCNT EQU 80E1H            ;FRAME COUNT PER TRANSMISSION
8000      18 FRMA  EQU 8000H            ;FIRST FRAME IN DLB-TOP OF RAM
80E0      19 LFRM  EQU 80E0H            ;LAST FRAME ADDRESS.XMT OR RCV
80DF      20 NEST  EQU 80DFH            ;NEXT AND LAST FLAGS
80E4      21 DBCNT EQU 80E4H            ;SPECIFIED DATA BYTE COUNT
80DE      22 DLYA  EQU 80DEH            ;UTILITY COUNTER
80DD      23 DLYB  EQU 80DDH            ;MAJOR CYCLE DELAY
80E6      24 DISPA EQU 80E6H            ;DISPLAY PORT A BUFFER
80E5      25 DISPB EQU 80E5H            ;DISPLAY PORT B BUFFER
C000      26 RCVD  EQU 0C000H           ;RECEIVED DATA REGISTER
C800      27 RCVS  EQU 0C800H           ;RECEIVED STATUS REGISTER
80EA      28 RPCNT EQU 80EAH            ;VAL OF FRAME CNTR ON REPEAT REQ
80EB      29 RPFRM EQU 80EBH            ;VAL OF FRAME REF ON REPEAT REQ
80DB      30 STADD EQU 80DBH            ;STATION ADDRESS (NUMBER)
80D4      31 STCNT EQU 80D4H            ;STATION COUNT
80CC      32 SHBT  EQU 80CCH            ;SHIFTING BIT FOR 1023
80D9      33 STRTH EQU 80D9H            ;STARTING ADDRESS, HI-ORD
80D8      34 STRTL EQU 80D8H            ;STARTING ADDRESS, LO-ORD
80D7      35 TORQ  EQU 80D7H            ;TIME OUT AND REPEAT COUNTER
80D5      36 TSTP  EQU 80D5H            ;TEST A & B FAULT LIST
80D6      37 TSTC  EQU 80D6H            ;TEST CYCLE
80DA      38 STAT  EQU 80DAH            ;LOW ORDER ADDR OF STATUS BYTE
D000      39 XMTD  EQU 0D000H           ;TRANSMITTER DATA REGISTER
D800      40 XMTS  EQU 0D800H           ;TRANSMITTER CONTROL REGISTER
          41       PUBLIC XMTCD, RCVCD, FDADD, MSGCHK, TEST
          42       PUBLIC SNRM, IFRMS, READ, WRITE, SBTST
          43       ASEG
4000      44       ORG 4000H
          45 XMTCD:
4000 79   46 START1:MOV A,C             ;SET LAST FRAME ADDR
4001 32E080 47     STA LFRM
4004 3AD380 48     LDA BYCNT
4007 67   49       MOV H,A              ;SET BYTE COUNT
4008 1100D0 50     LXI D,XMTD           ;SET OUTPUT POINTER
400B 3E01 51       MVI A,01H
400D 3200D8 52     STA XMTS             ;SET TSOM
4010 DB01 53       IN 01H
4012 F680 54       ORI 80H
4014 D301 55       OUT 01H              ;SET TXE ONLY
4016 3E03 56       MVI A,03H
4018 32DE80 57     STA DLYA
401B 3ADE80 58 DELAY:LDA DLYA           ;DELAY TWO FLAG XMT
401E 3D   59       DCR A                ;43+ MICROSECS
401F 32DE80 60     STA DLYA
4022 00   61       NOP
4023 C21B40 62     JNZ DELAY
4026 0A   63       LDAX B               ;DATA FROM DLB
4027 12   64       STAX D               ;TO XMT REGISTER
```

```
4028 0C          65            INR C              ; INCR. DLB
4029 25          66            DCR H              ; DECR. BYTE COUNT
402A AF          67            XRA A              ; RESET TSOM
402B 3200D8      68            STA XMTS
402E DB83        69   TBEA:    IN 83H             ; TEST XMIT BUFFER EMPTY
4030 E620        70            ANI 20H
4032 CA2E40      71            JZ TBEA
4035 0A          72            LDAX B
4036 12          73            STAX D
4037 0C          74            INR C
4038 25          75            DCR H
4039 C22E40      76            JNZ TBEA
403C DB83        77   STOP:    IN 83H             ; MASK FOR TXBE
403E E620        78            ANI 20H
4040 CA3C40      79            JZ STOP
4043 3E02        80            MVI A,02H          ; SET TEOM
4045 3200D8      81            STA XMTS
4048 DB83        82   TBEB:    IN 83H             ; TEST XMIT BUFFER EMPTY
404A E620        83            ANI 20H
404C CA4840      84            JZ TBEB
404F AF          85            XRA A              ; RESET TEOM
4050 3200D8      86            STA XMTS
4053 DB01        87            IN 01H
4055 E620        88            ANI 20H            ; RESET TXE ONLY
4057 D301        89            OUT 01H
4059 2D          90            DCR L              ; DECR FRAME COUNT. LAST?
405A C8          91            RZ
405B 3AE080      92            LDA LFRM
405E C628        93            ADI 28H            ; SET NEXT FRAME ADDR.
4060 4F          94            MOV C,A            ; DLB
4061 264F        95            MVI H,4FH
4063 25          96   DLYXMT:  DCR H
4064 CA0040      97            JZ START1
4067 C36340      98            JMP DLYXMT
                 99
                100   RCVCD:
406A 79         102   START2:  MOV A,C
406B 32E080     103            STA LFRM           ; SET LAST FRAME ADDRESS
406E 3AD380     104            LDA BYCNT
4071 67         105            MOV H,A
4072 1100C0     106            LXI D,RCVD         ; SET SDLC POINTER TO RECEIVER
4075 DB01       107            IN 01H             ; STATION CONTROL
4077 E6EF       108            ANI 0EFH           ; RST CDPE ONLY
4079 F601       109            ORI 01H            ; SET TXE ONLY
407B D301       110            OUT 01H            ; EXECUTE STATION CONTROL
407D DB83       111   TOTST:   IN 83H             ; TIME OUT TEST
407F E601       112            ANI 01H            ; MASK FOR DA
4081 C2C340     113            JNZ GTDA           ; DA-GET DATA
4084 3ADE80     114            LDA DLYA           ; MINOR CYCLE DELAY CNTR
4087 3D         115            DCR A              ; EACH CYCLE 25 MICROSECS.
4088 32DE80     116            STA DLYA           ; (FF=6.33 MILLISECONDS)
408B CA9140     117            JZ DSTP            ; IF ZERO, MAJOR CYCLE
408E C37D40     118            JMP TOTST          ; NOT TIME OUT YET
4091 DB83       119   DSTP:    IN 83H
4093 E601       120            ANI 01H            ; MASK FOR DA
4095 C2C340     121            JNZ GTDA           ; DA-GET DATA
4098 3ADD80     122            LDA DLYB           ; MAJOR CYCLE DELAY COUNTER
409B 3D         123            DCR A              ; EA CYCLE=6MS
409C 32DD80     124            STA DLYB
409F C27D40     125            JNZ TOTST          ; NOT TIME OUT YET
40A2 DB01       126            IN 01H             ; TIME OUT-STATION CONTROL
40A4 E620       127            ANI 20H            ; CLEAR ALL BUT CHNS
40A6 D301       128            OUT 01H            ; SHUT DOWN RCVR
40A8 3E08       129            MVI A,08H
40AA 32D580     130            STA TSTP           ; SET FLAG FOR TEST RTN
40AD 3AE380     131            LDA ECNT           ; SET ERROR COUNT FOR MEMORY
40B0 3C         132            INR A
40B1 32E380     133            STA ECNT
40B4 C30841     134            JMP TMOUT          ; JUMP TO TIME OUT ROUTINE
40B7 DB83       135   DASA:    IN 83H
40B9 E605       136            ANI 05H            ; TEST FOR DA OR SA
```

```
40BB CAB740    137           JZ DASA         ;NO
40BE E601      138           ANI 01H         ;YES, WHICH
40C0 CACD40    139           JZ LSTAT        ;SA
40C3 1A        140   GTDA:   LDAX D          ;DA, LOAD DATA BYTE
40C4 02        141           STAX B          ;STORE IN DLB
40C5 0C        142           INR C           ;INCR BLB POINTER
40C6 25        143           DCR H           ;DECR BYTE COUNTER
40C7 FACD40    144           JM LSTAT        ;JUMP IF BYTE COUNT ROLL OVER
40CA C3B740    145           JMP DASA
40CD 3AE080    146   LSTAT:  LDA LFRM
40D0 C624      147           ADI 24H
40D2 4F        148           MOV C,A         ;SET DLB PNTR. TO STATUS STRGE
40D3 DB83      149           IN 83H          ;LOAD STATION CONTROL STATUS
40D5 02        150           STAX B
40D6 0C        151           INR C
40D7 3A00C8    152           LDA RCVS        ;LOAD RECEIVER STATUS
40DA 02        153           STAX B
40DB 0C        154           INR C
40DC 7C        155           MOV A,H         ;LOAD RCVD BYTE COUNT
40DD 02        156           STAX B
40DE DB01      157           IN 01H          ;LOAD STATION CONTROL
40E0 E6FE      158           ANI 0FEH        ;RESET RXE ONLY
40E2 F610      159           ORI 10H         ;SET CDPE ONLY
40E4 D301      160           OUT 01H         ;EXECUTE STATION CONTROL
               161   ;SINCE, AT THIS POINT, IT IS KNOWN THAT THE ADDRESSED
               162   ;STATION DID NOT CAUSE A TIME OUT, THE FOLLOWING, DOWN
               163   ;TO LABEL RNFRM, IS TO CLEAR THE LAST STATION ADDRESS
               164   ;PLACED IN DISPB IF IT IS THE SAME AS THE PRESENT STA-
               165   ;TION ADDRESS AND IF THE PREVIOUS FAULT WAS A TIME OUT.
               166   ;THIS IS DONE TO ALLOW THE TIME OUT ROUTINE TO DISTIN-
               167   ;GUISH BETWEEN A STATION FAULT AND A CHANNEL FAULT
               168
40E6 3AD780    169           LDA TORQ        ;GET TIME OUT FLAGS
40E9 E6F0      170           ANI 0F0H        ;MASK FOR CYCLE TIME OUTS
40EB CAFD40    171           JZ RNFRM        ;IF NONE THEN SKIP OVER
40EE 3ACD80    172           LDA CXMT        ;GET PRESENT STATION ADDRESS
40F1 67        173           MOV H,A
40F2 3AE580    174           LDA DISPB       ;GET PREVIOUS FAULT STATION
40F5 BC        175           CMP H           ;COMPARE THEM
40F6 C2FD40    176           JNZ RNFRM       ;IF NOT THE SAME THEN SKIP IT
40F9 AF        177           XRA A           ;ELSE CLEAR PREVIOUS FAULT ADDR.
40FA 32E580    178           STA DISPB
40FD 2D        179   RNFRM:  DCR L           ;DECR. FRAME COUNT
40FE C8        180           RZ              ;IF LAST FRAME THEN RETURN
40FF 3AE080    181           LDA LFRM
4102 C628      182           ADI 28H         ;SET NEXT FRAME
4104 4F        183           MOV C,A
4105 C36A40    184           JMP START2
4108 3AD780    185   TMOUT:  LDA TORQ        ;TIME OUT'S & REPEATS
410B E6F0      186           ANI 0F0H        ;MASK FOR TIME OUTS
410D C24141    187           JNZ TOE         ;IF T.O., THEN NOT FIRST TIME
4110 DB01      188           IN 01H          ;STATION CONTROL, WHICH CHAN.?
4112 E620      189           ANI 20H         ;MASK FOR CHAN. SELECT BIT
4114 CA2241    190           JZ TOB          ;IF NOT THEN CHAN. A
4117 3AD780    191   TOA:    LDA TORQ
411A F630      192           ORI 30H         ;SET TIME OUTS FOR CHAN. B
411C 32D780    193           STA TORQ
411F C32A41    194           JMP TOC
4122 3AD780    195   TOB:    LDA TORQ
4125 F6C0      196           ORI 0C0H        ;SET TIME OUTS FOR CHAN. A
4127 32D780    197           STA TORQ
412A 3ACD80    198   TOC:    LDA CXMT        ;STATION ADDRESS
412D 32E580    199           STA DISPB       ;IN DISPLAY PORT B BUFFER
4130 3AE880    200   TOD:    LDA BALT        ;PATTERN FOR CHAN. CHANGES
4133 07        201           RLC
4134 32E880    202           STA BALT
4137 E620      203           ANI 20H         ;MASK FOR CHAN. SELECT BIT
4139 D301      204           OUT 01H         ;EXECUTE CHAN. CHANGE
413B 3E03      205           MVI A,03H       ;SET LAST
413D 32DF80    206           STA NEST
4140 C9        207           RET
4141 3ACD80    208   TOE:    LDA CXMT        ;STATION ADDRESS
```

```
4144 67            209         MOV H,A
4145 3AE580        210         LDA DISPB       ;PREVIOUS FAULT STATION
4148 BC            211         CMP H
4149 CA7D41        212         JZ TOJ          ;IF SAME STATION
414C DB01          213         IN 01H          ;   WHICH CHAN. ?
414E E620          214         ANI 20H         ;MASK FOR CHAN. SELECT BIT
4150 CA6341        215         JZ TOF          ;IF NOT THEN CHAN. A
4153 3AD780        216     TOM:LDA TORQ
4156 E610          217         ANI 10H         ;MASK FOR PREVIOUS CHAN. B T.O.
4158 CA1741        218         JZ TOA          ;IF NOT A PREVIOUS
415B 3E16          219         MVI A,16H       ;DI   CODE - CHAN. B FAULT
415D 32E680        220         STA DISPA       ;DISPLAY PORT A BUFFER
4160 C37041        221         JMP TOG
4163 3AD780        222     TOF:LDA TORQ
4166 E640          223         ANI 40H         ;MASK FOR CHAN. A T.O.
4168 CA2241        224         JZ TOB          ;IF NOT A PREVIOUS
416B 3E15          225         MVI A,15H       ;DISPL. CODE - CHAN. A FAULT
416D 32E680        226         STA DISPA
4170 AF            227     TOG:XRA A           ;DISPL. CODE - BLANK DISPLAY
4171 32E580        228         STA DISPB
4174 DB40          229     TOH:IN 40H          ;SET ALARM BIT
4176 E670          230         ANI 70H
4178 D340          231         OUT 40H         ;AUX PANEL I/O
417A C33041        232         JMP TOD         ;CHANGE CHAN, LAST & RTN
                   233     ;PROGRAM DIRECTED TO THIS POINT BECAUSE THE PRE-
                   234     ;SENT AND PREVIOUS TIME OUTS WERE THE SAME STATION.
417D 3AD780        235     TOJ:LDA TORQ
4180 E6A0          236         ANI 0A0H        ;MASK FOR THIS CYCLE TIME OUTS
4182 FEA0          237         CPI 0A0H        ;COMPARE FOR BOTH CHANNELS
4184 CA9141        238         JZ TOK          ;IF BOTH STATION FAULT
4187 DB01          239         IN 01H          ;ELSE FIND WHICH CHANNEL
4189 E620          240         ANI 20H         ;MASK FOR CHANNEL SELECT BIT
418B CA6341        241         JZ TOF          ;IF NOT SET THEN CH. A
418E C35341        242         JMP TOM         ;ELSE CH. B
4191 3ACD80        243     TOK:LDA CXMT        ;GET STATION NO.
4194 32E580        244         STA DISPB       ;PUT IN DISPLAY PORT BUFFER
4197 3E05          245         MVI A,05H       ;DISPLAY CODE FOR NO RESPONSE
4199 32E680        246         STA DISPA       ;PUT IN DISPLAY PORT A BUFFER
419C DB40          247         IN 40H
419E E670          248         ANI 70H         ;SET ALARM
41A0 D340          249         OUT 40H
41A2 3EA0          250         MVI A,0A0H      ;SET NEXT
41A4 32DF80        251         STA NEST        ;PUT IN DIRECTIVE
41A7 C9            252         RET
                   253
                   254
                   255     FDADD:              ;FDADD SUBROUTINE
                   256     ;THE FOLLOWING ROUTINE DECODES A STATION NUMBER INTO
                   257     ;A SPECIFIC STATION ADDRESS WITH A LOOK-UP TABLE.
                   258     ;CALLING ROUTINES SET THE L REGISTER WITH S STATION
                   259     ;NUMBER. UPON RETURN, THE CONTENTS OF THE ACCUMULATOR
                   260     ;CONTAIN THE CORRESPONDING ADDRESS.
                   261
                   262
41A8 3E15          263         MVI A,15H       ;MAXIMUM STATION COUNT
41AA BD            264         CMP L           ;COMPARE THIS STATION NUMBER
41AB DAC041        265         JC WRONG        ;IF STATION NUMBER GREATER
                   266                         ;THAN 15
41AE 4D            267         MOV C,L         ;SET STATION COUNTER
41AF 21C241        268         LXI H,ADDR      ;LOAD H & L REGISTER WITH TABLE
                   269                         ;ADDRESS
41B2 AF            270     FAA:XRA A           ;NULL
41B3 B9            271         CMP C           ;COMPARE COUNTER TO ZERO
41B4 C2B841        272         JNZ FAB         ;IF NOT ZERO THEN NEXT COUNT
41B7 E9            273         PCHL            ;PUT TABLE ADDRESS IN PROGRAM
                   274                         ;COUNTER
41B8 0D            275     FAB:DCR C           ;DECR STATION COUNTER
41B9 7D            276         MOV A,L         ;GET TABLE ADDRESS
41BA C603          277         ADI 03H         ;INCREMENT TO NEXT ITEM
41BC 6F            278         MOV L,A         ;NEXT TABLE ITEM ADDRESS
41BD C3B241        279         JMP FAA         ;GO BACK
41C0 AF            280     WRONG:XRA A
```

```
41C1 C9        281        RET
41C2 3E0F      282   ADDR:MVI  A,0FH       ;STATION 1    (ADDR+0)
41C4 C9        283        RET
41C5 3E5A      284        MVI  A,5AH       ;STATION 2    (ADDR+3)
41C7 C9        285        RET
41C8 3EBB      286        MVI  A,0BBH      ;STATION 3    (ADDR+6)
41CA C9        287        RET
41CB 3EEE      288        MVI  A,0EEH      ;STATION 4    (ETC)
41CD C9        289        RET
41CE 3E3C      290        MVI  A,3CH       ;STATION 5
41D0 C9        291        RET
41D1 3E69      292        MVI  A,69H       ;STATION 6
41D3 C9        293        RET
41D4 3EA5      294        MVI  A,0A5H      ;STATION 7
41D6 C9        295        RET
41D7 3EF0      296        MVI  A,0F0H      ;STATION 8
41D9 C9        297        RET
41DA 3E11      298        MVI  A,11H       ;STATION 9
41DC C9        299        RET
41DD 3E22      300        MVI  A,22H       ;STATION 10
41DF C9        301        RET
41E0 3E44      302        MVI  A,44H       ;STATION 11
41E2 C9        303        RET
41E3 3E77      304        MVI  A,77H       ;STATION 12
41E5 C9        305        RET
41E6 3E88      306        MVI  A,88H       ;STATION 13
41E8 C9        307        RET
41E9 3E96      308        MVI  A,96H       ;STATION 14
41EB C9        309        RET
41EC 3EC3      310        MVI  A,0C3H      ;STATION 15
41EE C9        311        RET
41EF 3EDD      312        MVI  A,0DDH      ;STATION 16
41F1 C9        313        RET
               314
               315
               316
               317   SBTST:                ;CALLS XMTCD, RCVCD, FDADD
               318                         ;AND MSGCHK
41F2 AF        319        XRA  A
41F3 32DB80    320        STA  STADD       ;CLEAR STN ADDRESS REFERENCE
41F6 6F        321   AA1:MOV  L,A
41F7 AF        322        XRA  A
41F8 32DF80    323        STA  NEST        ;CLEAR NEXT, LAST & REJECT
41FB 3AD480    324        LDA  STCNT       ;NUMBER OF SECONDARY STATIONS
41FE BD        325        CMP  L
41FF C20342    326        JNZ  BB1
4202 C9        327        RET
4203 CDA841    328   BB1:CALL FDADD        ;CALL FIND STATION ADDRESS
4206 32CD80    329        STA  CXMT        ;STO   STATION ADDRESS
4209 3E05      330        MVI  A,05H       ;SET BYTE COUNT
420B 32D380    331        STA  BYCNT
420E 01CE80    332        LXI  B,CXMT+1
4211 3EF3      333        MVI  A,0F3H      ;SET LINK CONTROL TO TEST
4213 02        334        STAX B
4214 0C        335        INR  C
4215 3E03      336        MVI  A,03H       ;SET TEST CODE TO FIRST
4217 02        337        STAX B
4218 0C        338        INR  C
4219 3AE380    339        LDA  ECNT        ;PRI STN ERROR CNT-PREV. CYCLE
421C 02        340        STAX B
421D 0C        341        INR  C
421E 3ADC80    342        LDA  SHBT        ;SHIFTING BIT
4221 02        343        STAX B
4222 AF        344   DD1:XRA  A           ;CLEAR LAST & REJECT
4223 32DF80    345        STA  NEST
4226 2E01      346        MVI  L,01H       ;SET FRAME COUNT
4228 01CD80    347        LXI  B,CXMT      ;SET DLB POINTER
422B CD0040    348        CALL XMTCD       ;CALL TRANSMIT
422E 3EFF      349        MVI  A,0FFH      ;SET TIME OUT DELAY
4230 32DE80    350        STA  DLYA
4233 3E02      351        MVI  A,02H       ;DLY B TIME
4235 32DD80    352        STA  DLYB
```

```
4238 2E01       353        MVI L,01H          ;SET FRAME COUNT
423A 01C880     354        LXI B,CRVC         ;SET DLB POINTER
423D CD6A40     355        CALL RCVCD         ;CALL RECEIVE ROUTINE
4240 3ADF80     356        LDA NEST           ;NEXT & LAST
4243 E603       357        ANI 03H            ;MASK FOR LAST
4245 C22242     358        JNZ DD1            ;IF LAST
4248 3ADF80     359        LDA NEST
424B E6A0       360        ANI 0A0H           ;MASK FOR NEXT
424D C26D42     361        JNZ EE1
4250 3EF3       362        MVI A,0F3H
4252 32E980     363        STA ACKN           ;LINK CONTR RESPONSE=TEST
4255 2E01       364        MVI L,01H
4257 01C880     365        LXI B,CRVC
425A CD7742     366        CALL MSGCHK        ;CALL CONTROL CHECK
425D 3ADF80     367        LDA NEST
4260 E653       368        ANI 53H            ;MASK FOR LAST OR REINI-
                369                            ;TIALIZE
4262 C20342     370        JNZ BB1
4265 3ADF80     371        LDA NEST
4268 E60C       372        ANI 0CH            ;MASK FOR REJ
426A C22242     373        JNZ DD1
426D 3ADB80     374   EE1: LDA STADD
4270 3C         375        INR A
4271 32DB80     376        STA STADD
4274 C3F641     377        JMP AA1
                378
                379
                380
                381 MSGCHK:
                382 ;MSGCHK SUBROUTINE
                383 ;THIS SUBROUTINE CHECKS FOR ERRORS IN THE RECEIVED
                384 ;MESSAGE AFTER SUBROUTINE RCVCD IS CALLED. THE CHECK
                385 ;WILL INCLUDE THAT FOR: PHASE OF LINE CODE; RECEIVER/
                386 ;CONTROLLER CRC AND ASSEMBLED BIT COUNT(MULTIPLE OF
                387 ;8 BITS); MESSAGE BYTE COUNT; CORRECT STATION ADDRESS;
                388 ;AND CORRECT, SEQUENCED (WHERE APPLICABLE) LINK CONTROL
                389 ;CODES (SDLC RESPONSES). THE SUBROUTINE WILL ALSO SET
                390 ;UP FOR SEQUENCED REPEATING OF PREVIOUSLY TRANSMITTED
                391 ;MESSAGES WHEN A PROPER REJECT IS RECEIVED. WHEN ER-
                392 ;RORS ARE DETECTED, THIS ROUTINE WILL SET TEST AND ER-
                393 ;ROR CODES FOR USE IN OTHER ROUTINES. FLAGS WILL ALSO
                394 ;BE SET (IN NEST) SO THAT THE APPROPRIATE NEXT STEP IS
                395 ;TAKEN. THESE FLAGS DEPEND ON THE NUMBER AND TYPE OF
                396 ;PREVIOUS ERRORS FROM THIS SECONDARY STATION IN THIS
                397 ;AND LAST CYCLE.
                398 ;BEFORE CALLING THIS SUBROUTINE, THE DATA LINK BUFFER
                399 ;(DLB) POINTER AND THE EXPECTED LINK CONTROL (ACKN)
                400 ;MUST BE SET. NORMAL ACKN'S ARE UA, RNR (NR SET) AND
                401 ;I-FRAME (NR SET).
                402
                403
                404
277 2D          405   BEGIN:DCR L             ;TO CHECK IF THIS IS LAST FRAME
278 C28342      406        JNZ CHECK          ;IF NOT LAST, CHECK MSG VALIDITY
27B 3AE980      407        LDA ACKN           ;GET EXPECTED LINK CONTROL
27E F610        408        ORI 10H            ;SET P/F TO LAST EXPECTED
280 32E980      409        STA ACKN
283 79          410   CHECK:MOV A,C           ;GET DLB POINTER
284 32E080      411        STA LFRM           ;SET LAST FRAME REFERENCE
287 C624        412        ADI 24H            ;NUMBER OF FRAMES BETWEEN FRAME
                413                            ;REFERENCE AND STATUS LOCATIONS
289 4F          414        MOV C,A            ;SET DLB POINTER TO FRAME STATUS
28A 0A          415        LDAX B             ;GET STATION CONTROL STATUS
28B E608        416        ANI 08H            ;MASK FOR DPE (PHASE)
28D CAC642      417        JZ LRCVS           ;IF NONE THEN GO TO RCVR STATUS
                418                            ;CHECK. ELSE A DATA PHASE ERROR
                419                            ;HAS BEEN DETECTED.
290 3E02        420        MVI A,02H          ;SET CODE FOR DPE & CRC ERROR
292 32D580      421        STA TSTP           ;TO TEST MODE DISPLAY BUFFER
295 3AE380      422        LDA ECNT           ;RECEIVED ERROR COUNTER
298 3C          423        INR A              ;INCREMENT
299 32E380      424        STA ECNT
```

```
429C DB41      425            IN 41H         ;I/O FOR BER TESTING
429E 3C        426            INR A          ;INCR DPE COUNT
429F D341      427            OUT 41H
42A1 3AE280    428            LDA FAULT      ;DECISION BYTE FOR LAST OR NEXT
42A4 C640      429            ADI 40H        ;INCR DPE COUNT
42A6 32E280    430            STA FAULT
42A9 E680      431            ANI 80H        ;CHECK FOR MORE THAN ONCE
42AB CA8E43    432            JZ REJECT      ;WITHOUT CHAN CHANGE
42AE 3AE280    433            LDA FAULT
42B1 E640      434            ANI 40H        ;CHECK FOR THRICE
42B3 CA7D43    435            JZ RCSGN       ;WITH CHAN CHANGE
42B6 3AE280    436            LDA FAULT      ;TOO MANY PHASE ERRORS-QUIT
42B9 E63F      437            ANI 3FH        ;CLEAR DPE FAULT
42BB 32E280    438            STA FAULT
42BE 3E09      439            MVI A,09H      ;DISPAY CODE FOR PHASE ERRORS
42C0 32E680    440            STA DISPA
42C3 C3AA43    441            JMP ALARM
42C6 0C        442   LRCVS:   INR C          ;SET DLB PNTR TO LRCVS
42C7 0A        443            LDAX B         ;GET LRCVS
42C8 E6FC      444            ANI 0FCH       ;MASK FOR ANY RCVR STATUS FAULTS
42CA CA3A43    445            JZ ADDRA       ;IF NONE THEN GO TO ADDR CHECK.
               446                           ;ELSE A RECEIVER STATUS ERROR
               447                           ; HAS BEEN DETECTED(CRC OR ABC)
               448                           ;CRC CHECK
42CD E680      449            ANI 80H        ;MASK FOR CRC ERROR
42CF CA0943    450            JZ ABC         ;IF NONE CHECK ASSEM. BIT COUNT
42D2 3E02      451            MVI A,02H      ;CODE FOR DPE & CRC ERROR
42D4 32D580    452            STA TSTP       ;TO TEST MODE DISPLAY BUFFER
42D7 3AE380    453            LDA ECNT       ;1022 MEMORY, ERROR CNT BUFFER
42DA 3C        454            INR A
42DB 32E380    455            STA ECNT
42DE DB41      456            IN 41H         ;I/O PORT FOR BER TESTING
42E0 C610      457            ADI 10H        ;INCR CRC COUNT
42E2 D341      458            OUT 41H
42E4 3AE280    459            LDA FAULT      ;DECISION BYTE FOR LAST OR NEXT
42E7 C610      460            ADI 10H        ;INCR CRC COUNT
42E9 32E280    461            STA FAULT
42EC E620      462            ANI 20H        ;CHECK FOR MORE THAN ONCE
42EE CA8E43    463            JZ REJECT      ;W/O CHAN CANGE
42F1 3AE280    464            LDA FAULT
42F4 E610      465            ANI 10H        ;CHECK FOR THRICE
42F6 CA7D43    466            JZ RCSGN       ;WITH CHAN CHANGE
42F9 3AE280    467            LDA FAULT      ;CRC 3 TIMES
42FC E6CF      468            ANI 0CFH       ;CLEAR CRC COUNT
42FE 32E280    469            STA FAULT
4301 3E0A      470            MVI A,0AH      ;DISPLAY CODE FOR CRC ERRORS
4303 32E680    471            STA DISPA
4306 C3AA43    472            JMP ALARM
4309 3E01      473   ABC:     MVI A,01H      ;ASSEMBLED BIT COUNT ERROR
430B 32D580    474            STA TSTP
430E 3AE380    475            LDA ECNT
4311 3C        476            INR A
4312 32E380    477            STA ECNT
4315 3AE280    478            LDA FAULT
4318 C604      479            ADI 04H        ;INCR ABC COUNT
431A 32E280    480            STA FAULT
431D E608      481            ANI 08H        ;CHECK FOR MORE THAN ONCE
431F CA8E43    482            JZ REJECT
4322 3AE280    483            LDA FAULT
4325 E604      484            ANI 04H        ;CHECK FOR THRICE
4327 CA7D43    485            JZ RCSGN
432A 3AE280    486            LDA FAULT      ;ABC THREE TIMES
432D E6F3      487            ANI 0F3H       ;CLEAR ABC COUNT
432F 32E280    488            STA FAULT
4332 3E0B      489            MVI A,0BH      ;DISPLAY CODE FOR ABC ERROR
4334 32E680    490            STA DISPA
4337 C3AA43    491            JMP ALARM
433A 3ACD80    492   ADDRA:   LDA CXMT       ;STATION ADDRESS XMTD
433D 67        493            MOV H,A
433E 3AE080    494            LDA LFRM       ;DLB ADDR OF START OF FRAME AND
```

```
                        495                     ; THE STATION ADDRESS
4341  4F                496         MOV  C, A   ; SET DLB POINTER
4342  0A                497.        LDAX B      ; GET STATION ADDRESS
4343  BC                498         CMP  H
4344  CABC43            499         JZ   LCNTRL
4347  AF                500         XRA  A
4348  32E680            501         STA  DISPA  ; CLEAR DISPLAY PORT
434B  3E10              502  ADDRB: MVI  A, 10H
434D  32D580            503         STA  TSTP
4350  3AE380            504         LDA  ECNT
4353  3C                505         INR  A
4354  32E380            506         STA  ECNT
4357  3AE280            507         LDA  FAULT  ; WRONG ADDR/LINK CNTRL RCVD
435A  E602              508         ANI  02H    ; CHECK FOR 2ND TIME
435C  CA7243            509         JZ   ADFLT
435F  3AE280            510         LDA  FAULT
4362  E6FD              511         ANI  0FDH   ; CLEAR ADDR FAULT
4364  32E280            512         STA  FAULT
4367  3AE680            513         LDA  DISPA  ; DISPLAY CODE FOR ADDR. ERROR
436A  F60C              514         ORI  0CH
436C  32E680            515         STA  DISPA
436F  C3AA43            516         JMP  ALARM
4372  3AE280            517  ADFLT: LDA  FAULT
4375  F602              518         ORI  02H    ; OR ADDR FAULT
4377  32E280            519         STA  FAULT
437A  C38E43            520         JMP  REJECT
437D  3AE880            521  RCSGN: LDA  BALT   ; SEE LCSGN
4380  07                522         RLC
4381  32E880            523         STA  BALT
4384  E620              524         ANI  20H
4386  67                525         MOV  H, A
4387  DB01              526         IN   01H
4389  E6DF              527         ANI  0DFH
438B  B4                528         ORA  H
438C  D301              529         OUT  01H
438E  7D                530  REJECT:MOV  A, L
438F  32EA80            531         STA  RPCNT  ; MULTIPLE FRAME COUNT REFERENCE
4392  2E01              532         MVI  L, 01H ; SET FRAME COUNT
4394  01CD80            533         LXI  B, CXMT; SET DLB POINTER
4397  3E02              534         MVI  A, 02H
4399  32D380            535         STA  BYCNT  ; SET BYTE COUNT
439C  3E19              536         MVI  A, 19H ; SET LINK CONTROL-REJECT
439E  32CE80            537         STA  CXMT+1
43A1  3ADF80            538         LDA  NEST
43A4  F60C              539         ORI  0CH
43A6  32DF80            540         STA  NEST   ; SET REJECT
43A9  C9                541         RET
43AA  3ACD80            542  ALARM: LDA  CXMT   ; CODE FOR STATION ADDRESS
43AD  32E580            543         STA  DISPB
43B0  DB40              544         IN   40H
43B2  E670              545         ANI  70H    ; SET ALARM BIT
43B4  D340              546         OUT  40H
43B6  3EA0              547         MVI  A, 0A0H; SET NEXT
43B8  32DF80            548         STA  NEST
43BB  C9                549         RET
43BC  3AE980            550  LCNTRL:LDA  ACKN   ; LINK CONTROL EXPECTED
43BF  67                551         MOV  H, A
43C0  0C                552         INR  C      ; SET DLB
43C1  0A                553         LDAX B      ; GET LINK CONTROL
43C2  BC                554         CMP  H
43C3  CA5644            555         JZ   RCVBC  ; IF COMP. GO TO BYTE CNT. CHECK
43C6  FE1F              556         CPI  1FH    ; COMPARE WITH DM
43C8  C2E043            557         JNZ  REPEAT ; IF NOT COMP. THEN REPEAT CHECK
43CB  3E40              558         MVI  A, 40H ; TEST CODE FOR DISCONNECTED
43CD  32D580            559         STA  TSTP
43D0  3E06              560         MVI  A, 06H ; DISPLAY CODE FOR DISCONNECTED
43D2  32E680            561         STA  DISPA
43D5  C3AA43            562         JMP  ALARM
43D8  3E0D              563  LCERR: MVI  A, 0DH ; DISPLAY CODE FOR LINK CONTROL
                        564                     ; ERROR
43DA  32E680            565         STA  DISPA
43DD  C34843            566         JMP  ADDRB
```

```
43E0 0A           567    REPEAT:LDAX B        ;GET LINK CONTROL AGAIN
43E1 FE97         568           CPI 97H       ;COMPARE WITH FRMR
43E3 CA2044       569           JZ RSTC       ;IF SAME THEN RESTART CY-
                  570                         ;CLE
43E6 E61F         571           ANI 1FH       ;MASK NR, IF ANY
43E8 FE19         572           CPI 19H       ;COMPARE WITH REJECT
43EA C20843       573           JNZ LCERR     ;IF NOT REJECT RCVD THEN REJECT
43ED 3E20         574           MVI A,20H     ;RCVD REJECT REPEAT REQUEST
43EF 32D580       575           STA TSTP
43F2 3AE380       576           LDA ECNT
43F5 C610         577           ADI 10H
43F7 32E380       578           STA ECNT
43FA 3AD780       579           LDA TORQ      ;CHECK FOR PREVIOUS RPT. REQ.
43FD 3C           580           INR A
43FE E60F         581           ANI 0FH       ;CLEAR ANY PREVIOUS TIME OUTS
4400 32D780       582           STA TORQ
4403 E602         583           ANI 02H       ;CHECK MORE THAN ONCE
4405 CA5044       584           JZ LAST       ;REPEAT WO CHNL CHANGE
4408 3AD780       585           LDA TORQ
440B E601         586           ANI 01H       ;CHECK FOR 3 TIMES
440D CA3F44       587           JZ LCSGN      ;REPEAT WITH CHAN CHANGE
4410 3AD780       588    QUIT:LDA TORQ
4413 E6F0         589           ANI 0F0H      ;CLEAR RPT REQ. COUNT
4415 32D780       590           STA TORQ
4418 3E07         591           MVI A,07H     ;DISP CODE FOR MULT. RPT. REQ.
441A 32E680       592           STA DISPA
441D C3AA43       593           JMP ALARM
4420 3E50         594    RSTC:MVI A,50H       ;CODE FOR REINITIALIZE
4422 32DF80       595           STA NEST      ;SET FLAG
4425 3E04         596           MVI A,04H     ;TEST CODE FOR FRMR
4427 32D580       597           STA TSTP
442A 3AE380       598           LDA ECNT
442D C610         599           ADI 10H
442F 32E380       600           STA ECNT
4432 3AD780       601           LDA TORQ
4435 3C           602           INR A
4436 32D780       603           STA TORQ
4439 E602         604           ANI 02H
443B C21044       605           JNZ QUIT      ;IF 2ND TIME THEN QUIT
443E C9           606           RET
443F 3AE880       607    LCSGN:LDA BALT       ;UTILITY FOR CHAN. CHANGE
4442 07           608           RLC
4443 32E880       609           STA BALT
4446 E620         610           ANI 20H
4448 67           611           MOV H,A
4449 DB01         612           IN 01H        ;STATION CONTROL
444B E6DF         613           ANI 0DFH      ;MASK OUT CHNS
444D B4           614           ORA H
444E D301         615           OUT 01H       ;EXECUTE CHNS
4450 3E03         616    LAST:MVI A,03H       ;SET LAST
4452 32DF80       617           STA NEST
4455 C9           618           RET
4456 3AE080       619    RCVBC:LDA LFRM       ;GET FRAME REFERENCE
4459 C626         620           ADI 26H       ;ADDR. COUNT IN DLB FROM REF
                  621                         ;TO BYTE COUNT(RCVBC)
445B 4F           622           MOV C,A       ;SET DLB POINTER
445C 0A           623           LDAX B        ;GET RCVBC(BYTE CNT INDICATOR)
445D B7           624           ORA A
445E CA9544       625           JZ NEXT       ;IF ZERO, THEN REC'D BYTE COUNT
                  626                         ;EQUALS THAT EXPECTED, THEN THIS
                  627                         ;FRAME CHECK OK. GO TO NEXT FRAME
                  628                         ;IF ANY.
                  629                  ;BYTE COUNT RECEIVED WAS NOT WHAT WAS
                  630                  ;EXPECTED. THIS MESSAGE WILL BE REJECT-
                  631                  ;ED
4461 3E10         632           MVI A,10H     ;CODE FOR TEXT ERROR
4463 32D580       633           STA TSTP
4466 3AE380       634           LDA ECNT
4469 3C           635           INR A         ;INCR RECEIVED ERROR COUNTER
446A 32E380       636           STA ECNT
446D 3AE280       637           LDA FAULT
```

```
4470 E601        638            ANI   01H         ;CHECK FOR 2ND TIME
4472 CA8544      639            JZ    BCFLT       ;NO
4475 3AE280      640            LDA   FAULT
4478 E6FE        641            ANI   0FEH        ;CLEAR BYTE CNT FAULT
447A 32E280      642            STA   FAULT
447D 3E0E        643            MVI   A,0EH       ;DISPLAY CODE FOR BC ERRORS
447F 32E680      644            STA   DISPA
4482 C3AA43      645            JMP   ALARM
4485 3AE280      646     BCFLT: LDA   FAULT
4488 F601        647            ORI   01H         ;OR BC ERROR
448A 32E280      648            STA   FAULT
448D 3E50        649            MVI   A,50H
448F 32DF80      650            STA   NEST
4492 C38E43      651            JMP   REJECT
4495 7D          652     NEXT:  MOV   A,L         ;GET FRAME COUNT
4496 B7          653            ORA   A
4497 C2A344      654            JNZ   CNTNU       ;IF NOT LAST FRAME THEN
                 655                              ;CONTINUE. SET UP FOR NEXT
                 656                              ;FRAME TO BE CHECKED.
449A 3AD780      657            LDA   TORQ        ;GET REPEAT REQUEST COUNT
449D E6F0        658            ANI   0F0H        ;MASK OUT COUNT SINCE
                 659                              ;FRF   IS OK
449F 32D780      660            STA   TORQ
44A2 C9          661            RET
44A3 3AE980      662     CNTNU: LDA   ACKN        ;GET EXPECTED LINK CONTROL
44A6 C602        663            ADI   02H         ;INCR NS', FRAMES SENT
44A8 32E980      664            STA   ACKN
44AB 3AE080      665            LDA   LFRM        ;FRAME REF
44AE C628        666            ADI   28H         ;NEXT FRAME INCREMENT
44B0 4F          667            MOV   C,A         ;SET DLB POINTER
44B1 C9          668            RET
                 669
                 670
                 671     TEST:
                 672     ;                TEST SUBROUTINE
                 673     ;TEST SUBROUTINE IS CALLED AT THE END OF A FULL
                 674     ;TRANSMISSION CYCLE IF REQUESTED BY OPERATION OF THE
                 675     ;TEST PB'S ON THE AUX PANEL. THE RESPONSE OF THE SEC-
                 676     ;ONDARY STATION TO A SINGLE TRANSMISSION(NO REPEATS)
                 677     ;ESTABLISHES THE TEST CODE FOR DISPLAY. THE TEST SUB-
                 678     ;ROUTINE WILL CALL FDADD, XMTCD, RCVCD, AND MSGCHK.
                 679     ;TEST CODES ARE STORED IN LOCATION TSTP BY SUBROUTINES
                 680     ;RCVCD(BY TIME OUTS) AND MSGCHK(AS ERROR FLAG EQUI-
                 681     ;VALENTS). TEST DOES NOT GENERATE ALARMS.
                 682
44B2 3AD680      683            LDA   TSTC        ;GET TEST CYCLE NO. (INITIALIZED
44B5 B7          684            ORA   A           ;TO STCNT & DECR UNTIL=0)
44B6 C8          685            RZ                ;RETURN IF LAST CYCLE COMPLETE
44B7 DB00        686            IN    00H         ;ELSE GET DISPLAY CONTROL
44B9 E611        687            ANI   11H         ;MASK FOR XFR REQ & ACK
44BB B7          688            ORA   A           ;COMPARE FOR BOTH
44BC CADC44      689            JZ    TCNTNU      ;IF XFR REQ & ACK ARE BOTH NOT
                 690                              ;SET THEN PERFORM TEST - ELSE
44BF FE11        691            CPI   11H         ;COMPARE FOR XFR REQ OR ACK
44C1 C0          692            RNZ               ;IF BOTH NOT SET THEN RETURN
44C2 AF          693            XRA   A           ;ELSE SET NULL AND
44C3 D300        694            OUT   00H         ;RESET XFR REQ AND
44C5 DB40        695            IN    40H         ;GET AUX PANEL IO
44C7 2F          696            CMA
44C8 E603        697            ANI   03H         ;MASK FOR TEST PB'S
44CA FE01        698            CPI   01H         ;COMPARE FOR TEST 1
44CC CAD744      699            JZ    TST1        ;IF ZERO THEN ACK
44CF FE02        700            CPI   02H         ;ELSE COMPARE FOR TEST 2
44D1 C0          701            RNZ               ;QUIT IF NOT TEST 2
44D2 3EDF        702            MVI   A,0DFH      ;SET TEST 2 LAMP ON
44D4 D340        703            OUT   40H
44D6 C9          704            RET
44D7 3EEF        705     TST1:  MVI   A,0EFH      ;SET TEST 1 LAMP ON
44D9 D340        706            OUT   40H
44DB C9          707            RET
44DC AF          708     TCNTNU:XRA   A           ;CLEAR TEST ERROR FLAGS
```

```
44DD  32D580      709              STA   TSTP
44E0  3AD680      710              LDA   TSTC        ;GET TEST CYCLE NO.
44E3  67          711              MOV   H,A
44E4  3AD480      712              LDA   STCNT
44E7  94          713              SUB   H
44E8  6F          714              MOV   L,A
44E9  3AD680      715              LDA   TSTC
44EC  3D          716              DCR   A           ;SET ADDRESS COUNTER
44ED  32D680      717              STA   TSTC
44F0  CDA841      718              CALL  FDADD       ;FIND STATION ADDRESS
44F3  32CD80      719              STA   CXMT        ;STORE ADDRESS IN DLB(CXMT)
44F6  01CE80      720              LXI   B,CXMT+1    ;SET DLB POINTER
44F9  3EF3        721              MVI   A,0F3H      ;SET TEST CODE FOR LINK CONTROL
44FB  02          722              STAX  B           ;SET LINK CONTROL(CXMT+1)
44FC  0C          723              INR   C
44FD  3E0C        724              MVI   A,0CH       ;TEST CODE FOR END OF XMTN CYCLE
44FF  02          725              STAX  B           ;CXMT+2
4500  0C          726              INR   C
4501  3ADC80      727              LDA   SHBT        ;GET SHIFTING BIT- WAS SET AT
                  728                                ;BEGINNING OF XMTN CYCLE
4504  02          729              STAX  B           ;CXMT+3
4505  0C          730              INR   C
4506  02          731              STAX  B           ;CXMT+4
4507  01CD80      732              LXI   B,CXMT      ;REINIT. DLB POINTER
450A  3E05        733              MVI   A,05H
450C  32D380      734              STA   BYCNT       ;SET BYTE COUNT(5)
450F  2E01        735              MVI   L,01H       ;SET FRAME COUNTER
4511  CD0040      736              CALL  XMTCD       ;TRANSMIT TEST FRAME
4514  3E40        737              MVI   A,40H
4516  32DE80      738              STA   DLYA        ;SET MINOR DELAY COUNT
4519  3E01        739              MVI   A,01H
451B  32DD80      740              STA   DLYB        ;SET MAJOR DELAY COUNT
451E  2E01        741              MVI   L,01H       ;SET EXPECTED FRAME COUNT
4520  01C880      742              LXI   B,CRVC      ;SET DLB POINTER TO RECEIVER
4523  CD6A40      743              CALL  RCVCD       ;TO RECEIVE TEST RESPONSE
4526  3AD580      744              LDA   TSTP        ;GET TEST ERROR FLAGS
4529  B7          745              ORA   A           ;COMPARE FOR TIME OUTS
452A  C24945      746              JNZ   TDISP       ;IF TIME OUT THEN GO TO DISPLAY
                  747                                ;ELSE
452D  3EF3        748              MVI   A,0F3H      ;SET EXPECTED LINK CONTROL IN
452F  32E980      749              STA   ACKN        ;TEST RESPONSE
4532  01C880      750              LXI   B,CRVC      ;SET DLB POINTER
4535  2E01        751              MVI   L,01H       ;SET FRAME COUNTER
4537  CD7742      752              CALL  MSGCHK      ;CHECK RESPONSE FOR ERRORS
453A  3AD580      753              LDA   TSTP        ;GET ERROR FLAGS
453D  B7          754              ORA   A
453E  C24945      755              JNZ   TDISP       ;IF ERROR THEN GO TO DISPLAY
                  756                                ;ELSE
4541  3ACC80      757              LDA   CRVC+4      ;GET SEC STN HISTORY AND
4544  D382        758              OUT   82H         ;PUT IN DISPLAY PORT B
4546  C34E45      759              JMP   DADD        ;GO & GET DISPLAY CHAR ADDRESS
4549  3AD580      760  TDISP:      LDA   TSTP        ;GET ERROR FLAGS AND
454C  D382        761              OUT   82H         ;PUT IN DISPLAY PORT B
                  762                                ;DISPLAY SUBSYSTEM WILL DECODE
                  763                                ;AS AN INDIRECT ADDRESS FOR
                  764                                ;AN ERROR DISPLAY CODE
454E  3AD680      765  DADD:       LDA   TSTC        ;GET DISP TEST MODE CYCLE
4551  67          766              MOV   H,A         ;ADD BIAS FOR DIRECT ALPHA-
4552  3AD480      767              LDA   STCNT
4555  94          768              SUB   H
4556  67          769              MOV   H,A
4557  3ECC        770              MVI   A,0CCH
4559  94          771              SUB   H           ;NUMERIC CHARACTER ADDRESS TO
455A  D381        772              OUT   81H         ;DISPLAY PORT A
455C  AF          773              XRA   A
455D  32D580      774              STA   TSTP        ;CLEAR ERROR FLAGS
4560  3E01        775              MVI   A,01H       ;CONTROL FOR ADDR/DATA DISPLAY
4562  D300        776              OUT   00H         ;SET DISPLAY CONTROL PORT
4564  C9          777              RET
                  778
                  779  ;
                  780
                  781  SNRM:
```

```
                    782 ;                    SNRM SUBROUTINE
                    783 ;THE SNRM SUBROUTINE TRANSMITS AN SNRM(SET NORMAL RE-
                    784 ;SPONSE MODE), TO A PREVIOUSLY DEFINED SECONDARY STA-
                    785 ;TION AND RECEIVES THE ACKNOWLEDGE (UA), REJECT (REJ),
                    786 ;OR DISCONNECTED MODE (DM) INDICATION. AS NOTED, STA-
                    787 ;TION ADDRESS HAS BEEN SET. OTHER VARIABLES SUCH AS
                    788 ;DLB POINTER, FRAME COUNT AND BYTE COUNT ARE SET IN
                    789 ;SNRM.
                    790 ;SNRM IS CALLED BY THE READ AND WRITE SUBROUTINES.
                    791 ;SNRM CALLS AXMTCD, ARCVCD AND MSGCHK SUBROUTINES.
                    792
                    793
4565 3E02           794         MVI A,02H
4567 32D380         795         STA BYCNT        ;SET FRAME BYTE COUNT TO TWO
456A 3E93           796         MVI A,93H        ;LINK CONTROL CODE FOR SNRM
456C 32CE80         797         STA CXMT+1       ;SET CONT. XMT LINK CONT. BYTE
456F 01CD80         798 REJRPT:LXI B,CXMT        ;SET DLB POINTER TO TRANSMIT
4572 AF             799         XRA A            ;NULL
4573 32DF80         800         STA NEST         ;CLEAR ALL ERROR FLAGS
4576 2E01           801         MVI L,01H        ;SET FRAME COUNTER TO ONE
4578 CD0040         802         CALL XMTCD       ;TRANSMIT CONTROL FRAME
457B 3E30           803         MVI A,30H        ;TIME OUT DELAY FOR RECEIVER
457D 32DE80         804         STA DLYA         ;SET MINOR COUNTER
4580 3E01           805         MVI A,01H        ;TIME OUT GIVES 1.2 MILLISECS
4582 32DD80         806         STA DLYB         ;SET MAJOR COUNTER
4585 2E01           807         MVI L,01H        ;SET FRAME CNTR TO EXPECT. RCV
4587 01C880         808         LXI B,CRVC       ;SET DLB POINTER TO RECEIVE
458A CD6A40         809         CALL RCVCD       ;RECEIVE CONTROL FRAME
458D 3ADF80         810         LDA NEST         ;GET ERROR FLAGS-TIME OUT ONLY
4590 E603           811         ANI 03H          ;MASK FOR LAST
4592 C26F45         812         JNZ REJRPT       ;IF LAST IS SET THEN REXMT SNRM
4595 3ADF80         813         LDA NEST         ;ELSE CONTINUE TO CHECK FLAGS
4598 E6A0           814         ANI 0A0H         ;MASK FOR NEXT
459A C0             815         RNZ              ;IF NEXT THEN QUIT
459B 3E73           816         MVI A,73H        ;LINK CONTROL FOR UA CODE
459D 32E980         817         STA ACKN         ;SET ACKNOWLEDGE EXPECTED
45A0 01C880         818         LXI B,CRVC       ;SET DLB PNTR TO CHECK RCVD MSG.
45A3 2E01           819         MVI L,01H        ;SET FRAME COUNTER
45A5 CD7742         820         CALL MSGCHK      ;CONTROL RESPONSE CHECK
45A8 3ADF80         821         LDA NEST
45AB E60F           822         ANI 0FH          ;MASK FOR LAST OR REJECT OR
45AD C26F45         823         JNZ REJRPT       ;IF SET THEN REPEAT OR REJECT
                    824                          ;(MSGCHK SETS REJECT)
45B0 C9             825         RET              ;RETURN. NEXT OR REINITIALIZE
                    826                          ;MAY BE SET.
                    827 ;--------------------------------------------------
                    828
                    829
                    830 IFRMS:
                    831                    ;IFRMS SUBROUTINE
                    832 ;THE IFRMS SUBROUTINE TRANSMITS PREVIOUSLY SET UP
                    833 ;I-FRAMES IN THE DATA LINK BUFFER (DLB) AND RE-
                    834 ;CEIVES THE ACKNOWLEDGE OR REJECT FROM THE SECOND-
                    835 ;ARY STATION. IN THE CASE OF A REJECT, IFRMS WILL
                    836 ;RETRANSMIT THE REQUESTED NUMBER OF FRAMES. AS
                    837 ;NOTED, THE DLB MUST BE COMPLETELY SET UP WITH CON-
                    838 ;TROL AND DATA (IF ANY). IN ADDITION, FRAME COUNT
                    839 ;(IN L), BYTE COUNT (IN BYCNT) AND THE DLB POINTER
                    840 ;(IN B & C) MUST BE SET. IFRMS IS CALLED IN THE
                    841 ;READ AND WRITE SUBROUTINES. IFRMS CALLS THE XMTCD,
                    842 ;RCVCD AND MSGCHK SUBROUTINES.
                    843
                    844
45B1 AF             845 XRPT:XRA A               ;NULL
45B2 32DF80         846         STA NEST         ;CLEAR ALL ERROR FLAGS
45B5 CD0040         847         CALL XMTCD       ;TRANSMIT DLB CONTENTS
45B8 2E01           848         MVI L,01H        ;SET FRAME COUNTER
45BA 3E02           849         MVI A,02H
45BC 32D380         850         STA BYCNT        ;SET BYTE COUNT FOR RNR(TWO
                    851                          ;BYTES)
45BF 3E40           852         MVI A,40H        ;TIME OUT DELAY, 1.6 MILLISECS
```

```
45C1 32DE80   854           STA  DLYA      ;PER FRAME
                                            ;SET MINOR COUNTER
45C4 3AE180   855           LDA  FMCNT     ;SET DELAY FOR TIME OUT
45C7 32DD80   856           STA  DLYB      ;SET MAJOR COUNTER, 1/FRAME
45CA 01C880   857           LXI  B,CRVC    ;SET DLB POINTER TO RECEIVE
45CD CD6A40   858           CALL RCVCD     ;RECEIVE ACK OR REJ
45D0 3ADF80   859           LDA  NEST      ;GET ERROR FLAGS-TIME OUTS
              860                           ;ONLY
45D3 E6AF     861           ANI  0AFH      ;MASK FOR ANY ERROR
              862                           ;LAST WILL CAUSE THE READ
              863                           ;OR WRITE SUBROUTINE TO SET
              864                           ;UP FOR A COMPLETE RETRANS-
              865                           ;MISSION. NEXT WILL CAUSE
              866                           ;THIS PART OF THE CYCLE TO
              867                           ;BE SKIPPED OVER
45D5 C0       868           RNZ            ;IF ANY ERROR THEN RETURN
              869                           ;ELSE SET UP TO CHECK RE-
              870                           ;CEIVED MSG
45D6 3AE180   871           LDA  FMCNT     ;FRAME COUNT
              872                           ;SET THE COUNT TO THE SIG-
45D9 0F       873           RRC            ;NIFICANCE OF THE EXPECTED
45DA 0F       874           RRC            ;NR IN RNR ACKN.
45DB 0F       875           RRC
45DC F615     876           ORI  15H       ;COMBINE WITH BASIC RNR CODE
45DE 32E980   877           STA  ACKN      ;SET THE EXPECTED LINK CONTROL
45E1 01C880   878           LXI  B,CRVC    ;SET LB POINTER TO RECEIVER
45E4 2E01     879           MVI  L,01H     ;SET FRAME COUNTER TO ONE
45E6 CD7742   880           CALL MSGCHK    ;CHECK RECEIVED CONTROL FRAME
45E9 3ADF80   881           LDA  NEST      ;GET ERROR FLAGS
45EC E603     882           ANI  03H       ;MASK FOR LAST
45EE C2FA45   883           JNZ  FRAMES    ;IF LAST SET THEN A REJECT RE-
              884                           ;CEIVED. GO AND CALCULATE POR-
              885                           ;TION TO REPEAT
45F1 3ADF80   886           LDA  NEST      ;ELSE CONTINUE TO CHECK FLAGS
45F4 E60C     887           ANI  0CH       ;MASK FOR REJECT(TO BE XMTD)
45F6 C2B145   888           JNZ  XRPT      ;IF REJECT THEN XMT REJ. DLB
              889                           ;IN XMT BUFFER HAS BEEN SET UP
              890                           ;IN MSGCHK. AN RNR WAS EXPECT-
              891                           ;ED BUT NOT RECEIVED OR RE-
              892                           ;CEIVED WITH ERRORS.
45F9 C9       893           RET            ;RETURN TO READ OR WRITE SUBROU-
              894                           ;TINE. NEXT OR REINITIALIZE MAY
              895                           ;BE SET
45FA 3AC980   896   FRAMES: LDA CRVC+1     ;GET RECEIVED LINK CONTROL(RE-
              897                           ;JECT)
45FD E6E0     898           ANI  0E0H      ;MASK FOR THE NR VALUE IN REJ
              899                           ;CODE
45FF 07       900           RLC            ;PLACE NR IN LSB'S
4600 07       901           RLC
4601 07       902           RLC
4602 67       903           MOV  H,A       ;HOLD THAT
4603 3AE180   904           LDA  FMCNT     ;GET ORIGINAL FRAME COUNT
4606 94       905           SUB  H         ;SUBTRACTION GIVE NO. FRAMES
              906                           ;TO REPEAT
4607 6F       907           MOV  L,A       ;SET FRAME COUNTER
4608 67       908           MOV  H,A       ;ALSO USE TO LOCATE ADDRESS IN
              909                           ;DLB
4609 0E00     910           MVI  C,00H     ;SET DLB POINTER TO BEGINNING
460B 24       911           INR  H
460C 79       912           MOV  A,C       ;GET DLB POINTER
460D 32E080   913   FRMADD: STA LFRM       ;SET POINTER REFERENCE
4610 25       914           DCR  H
4611 C8       915           RZ             ;IF LAST FRAME TO REPEAT THEN
              916                           ;DLB POINTER IS SET  RETURN.
4612 3AE080   917           LDA  LFRM      ;ELSE CHANGE POINTER
4615 C628     918           ADI  28H       ;INCREMENT TO START OF NEXT
              919                           ;FRAME
4617 32E080   920           STA  LFRM
461A 4F       921           MOV  C,A       ;SET DLB POINTER
461B C30D46   922           JMP  FRMADD
              923   ;-------------------------------------------
```

```
924
925
926  READ:
927                            ; READ SUBROUTINE
928  ; THIS SUBROUTINE AND THE WRITE SUBROUTINE ARE AT THE
929  ; FIRST LEVEL, CALLING MOST OTHER SUBROUTINES IN THE
930  ; PROGRAM. IT'S PURPOSE IS TO TAKE THE INPUT VARI-
931  ; ABLES:
932  ;              (A) STATION COUNT
933  ;              (B) BYTE COUNT
934  ;              (C) FRAME COPUNT
935  ;              (D) STARTING ADDRESS
936  ;         AND (E) STATION NUMBER
937  ; AND SET UP THE PROCESS BY WHICH DATA IS READ FROM
938  ; MEMORY AT A SECONDARY STATION LOCATION AND PLACED
939  ; IN THE PRIMARY STATION DATA LINK BUFFER READY FOR
940  ; TRANSMISSION TO OTHER SECONDARY STATIONS. A SIGNI-
941  ; FICANT PORTION OF THE READ SUBROUTINE IS IN TAKING
942  ; THE INPUT VARIABLES AND SETTING UP THE LINK AND
943  ; PORT CONTROL CODES NECESSARY TO TRANSFER FROM ONE
944  ; TO FIVE FRAMES (I-FRAMES) WITH ONE TO 32 DATA BYTES
945  ; IN EACH. THE SEQUENCE OF OPERATION IS:
946  ;              (1) FIND THE STATION ADDRESS FROM THE
947  ;                  STATION NUMBER (FDADD)
948  ;              (2) SET THE NORMAL RESPONSE MODE IN THE
949  ;                  SECONDARY STATION (SNRM)
950  ;              (3) SET UP EACH READ REQUEST FRAME WITH
951  ;                  PROPER LINK AND PORT CONTROL INFORM-
952  ;                  TION.
953  ;              (4) TRANSMIT THE READ REQUEST (IFRMS)
954  ;              (5) RECEIVE AND CHECK DATA (RCVCD AND
955  ;                  MSGCHK)
956  ;              (6) ISSUE A REJECT FOR ANY FRAMES IN ER-
957  ;                  ROR (XMTCD)
958  ; THE BASIC READ SUBROUTINE PROGRAM COUNTER WILL CY-
959  ; CLE THROUGH ABOUT 340 STEPS AND WITH IT'S NESTED
960  ; SUBROUTINES IT COULD COUNT THROUGH 3400 STEPS WITH-
961  ; OUT ANY REPEAT CYCLES. READ CALLS FDADD, SNRM
962  ; IFRMS, RCVCD, MSGCHK, AND XMTCD. NOTE THAT SNRM AND
963  ; IFRMS ALSO CALL RCVCD, MSGCHK AND XMTCD.
964
461E AF           965    INITL: XRA A
461F 32DF80       966           STA  NEST      ; CLEAR ALL ERROR FLAGS
4622 3ADB80       967           LDA  STADD     ; GET STATION NUMBER
4625 3D           968           DCR  A
4626 6F           969           MOV  L,A
4627 CDA841       970           CALL FDADD     ; FIND STATION ADDRESS
462A 32CD80       971           STA  CXMT      ; PUT IN ADDRESS LOCTION OF THE
                  972                          ; CONTROL FRAME IN THE DATA
                  973                          ; LINK BUFFER (DLB)
462D CD6545       974           CALL SNRM      ; SET NORMAL RESPONSE MODE
                  975                          ; IN THE SECONDARY STATION
4630 3ADF80       976           LDA  NEST      ; GET ERROR FLAG BYTE
4633 E6A0         977           ANI  0A0H      ; MASK FOR NEXT
4635 C22447       978           JNZ  RRTN      ; IF NEXT IS SET THEN QUIT
                  979                          ; ELSE CHECK FOR REINITIALIZE
4638 3ADF80       980           LDA  NEST
463B E650         981           ANI  50H       ; MASK FOR REINITIALIZE
463D C21E46       982           JNZ  INITL     ; IF REINITIALIZE THEN RE-
                  983                          ; START. ELSE SET UP FOR DATA
                  984                          ; TRANSFER.
4640 010080       985           LXI  B,FRMA    ; SET DLB POINTER TO BEGINNING
                  986                          ; OF THE DLB (FIRST I-FRAME)
4643 3AE180       987           LDA  FMCNT     ; GET FRAME COUNT
4646 6F           988           MOV  L,A       ; PUT IN FRAME COUNTER
                  989                          ; THE FOLOWING (TO I-FRAME) SETS
                  990                          ; THE I-FRAME STRUCTURE FOR ALL FRAMES.
                  991                          ; EACH FRAME REQUIRES THE SAME SECONDARY
                  992                          ; STATION ADDRESS, A SEQUENTIAL NS COUNT
                  993                          ; IN THE LINK CONTROL AND A DATA BYTE AC-
                  994                          ; COUNTING IN PC1 AND PC2.
                  995                          ; FROM HERE TO FRMCTL THE FIRST IS SET.
```

```
                 996           ;ALL SUBSEQUENT FRAMES ARE JUST MODIFI
                 997           ;CATIONS.
4647 3ACD80      998   SADDR:LDA CXMT      ;GET STATION ADDRESS
464A 02          999         STAX B        ;PUT IN FIRST FRAME BYTE-FRMA
464B 0C         1000         INR C         ;FRMA+1
464C AF         1001         XRA A         ;BASIC I-FRAME LINK CONTROL=NULL
464D 5F         1002         MOV E,A       ;CLEAR-USE LATER TO INCR STRT'G
                1003                       ;ADDRESS
464E 02         1004         STAX B        ;SET LINK CONTROL,2ND FRAME BYTE
464F 0C         1005         INR C         ;FRMA+2
4650 3AE480     1006         LDA DBCNT     ;GET DATA BYTE COUNT
4653 3D         1007         DCR A
4654 07         1008         RLC           ;SET SIGNIFICANCE SND PLACE
4655 07         1009         RLC           ;IN POSITION FOR PC1
4656 F680       1010         ORI 80H       ;COMBINE WITH READ BIT
4658 67         1011         MOV H,A       ;HOLD THAT
4659 3AD980     1012         LDA STRTH     ;GET MS BITS OF STARTING ADDR
465C B4         1013         ORA H         ;COMBINE TO COMPLETE PC1
465D 02         1014         STAX B        ;SET PC1, THIRD FRAME BYTE
465E 0C         1015         INR C         ;FRMA+3
465F 3AD880     1016         LDA STRTL     ;GET LS BITS OF STARTING ADDR
4662 02         1017         STAX B        ;SET PC2
4663 2600       1018         MVI H,00H     ;CLEAR NS REFERENCE
4665 2D         1019  FRMCTL:DCR L         ;DECR FRAME COUNTER
4666 CA9246     1020         JZ FNCTL      ;IF LAST FRAME SET FINAL
                1021                       ;COUNTER
4669 79         1022         MOV A,C       ;ELSE GET DLB POINTER
466A C625       1023         ADI 25H       ;MOVE POINTER TO START OF NEXT
                1024                       ;FRAME
466C 4F         1025         MOV C,A       ;SET DLB POINTER
466D 3ACD80     1026         LDA CXMT      ;GET STATION ADDRESS
4670 02         1027         STAX B
4671 0C         1028         INR C         ;2ND BYTE
4672 7C         1029         MOV A,H       ;GET LAST LINK CONTROL
4673 C602       1030         ADI 02H       ;INCREMENT NS
4675 67         1031         MOV H,A       ;HOLD IT
4676 02         1032         STAX B        ;SET LINK CONTROL
4677 0C         1033         INR C         ;3RD BYTE
4678 3A0280     1034         LDA FRMA+2    ;GET FIRST FRAME PC1
467B 02         1035         STAX B        ;SET THIS FRAMES PC1
467C 0C         1036         INR C         ;4TH BYTE
467D 3AE480     1037         LDA DBCNT     ;GET DATA BYTE COUNT
4680 83         1038         ADD E         ;ADD DATA BYTE COUNT AS OF
                1039                       ;LAST FRAME
4681 5F         1040         MOV E,A       ;HOLD TOTAL DATA BYTES
4682 3A0380     1041         LDA FRMA+3    ;GET FIRST FRAME'S PC2
4685 83         1042         ADD E         ;ADD TOTAL DATA BYTES TO SET
                1043                       ;ADDRESS
4686 02         1044         STAX B        ;SET THIS FRAME'S PC2
4687 D26546     1045         JNC FRMCTL    ;IF NO CARRY THEN DO NEXT
                1046                       ;FRAME (IF ANY)
468A 0D         1047         DCR C         ;ELSE GO BACK TO 3RD BYTE PC1
468B 0A         1048         LDAX B        ;GET PC1
468C 3C         1049         INR A         ;INCREMENT MS BITS OF START-
                1050                       ;ING ADDRESS
468D 02         1051         STAX B        ;RESET PC1
468E 0C         1052         INR C         ;4TH BYTE AGAIN, FOR REFERENCE
468F C36546     1053         JMP FRMCTL    ;DO NEXT FRAME
4692 0D         1054   FNCTL:DCR C         ;AT 4TH BYTE, GO BACK TO 2ND
                1055                       ;BYTE
4693 0D         1056         DCR C
4694 0A         1057         LDAX B        ;GET LINK CONTROL
4695 F610       1058         ORI 10H       ;SET P/F BIT TO FINAL
4697 02         1059         STAX B        ;SET LINK CONTROL
                1060                       ;STATION ADDRESS, LINK AND PORT
                1061                       ;CONTROL FOR ALL FRAMES IS NOW
                1062                       ;SET IN DATA LINK BUFFER FOR
                1063                       ;TRANSMISSION.
4698 010080     1064   IFRMF:LXI B,FRMA    ;RE-INITIALIZE DLB POINTER
469B 3AE180     1065         LDA FMCNT
469E 6F         1066         MOV L,A       ;SET FRAME COUNTER
469F 3E04       1067   RXMT:MVI A,04H
```

```
46A1 32D380    1068         STA BYCNT      ;SET TO XMT A BYTE COUNT OF 4
46A4 CDB145    1069         CALL IFRMS     ;SUBROUTINE TO TRANSMIT I-
               1070                        ;FRAMES TO SECONDARY STATION,
               1071                        ;RECEIVE AND CHECK ITS ACKNOW-
               1072                        ;LEDGE.
46A7 3ADF80    1073         LDA NEST       ;GET ERROR FLAGS
46AA E603      1074         ANI 03H        ;MASK FOR LAST(REJECT RECEIVED)
46AC C29F46    1075         JNZ RXMT       ;IF LAST SET, THEN RETRANSMIT.
               1076                        ;NOTE THAT IFRMS HAS SET FRAME
               1077                        ;COUNTER (L) AND DLB POINTER
               1078                        ;(C) TO POINT OF REJECTION
46AF 3ADF80    1079         LDA NEST       ;GET ERROR FLAGS (GENERATED BY
               1080                        ;IFRMS)
46B2 E6A0      1081         ANI 0A0H       ;MASK FOR NEXT
46B4 C22447    1082         JNZ RRTN       ;IF NEXT IS SET THEN QUIT, NEXT
               1083                        ;WOULD HAVE BEEN SET IN THE RE-
               1084                        ;CEIVE OR CHECK ROUTINES OF
               1085                        ;IFRMS.
46B7 3ADF80    1086         LDA NEST
46BA E650      1087         ANI 50H        ;MASK FOR REINITIALIZE
46BC C21E46    1088         JNZ INITL      ;IF REINIT THEN BACK TO BEGIN-
               1089                        ;NING. ELSE PROCEED TO RCV.
               1090                        ;AND CHECK DATA IN I-FRAMES
               1091                        ;FROM WHICH THE SECONDARY STA-
               1092                        ;TION TO WHICH THE PROCEEDING
               1093                        ;READ REQUEST WAS ISSUED.
46BF 3AE180    1094         LDA FMCNT      ;GET I-FRAME COUNT
46C2 32EA80    1095         STA RPCNT      ;PUT IN REPEAT COUNT, A TEMP-
               1096                        ;ORARY LOCATION WHICH MAY BE
               1097                        ;MOD IED WHEN SOME (NOT ALL)
               1098                        ;OF THE RECEIVED FRAMES MUST
               1099                        ;BE REJECTED.
46C5 0F        1100         RRC            ;FRAME COUNT IS PLACED IN PRO-
46C6 0F        1101         RRC            ;PER LOCATION TO EQUAL NR FROM
46C7 0F        1102         RRC            ;SEC STN.
46C8 32E980    1103         STA ACKN       ;SET EXPECTED LINK CONTROL
46CB 3AE480    1104         LDA DBCNT      ;GET DATA BYTE COUNT
46CE C604      1105         ADI 04H        ;ADD CONTROL BYTE COUNT
46D0 32D380    1106         STA BYCNT      ;SET FRAME BYTE COUNT
46D3 010080    1107         LXI B,FRMA     ;SET DLB POINTER TO ZERO(B&C
               1108                        ;REG)
46D6 79        1109         MOV A,C        ;GET DLB POINTER (LS 8-BITS)
46D7 32EB80    1110         STA RPFRM      ;PUT IN REPEAT FRAME, A TEMP-
               1111                        ;ORARY DLB POINTER WHICH MAY
               1112                        ;BE MODIFIED WHEN SOME OF THE
               1113                        ;RECEIVED FRAMES MUST BE RE-
               1114                        ;JECTED
46DA 3E40      1115         MVI A,40H      ;TIME OUT DELAY, 1.6 MILLISECS/
               1116                        ;FRAME
46DC 32DE80    1117         STA DLYA       ;MINOR COUNTER
               1118                        ;THE FOLLOWING IS COMMON TO
               1119                        ;ALL I-FRAME RECEPTIONS, ORIG-
               1120                        ;INAL OR REPEATS.
46DF 3AEA80    1121    RRPT:LDA RPCNT      ;I-FRAME COUNT(SET ABOVE OR IN
               1122                        ;MSGCHK)
46E2 32DD80    1123         STA DLYB       ;TIME OUT DELAY-MAJOR COUNTER
46E5 6F        1124         MOV L,A        ;SET FRAME COUNTER
46E6 CD6A40    1125         CALL RCVCD     ;RECEIVER SUBROUTINE
46E9 3ADF80    1126         LDA NEST       ;ERROR FLAGS-MAY BE SET DUE
               1127                        ;TO TIME OUT ONLY
46EC E603      1128         ANI 03H        ;MASK FOR LAST (I.E. TRY A-
               1129                        ;GAIN
46EE C29846    1130         JNZ IFRMF      ;IF LAST SET THEN THE ENTIRE
               1131                        ;READ REQUEST MUST BE RETRANS-
               1132                        ;MITTED.
               1133                        ;THIS IS ONLY ALLOWED ONCE
46F1 3ADF80    1134         LDA NEST       ;ERROR FLAG CHECK CONTINUED
46F4 E6A0      1135         ANI 0A0H       ;MASK FOR NEXT
46F6 C22447    1136         JNZ RRTN       ;IF NEXT IS SET THEN MORE
               1137                        ;THAN ONE TIME OUT OCCURED
               1138                        ;AT THIS STATION, SO QUIT,
               1139                        ;ELSE MSG WAS RECEIVED AND IT
```

```
46F9 3AEB80   1140                              ;CAN BE CHECKED
              1141        LDA  RPFRM            ;GET DLB POINTER REF
46FC 4F       1142        MOV  C,A              ;SET DLB POINTER
46FD 3AEA80   1143        LDA  RPCNT            ;GET FRAME COUNT REF
4700 6F       1144        MOV  L,A              ;SET FRAME COUNTER
4701 CD7742   1145        CALL MSGCHK           ;CHECK RECEIVED I-FRAMES
4704 3ADF80   1146        LDA  NEST             ;ERROR FLAGS AGAIN
4707 E6A0     1147        ANI  0A0H             ;MASK FOR NEXT
4709 C22447   1148        JNZ  RRTN             ;IF NEXT IS SET THEN THERE
              1149                              ;HAVE BEEN MULTIPLE ERRORS AT
              1150                              ;THIS STATION, SO QUIT.
470C 3ADF80   1151        LDA  NEST
470F E650     1152        ANI  50H
4711 C21E46   1153        JNZ  INITL            ;REINITIALIZE READ CYCLE
4714 3ADF80   1154        LDA  NEST
4717 E60C     1155        ANI  0CH              ;MASK FOR REJECT
4719 C23B47   1156        JNZ  FRMREJ           ;IF REJECT IS SET THEN GO FOR
              1157                              ;REQUESTING A REPEAT.
471C 3ADF80   1158        LDA  NEST
471F E603     1159        ANI  03H              ;MASK FOR LAST. AT THIS POINT
              1160                              ;IN THE RECEIVE CYCLE THIS IS
              1161                              ;AN ILLEGAL FLAG FOR MSGCHK
              1162                              ;TO GENERATE. EXPECT AN I-
              1163                              ;FRAME BUT SEC STN HAS ISSUED
              1164                              ;A REJECT. MUST TREAT THIS AS
              1165                              ;AN ERROR.
4721 C23147   1166        JNZ  SETREJ           ;IF LAST IS SET THEN REJECT
              1167                              ;ELSE ACCEPT THE MESSAGE
4724 AF       1168   RRTN:XRA  A
4725 32E280   1169        STA  FAULT
4728 3AD780   1170        LDA  TORQ
472B E6F0     1171        ANI  0F0H             ;CLEAR SUBCYCLE ERROR FLAGS
472D 32D780   1172        STA  TORQ             ;AT END OF READ CYCLE
4730 C9       1173        RET                   ;FROM HERE THE PROGRAM WILL
              1174                              ;GO TO THE FIRST WRITE ROU-
              1175                              ;TINE IF NEXT IS NOT SET
              1176                              ;OTHERWISE THE PROGRAM WILL
              1177                              ;GO TO THE NEXT READ ROUTINE.
              1178                              ;SETREJ IS ONLY NECESSARY IF
              1179                              ;LAST HAS BEEN SET.
4731 2E01     1180   SETREJ:MVI L,01H           ;SET FRAME COUNT
4733 01CD80   1181        LXI  B,CXMT           ;SET DLB POINTER
4736 3E02     1182        MVI  A,02H            ;SET BYTE COUNT
4738 32D380   1183        STA  BYCNT
473B 3AEA80   1184   FRMREJ:LDA RPCNT           ;FRAME COUNTER (CURRENT L)
473E 3C       1185        INR  A                ;INCR TO PLACE PROPER SIG-
              1186                              ;NIFICANCE
473F 67       1187        MOV  H,A              ;TO HOLD THAT THOUGHT
4740 3AE180   1188        LDA  FMCNT            ;ORIGINAL FRAME COUNT RE-
              1189                              ;QUESTED
4743 94       1190        SUB  H                ;SUBTRACTION GIVES THE NUM-
              1191                              ;BER OF FRAMES TO BE REPEAT-
              1192                              ;ED
4744 0F       1193        RRC                   ;POSITIONS COUNT INTO NR OF
4745 0F       1194        RRC                   ;THE LINK CONTROL BYTE
4746 0F       1195        RRC
4747 F619     1196        ORI  19H              ;COMBINE NR WITH BASIC REJ
              1197                              ;CODE
4749 32CE80   1198        STA  CXMT+1           ;SET 2ND BYTE IN XMT DLB
474C 3AE080   1199        LDA  LFRM             ;GET CURRENT DLB FRAME
              1200                              ;POINTER
474F 32EB80   1201        STA  RPFRM
4752 CD0040   1202        CALL XMTCD            ;TRANSMIT THE REJECT
4755 3AEB80   1203        LDA  RPFRM
4758 4F       1204        MOV  C,A              ;SET DLB POINTER TO WHERE IT
              1205                              ;LAST LEFT OFF IN RECEIVING
              1206                              ;DATA
4759 C3DF46   1207        JMP  RRPT             ;RETURN TO RECEIVE MODE
              1208                              ;SECONDARY STATION WILL BE
              1209                              ;SENDING FRAMES FROM THE
              1210                              ;POINT INDICATED IN REJ CODE
              1211   ;----------------------------------------------------
                     ;-----------------------
```

```
                        1212
                        1213
                        1214 WRITE:
                        1215 ;              WRITE SUBROUTINE
                        1216 ;THE WRITE SUBROUTINE IS A COMPANION TO THE READ SUB-
                        1217 ;ROUTINE. BOTH ARE AT THE SAME TOP LEVEL OF ALL THE
                        1218 ;NESTED SUBROUTINES. THE READ SUBROUTINE OBTAINS DATA
                        1219 ;FROM A SOURCE STATION. THE DATA IS STORED IN THE PRO-
                        1220 ;PER ORDER IN THE PRIMARY STATION DATA LINK BUFFER
                        1221 ;(DLB). WITH ONE INPUT VARIABLE, THE STATION NUMBER
                        1222 ;OF THE DESTINATION, IT IS THE WRITE ROUTINE WHICH
                        1223 ;PERFORMS THE DELIVERY OPERATION. THE SEQUENCE OF THIS
                        1224 ;OPERATION IS:
                        1225 ;         (1) FIND THE STATION ADDRESS FROM THE
                        1226 ;             STATION NUMBER (AFDADD)
                        1227 ;         (2) SET THE NORMAL RESPONSE MODE IN
                        1228 ;             THE SECONDARY STATION (SNRM)
                        1229 ;         (3) ALTER THE LINK AND PORT CONTROL
                        1230 ;             CODES IN EACH FRAME TO THE WRITE
                        1231 ;             MODE-
                        1232 ;         (4) TRANSMIT THE WRITE COMMAND AND DA-
                        1233 ;             TA (IFRMS)
                        1234 ;WRITE CALLS SUBROUTINES FDADD, SNRM AND IFRMS.
                        1235 ;
                        1236 ;
475C 3ADF80             1237  INITAL:LDA NEST     ;GET ERROR FLAGS
475F E6A0               1238        ANI 0A0H      ;MASK FOR NEXT
4761 C0                 1239        RNZ           ;IF NEXT IS SET THEN RETURN
                        1240                      ;NEXT WAS SET IN PREVIOUS
                        1241                      ;READ SUBROUTINE.
4762 3ADB80             1242        LDA STADD     ;ELSE GET STATION NUMBER
4765 3D                 1243        DCR A
4766 6F                 1244        MOV L,A       ;HOLD FOR AFDADD
4767 CDA841             1245        CALL FDADD    ;FIND STATION ADDRESS
476A 32CD80             1246        STA CXMT      ;PUT IN CONTROL XMT BUFFER
476D CD6545             1247        CALL SNRM     ;SET NORMAL RESPONSE MODE IN
                        1248                      ;THE ABOVE STATION
4770 3ADF80             1249        LDA NEST      ;GET ERROR FLAGS
4773 E6F0               1250        ANI 0F0H      ;MASK FOR NEXT AND REINITIAL-
                        1251                      ;IZE
                        1252                      ;IF NEXT SET THEN RETURN.
                        1253                      ;NEXT MAY HAVE BEEN SET DUE
                        1254                      ;TO XMTN ERROR OR STATION IS
                        1255                      ;DISCONNECTED
4775 C25C47             1256        JNZ INITAL
4778 010080             1257        LXI B,FRMA    ;ELSE SET DLB POINTER TO STA-
                        1258                      ;TION ADDRESS OF FIRST FRAME
477B 3AE180             1259        LDA FMCNT     ;GET FRAME COUNT
477E 6F                 1260        MOV L,A       ;SET FRAME COUNT
477F 3ACD80             1261  SETCTL:LDA CXMT     ;GET STATION ADDRESS
4782 02                 1262        STAX B        ;PUT IN FIRST BYTE IN FRAME
4783 0C                 1263        INR C         ;INCREMENT DLB POINTER
4784 0A                 1264        LDAX B        ;GET FRAME LINK CONTROL RE-
                        1265                      ;CEIVED FROM SOURCE(READ)
4785 E61F               1266        ANI 1FH       ;CLEAR NR (THE PREVIOUS RE-
                        1267                      ;CEIVED COUNT)
4787 02                 1268        STAX B        ;SET FRAME LINK CONTROL
4788 0C                 1269        INR C         ;INCR DLB POINTER TO NEXT BYTE
4789 0A                 1270        LDAX B        ;GET PORT CONTROL +1
478A E67F               1271        ANI 7FH       ;CLEAR MSB PORT CONTROL EQ.
                        1272                      ;WRITE
478C 02                 1273        STAX B        ;SET PORT CONTROL
478D 79                 1274        MOV A,C       ;GET DLB POINTER
478E C626               1275        ADI 26H       ;SET TO NEXT FRAMES STATION
                        1276                      ;ADDRESS
4790 4F                 1277        MOV C,A       ;SET DLB POINTER
4791 2D                 1278        DCR L         ;DECR FRAME COUNTER
4792 C27F47             1279        JNZ SETCTL    ;IF NOT LAST FRAME THEN GO
                        1280                      ;BACK AND ALTER CONTROL IN
                        1281                      ;NEXT FRAME
4795 010080             1282        LXI B,FRMA    ;ELSE SET DLB POINTER TO FIRST
                        1283                      ;FRAME
```

```
                        1284            LDA  FRCNT        ;GET FRAME COUNT
                        1285            MOV  L,A          ;SET FRAME COUNTER
                        1286    WXMT    LDA  DBCNT        ;GET DATA BYTE COUNT
47A6                    1287            ADI  04H          ;ADD CONTROL BYTE COUNT
47A1                    1288            STA  BYCNT        ;SET XMT BYTE COUNT
47A4                    1289            CALL IFRMS        ;SUBROUTINE TO TRANSMIT I
                        1290                              ;-FRAMES TO SECONDARY STATION,
                        1291                              ;RECEIVE AND CHECK ITS ACKNOW-
                        1292                              ;LEDGE OR REJECT
47A7                    1293            LDA  NEST         ;GET ERROR FLAGS
47AA                    1294            ANI  03H          ;MASK FOR LAST(REJECT RECEIVED)
47AC                    1295            JNZ  SETREJ       ;IF LAST SET THE RETRANSMIT.
                        1296                              ;NOTE THAT IFRMS SUBROUTINE HAS
                        1297                              ;SET FRAME COUNTER(L) AND DLB
                        1298                              ;POINTER(C) AT THE REJECTED
                        1299                              ;FRAME (NR)
47AF                    1300            LDA  NEST
47B1                    1301            ANI  50H
47B4                    1302            JNZ  INITAL
47B7                    1303    WRTN    XRA  A            ;RETURN. NOTE NEXT MAY HAVE BEEN
47B8                    1304            STA  NEST         ;SET IN THE RECEIVE OR CHECK ROU
47BB                    1305            RET               ;TINES OF IFRMS. IT MUST BE
                        1306                              ;CLEARED SO THAT THE NEXT WRITE
                        1307                              ;ROUTINE CAN OPERATE
                        1308            END
```

PUBLIC SYMBOLS
FDADD   A 41A8    IFRMS   A 4581    MSGCHK  A 4277    RCVCD   A 406A
READ    A 461E    SBTST   A 41F2    SNRM    A 4565    TEST    A 44B2
WRITE   A 475C    XMTCD   A 4000

EXTERNAL SYMBOLS

USER SYMBOLS
AAI     A 41FA    ABC     A 4309    ACKN    A 80E9    ADDR    A 41C2
ADDRA   A 431A    ADDRB   A 434B    ADFLT   A 4372    ALARM   A 43AA
BALT    A 80E8    BB1     A 4203    BCFLT   A 4485    BEGIN   A 4277
BYCNT   A 80D0    CHECK   A 4283    CNTNU   A 44A3    CREC    A 80EE
CRCV    A 80C8    CSCS    A 80EC    CSTA    A 80ED    CTBC    A 80D2
CTBF    A 80CF    CYCL    A 80E7    DADD    A 454E    DASA    A 40B7
DBCNT   A 80D4    D1      A 4222    DELAY   A 401B    DISPA   A 80E6
DISPB   A 80E5    DLYA    A 80DE    DLYB    A 80DD    DLYXMT  A 4063
DSTR    A 4091    ECNT    A 80E3    EE1     A 426D    FAA     A 41B2
FAB     A 41B5    FAULT   A 80E2    FDADD   A 41A8    FMCNT   A 80E1
FMMSG   A 4492    FRAMES  A 45FA    FRMA    A 8000    FRMADD  A 460D
IFRMS   A 4581    INITAL  A 475C    INITL   A 461E    LAST    A 4450
LCRFF   A 4208    LCNTRL  A 43BC    LCSGN   A 443F    LFRM    A 80E0
LRCV    A 42C6    LSTAT   A 40CD    MSGCHK  A 4277    NEST    A 80DF
NEXT    A 4495    QUIT    A 4410    PCSGN   A 437D    RCVBC   A 4456
RCVCD   A 406A    RCVD    A C000    RCVS    A C800    READ    A 461E
RETJCT  A 413F    RETRPT  A 456F    REPEAT  A 43E0    RNFRM   A 40FD
RPCNT   A 80EA    RXMT    A 469F    RRPT    A 46DF    RRTN    A 4724
RET1    A 4420    SBTST   A 41F2    SADDR   A 4647    SBTST   A 41F2
SETCTL  A 477F    SETREJ  A 4731    SHBT    A 80DC    SNRM    A 4565
STACK   A 80DB    START1  A 4000    START2  A 406A    STAT    A 80DA
STXMT   A 80D4    STOP    A 403C    STRTH   A 80D9    STRTL   A 80D8
TBEA    A 40CE    TBEB    A 4048    TCNTNU  A 44DC    TDISP   A 4549
TEST    A 44B2    TMOUT   A 4108    TOA     A 4117    TOB     A 4122
TOC     A 412A    TOD     A 4130    TOE     A 4141    TOF     A 4163
TOG     A 4170    TOH     A 4174    TOJ     A 417D    TOK     A 4191
TOM     A 4150    TOPO    A 80D7    TOTST   A 407D    TST1    A 44D7
TSTF    A 80D6    TSTR    A 80D5    WRITE   A 475C    WRONG   A 41C0
WRTN    A 47B7    WXMT    A 479C    XMTCD   A 4000    XMTD    A D000
XMTA    A D800    XRPT    A 45B1

ASSEMBLY COMPLETE,   NO ERRORS

APPENDIX B

```
LOC   OBJ        LINE        SOURCE STATEMENT

1    $MACROFILE PAGEWIDTH(80) MOD85
                 2    ;SECONDARY STATION MAIN PROGRAM LIST
                 3
                 4
0000             5              ORG  0000H
0000  3EFF       6              MVI  A,0FFH     ;SET DATA DIRECTION OF PC1
                 7                              ;PORT TO OUTPUT
0002  D302       8              OUT  02H
0004  3E9D       9              MVI  A,9DH      ;SET DATA DIRECTION OF STN.
                 10                             ;CNTL. PORT TO I/O
0006  D303      11              OUT  03H
0008  3E03      12              MVI  A,03H      ;SET DATA DIRECTION OF STN.
                 13                             ;CNTL. STA -IN, PC2 & DATA-OUT
000A  D380      14              OUT  80H
000C  3E18      15              MVI  A,18H      ;SET STATION MODE CONTROL
000E  3200E8    16              STA  0E800H
0011  3E0B      17              MVI  A,0BH      ;SET INTRUPT MASKS - EXCL 7.5
0013  30        18              SIM
0014  C37600    19              JMP  START
0038            20              ORG  0038H      ;RST 7
0038  00        21              NOP
0039  C37600    22              JMP  START
003C  01C880    23              LXI  B,CRVC     ;RST 7.5--THE FOLLOWING, TO
                 24                             ;THE START LABEL, ENABLES THE
                 25                             ;STATION TO RECOVER AN INCOMING MES-
                 26                             ;SAGE AFTER AN INTERUPT IN THE PORT
                 27                             ;ROUTINE.
003F  31FF80    28              LXI  SP,80FFH   ;INITIALIZE STACK POINTER
0042  2600      29              MVI  H,00H      ;CLEAR BYTE COUNTER
0044  DB01      30              IN   01H        ;GET STATION CONTROL
0046  E6EF      31              ANI  0EFH       ;RESET CDPE ONLY(PHASE ERROR
                 32                             ;LATCH)
0048  D301      33              OUT  01H
004A  1A        34    GETDAT:   LDAX D          ;GET DATA. NOTE, INTERRUPT
                 35                             ;INDICATED THAT DATA IS AVAIL-
                 36                             ;ABLE.
004B  02        37              STAX B          ;PUT DATA IN DLB
004C  0C        38              INR  C          ;INCREMENT DLB POINTER
004D  24        39              INR  H          ;INCREMENT BYTE COUNT
004E  DB83      40    GETDS:    IN   83H        ;GET STATION CONTROL STATUS
0050  E605      41              ANI  05H        ;MASK FOR DA OR SA
0052  CA4E00    42              JZ   GETDS      ;IF NO DATA OR STATUS AVAIL-
                 43                             ;ABLE, THEN LOOK AGAIN.
0055  E601      44              ANI  01H        ;ELSE MASK FOR DATA AVAILABLE
0057  C24A00    45              JNZ  GETDAT     ;IF DATA AVAIL. THEN GET DATA
005A  01EC80    46              LXI  B,CSCS     ;ELSE GET DLB PNTR TO STATUS
                 47                             ;STORAGE
005D  DB83      48              IN   83H        ;GET STATION CONTROL STATUS
005F  02        49              STAX B          ;STORE IN DLB
0060  0C        50              INR  C          ;INCR DLB PNTR
0061  3A00C8    51              LDA  RCVS       ;GET RECEIVER STATUS
0064  02        52              STAX B          ;STORE IN DLB,CSTA
0065  0C        53              INR  C          ;INCR DLB PNTR
0066  7C        54              MOV  A,H        ;GET RECEIVED BYTE COUNT
0067  02        55              STAX B          ;STORE IN DLB,CRBC
0068  DB01      56              IN   01H        ;GET STATION CONTROL
006A  E6FE      57              ANI  0FEH       ;RESET RXE
006C  F610      58              ORI  10H        ;SET CDPE ONLY
006E  D301      59              OUT  01H        ;EXECUTE RECEIVER SHUTDOWN
0070  01C880    60              LXI  B,CRVC     ;SET DLB POINTER TO START OF
                 61                             ;CONTROL FRAME RECEIVED.
0073  C38A00    62              JMP  CHECK
                 63                             ;THIS IS THE BEGINNING OF THE
                 64                             ;NORMAL SECONDARY STATION ROUTINE
0076  3E1F      65    START:    MVI  A,1FH      ;MASK ALL INTERRUPTS
                 66                             ;AND RESET RST 7.5 FF
0078  30        67              SIM
0079  01C880    68              LXI  B,CRVC     ;SET DLB POINTER
```

```
007C 31FF80        69            LXI  SP,80FFH      ;INITIALIZE STACK POINTER
007F DBC0          70            IN   0C0H          ;GET STATION ADDRESS
0081 3200E0        71            STA  0E000H        ;PUT IN SDLC CONTROLLER REG
0084 CD1C04        72            CALL RCVCTL        ;GO TO CONTROL RECEIVE SUBR.
                   73                               ;NOTE:NORMALLY, WHEN THE STA-
                   74                               ;TION IS NOT RESPONDING TO A PRIMARY
                   75                               ;STATION COMMAND, THE SECONDARY STA-
                   76                               ;TION WILL BE IN RCVCTL AWAITING IN-
                   77                               ;STRUCTIONS.
0087 010C80        78            LXI  B,CRVC        ;SET DLB POINTER TO RECEIVE
                   79                               ;CONTROL FRAME AGAIN FOR
                   80                               ;CHECKING.
008A AF            81     CHECK:XRA A
008B 32E680        82            STA  LSTRPT        ;CLEAR ERROR FLAGS
008E CD3C01        83            CALL CHKCTL        ;GO TO CONTROL FRAME CHECK
                   84                               ;ROUTINE
0091 3AE680        85            LDA  LSTRPT
0094 E60F          86            ANI  0FH           ;IF LAST FLAG
0096 C27600        87            JNZ  START         ;   THEN RESTART
0099 3AE980        88            LDA  LSTXMT        ;ELSE GET SUBROUTINE DIREC-
                   89                               ;TIVE FLAGS
009C FE10          90            CPI  10H           ;IF TEST FLAG
009E CAC100        91            JZ   TSTRTN        ;THEN GO TO TEST ROUTINE
00A1 FE20          92            CPI  20H           ;IF RNR FLAG
00A3 CABB00        93            JZ   PORTN         ;THEN GO TO PORT ROUTINE
00A6 2E00          94            MVI  L,00H         ;ELSE MUST BE I-FRAME COMING
                   95                               ;NEXT. RESET FRAME COUNTER
00A8 010080        96            LXI  B,FRMA        ;SET DLB POINTER
00AB CD6A04        97     DATAIN:CALL IFRMD         ;GO TO DATA RECEIVE AND CHECK
                   98                               ;ROUTINE
00AE 3AE680        99            LDA  LSTRPT
00B1 FE0A         100            CPI  0AH           ;IF LAST
00B3 CA8A00       101            JZ   CHECK         ;THEN RECHECK CONTROL(CONTROL
                  102                               ;FRAME RECEIVED)
00B6 FEA0         103            CPI  0A0H          ;IF REJECT
00B8 CAAB00       104            JZ   DATAIN        ;THEN RECEIVE NEW DATA
00BB CD2502       105     PORTN:CALL PORT
00BE C37600       106            JMP  START
00C1 CD2403       107     TSTRTN:CALL SSTEST
00C4 C37600       108            JMP  START
                  109
                  110            ;SUBROUTINES
                  111     $      INCLUDE(:F1:SECS3B.SRC)
                = 112     ;COMM SECONDARY STATION SUBROUTINE LIST (NO END)
                = 113
                = 114
80E1            = 115     BYCNT EQU 80E1H ;TOTAL BYTE COUNT FOR TRANSMISSION
80EE            = 116     CRBC  EQU 80EEH ;RCVD CONTROL FRAME BYTE COUNT
80C8            = 117     CRVC  EQU 80C8H ;TOP OF RCVD CONTROL FRAME (ADDR)
80EC            = 118     CSCS  EQU 80ECH ;STN CTL STATUS IN RCVD CONTROL FRAME
80ED            = 119     CSTA  EQU 80EDH ;RCVR STATUS IN RCVD CONTROL FRAME
80D2            = 120     CTBC  EQU 80D2H ;XMTD CONTROL FRAME BYTE COUNT
80CD            = 121     CXMT  EQU 80CDH ;TOP OF XMTD CONTROL FRAME
80E2            = 122     ERRCNT EQU 80E2H ;STATION ERROR HISTORY-XMTD TO
                = 123                      ;PRIMARY STATION IN TEST
80E3            = 124     FLAGS EQU 80E3H ;MINOR COUNTER FOR TRANSMISSION DELAY
80E4            = 125     FMCNT EQU 80E4H ;RCVD AND XMTD FRAME COUNT
8000            = 126     FRMA  EQU 8000H ;TOP OF DATA LINK BUFFER-1ST BYTE,
                = 127                      ;1ST FRAME
80E5            = 128     LFRM  EQU 80E5H ;BOOTSTRAP REFERENCE FOR MULTIPLE
                = 129                      ;FRAME ADDRESS
80E6            = 130     LSTRPT EQU 80E6H ;ERROR FLAGS, REJECT (A0)& LAST(0A)
C000            = 131     RCVD  EQU 0C000H ;RECEIVER REGISTER-SDLC
C800            = 132     RCVS  EQU 0C800H ;RECEIVER STATUS-SDLC
80E7            = 133     RCVST EQU 80E7H ;HOLDING POINT FOR RECEIVER STATUS-
                = 134                      ;WHEN ERROR
80E8            = 135     STAST EQU 80E8H ;HOLDING POINT FOR STATION STATUS
80E9            = 136     LSTXMT EQU 80E9H ;FLAG INDICATING TYPES OF LAST
                = 137                      ;TRANSMISSION
D000            = 138     XMTD  EQU 0D000H ;TRANSMITTER REGISTER-SDLC
D800            = 139     XMTS  EQU 0D800H ;TRANSMITTER STATUS-SDLC
80E0            = 140     PBYCNT EQU 080E0H ;PORT DATA BYTE COUNT
```

```
80DF            = 141  NRNS EQU 080DFH    ;FRAME SEND AND RECEIVER COUNT
80DE            = 142  WOM EQU 80DEH      ;SPARE LOCATION FOR ANALYZER DIAG-
                = 143                     ;NOSTICS
                = 144
                = 145
                = 146  XMTDAT:            ;XMTDAT SUBROUTINE
                = 147  ;THIS SUBROUTINE IS A SERAIL I/O DRIVER FOR THE SDLC
                = 148  ;CHIP AND IS USED TO TRANSMIT CONTROL RESPONSES AND
                = 149  ;I-FRAMES (DATA). XMTDAT IS CALLED BY SUBROUTINES
                = 150  ;CHKCTL, IFRMD AND PORT.
00C7 DB83       = 151       BUSY:IN 83H
00C9 E610       = 152            ANI 10H        ;CHECK BUSY(TRANSMISSION LINE
                = 153                           ;ACTIVE)
00CB C2C700     = 154            JNZ BUSY
00CE 79         = 155       START1:MOV A,C      ;SET LAST FRAME ADDR.
00CF 32E580     = 156            STA LFRM
00D2 DBC0       = 157            IN 0C0H        ;GET STATION ADDRESS
00D4 02         = 158            STAX B         ;PUT IN DLB
00D5 3AE180     = 159            LDA BYCNT      ;GET BYTE COUNT
00D8 67         = 160            MOV H,A        ;SET BYTE COUNTER
00D9 1100D0     = 161            LXI D,XMTD     ;SET OUTPUT POINTER-SDLC
00DC 3E01       = 162            MVI A,01H
00DE 3200D8     = 163            STA XMTS       ;SET TSOM(START OF MSG)
00E1 DB01       = 164            IN 01H         ;GET STATION CONTROL
00E3 F680       = 165            ORI 80H
00E5 D301       = 166            OUT 01H        ;SET TXE ONLY(XMT ENABLE)
00E7 3E03       = 167            MVI A,03H      ;SET A MINOR DELAY COUNTER
00E9 32E380     = 168            STA FLAGS
00EC 3AE380     = 169       DELAY:LDA FLAGS     ;DELAY FOR TWO FLAG TRANS-
                = 170                           ;MISSION
00EF 3D         = 171            DCR A          ;REQUIRES 43 + MICROSECS
00F0 32E380     = 172            STA FLAGS
00F3 00         = 173            NOP
00F4 C2EC00     = 174            JNZ DELAY
00F7 0A         = 175            LDAX B         ;GET DATA FROM DLB
00F8 12         = 176            STAX D         ;TO XMT REGISTER SDLC
00F9 0C         = 177            INR C          ;INCR. DLB POINTER
00FA 25         = 178            DCR H          ;DECR. BYTE COUNTER
00FB 3E00       = 179            MVI A,00H      ;RESET TSOM
00FD 3200D8     = 180            STA XMTS       ;EXECUTE
0100 DB83       = 181       TBEA:IN 83H         ;TEST XMT BUFFER EMPTY
0102 E620       = 182            ANI 20H
0104 CA0001     = 183            JZ TBEA        ;IF NOT EMPTY THEN KEEP
                = 184                           ;TESTING
0107 0A         = 185            LDAX B         ;ELSE GET DATA FROM DLB
0108 12         = 186            STAX D         ;AND TRANSMIT BYTE
0109 0C         = 187            INR C          ;INCREMENT DLB POINTER
010A 25         = 188            DCR H          ;DECR BYTE COUNTER
010B C20001     = 189            JNZ TBEA       ;IF NOT LAST BYTE
                = 190                           ;TRANSMIT NEXT ONE
010E DB83       = 191       STOP:IN 83H         ;ELSE TEST BUFFER AGAIN
0110 E620       = 192            ANI 20H
0112 CA0E01     = 193            JZ STOP        ;IF NOT EMPTY THEN KEEP
                = 194                           ;TESTING
0115 3E02       = 195            MVI A,02H      ;ELSE SET TEOM(END OF MSG)
0117 3200D8     = 196            STA XMTS       ;EXECUTE
011A DB83       = 197       TBEB:IN 83H         ;TEST XMIT BUFFER AGAIN
011C E620       = 198            ANI 20H
011E CA1A01     = 199            JZ TBEB        ;IF NOT EMPTY THEN KEEP
                = 200                           ;TESTING
0121 AF         = 201            XRA A          ;ELSE RESET TEOM
0122 3200D8     = 202            STA XMTS
0125 DB01       = 203            IN 01H         ;GET STATION CONTROL
0127 E620       = 204            ANI 20H        ;RESET TXE ONLY(TERMINATE
                = 205                           ;TRANSMISSION)
0129 D301       = 206            OUT 01H        ;EXECUTE
012B 2D         = 207            DCR L          ;DECR FRAME COUNT
012C C8         = 208            RZ             ;IF LAST FRAME THEN RETURN
012D 3AE580     = 209            LDA LFRM       ;ELSE GET FRAME ADDRESS RE-
                = 210                           ;FERENCE
0130 C628       = 211            ADI 28H        ;INCR TO NEXT FRAME ADDR.
0132 4F         = 212            MOV C,A        ;SET DLB POINTER
```

```
0133 264F     = 213           MVI  H,4FH        ;DELAY SENDING THE NEXT FRAME
0135 25       = 214  DLYXMT:DCR  H              ;UNTIL PRIMARY STATION HAS
              = 215                             ;TIME TO POSITION ITSELF(553
              = 216                             ;MICROSECS)
0136 CACE00   = 217           JZ   START1
0139 C33501   = 218           JMP  DLYXMT
              = 219
              = 220
              = 221
              = 222  CHKCTL:                    ;CHKCTL SUBROUTINE
              = 223  ;THIS SUBROUTINE CHECKS THE RECEIVED CONTROL FRAME
              = 224  ;FOR ERRORS.  IT CALLS XMTDAT TWICE.
013C 3AEC80   = 225   DPE1:LDA  CSCS            ;GET STATION CNTRL STAT
013F E608     = 226           ANI  08H          ;MASK FOR DPE(DATA PHASE
              = 227                             ;ERROR)
0141 CA6801   = 228           JZ   STAT1        ;IF NO PHASE ERROR THEN
              = 229                             ;CHECK RCVR STAT.
0144 3AEC80   = 230  REJEC1:LDA  CSCS           ;ERROR FOUND, DPE OR CRC
0147 32E880   = 231           STA  STAST        ;STORE STN CNTRL STAT
014A 3AED80   = 232           LDA  CSTA         ;GET RECEIVER STAT
014D 32E780   = 233           STA  RCVST
0150 3E19     = 234           MVI  A,19H        ;CODE FOR REJ,NR=0
0152 32CE80   = 235           STA  CXMT+1       ;SET LINK CONTROL
0155 3E02     = 236           MVI  A,02H        ;SET REJ FLAG
0157 32E980   = 237           STA  LSTXMT
015A 3E0A     = 238           MVI  A,0AH        ;SET LAST. NOTE, SETTING
015C 32E680   = 239           STA  LSTRPT       ;LAST PUTS STATION BACK IN
015F 2616     = 240           MVI  H,16H        ;RCVCTL ROUTINE AFTER TRANS-
0161 25       = 241  FDLY:DCR  H                ;MITTING REJECT.
0162 C26101   = 242           JNZ  FDLY         ;APPROX. 100 MICROSEC. DELAY
0165 C3C501   = 243           JMP  XMTRC
0168 3AED80   = 244  STAT1:LDA  CSTA            ;GET RCVR STAT
016B E6FC     = 245           ANI  0FCH         ;MASK FOR ALL STATUS FAULTS
016D CA7601   = 246           JZ   GETLC        ;IF NONE THEN CHECK LINK
              = 247                             ;CONTROL
0170 E680     = 248           ANI  80H          ;MASK FOR CRC ERROR
0172 C24401   = 249           JNZ  REJEC1       ;IF NOT ZERO THEN REJECT,
              = 250                             ;ELSE ABC,ABORT OR OVERRUN. RE-
              = 251                             ;INITIALIZE AND AWAIT NEXT.
0175 FF       = 252           RST  7
0176 3AC980   = 253  GETLC:LDA  CRVC+1          ;STATS OK. GET RCVD LINK CTL
0179 67       = 254           MOV  H,A          ;HOLD IT FOR COMPARISON
017A E61F     = 255           ANI  1FH          ;TEST FOR REJ - MASK OUT NR
017C FE19     = 256           CPI  19H          ;COMPARE EITH BASIC REJECT
              = 257                             ;CODE
017E CAE301   = 258           JZ   REPEAT       ;IF COMPARE THEN REPEAT
0181 3EF3     = 259           MVI  A,0F3H       ;ELSE CHECK FOR TEST CODE
0183 BC       = 260           CMP  H
0184 C29601   = 261           JNZ  SNRM         ;IF NOT A TEST THEN CHECK
              = 262                             ;SNRM
0187 DB01     = 263           IN   01H          ;GET STATION CONTROL
0189 E642     = 264           ANI  42H          ;MASK FOR PORT READY AND
              = 265                             ;ENABLED
018B FE42     = 266           CPI  42H          ;BOTH MUST BE THERE
018D C2D601   = 267           JNZ  DM           ;IF NOT READY THEN SET DIS-
              = 268                             ;CONNECTED MODE
0190 3E10     = 269           MVI  A,10H        ;SET TEST FLAG SO UPON RETURN
              = 270                             ;PROGRAM BRANCHES TO TEST ROU-
              = 271                             ;TINE.
0192 32E980   = 272           STA  LSTXMT
0195 C9       = 273           RET
0196 3E93     = 274  SNRM MVI  A,93H            ;SNRM CODE(INTIALIZATION FOR
              = 275                             ;DATA XFR)
0198 BC       = 276           CMP  H
0199 CAAE01   = 277           JZ   PRDY         ;IF SNRM THEN CHECK IF PORT
              = 278                             ;READY.
019C 3E97     = 279  FRMR:MVI  A,97H            ;ELSE SET CODE TO FRMR(WE CAN-
              = 280                             ;NOT RECOGNIZE CODE)
019E 32CE80   = 281           STA  CXMT+1       ;SET LINK CONTROL FOR TRANS-
              = 282                             ;MISSION)
01A1 3E04     = 283           MVI  A,04H        ;SET FRMR FLAG
```

```
01A3 32E980    = 284            STA LSTXMT
01A6 3E0A      = 285            MVI A,0AH      ;SET LAST
01A8 32E680    = 286            STA LSTRPT
01AB C3C501    = 287            JMP XMTRC      ;TO XMT FRMR
01AE DB01      = 288    PRDY:   IN 01H
01B0 E642      = 289            ANI 42H        ;MASK FOR PORT READY AND
               = 290                           ;ENABLED
01B2 FE42      = 291            CPI 42H        ;BOTH MUST BE THERE
01B4 C2D601    = 292            JNZ DM         ;IF NOT READY THEN XMT
               = 293                           ;DISCONNECTED TO PS
01B7 AF        = 294            XRA A          ;ELSE INITIALIZE FOR DATA
01B8 32DF80    = 295            STA NRNS       ;CLEAR RECEIVED AND SENT
               = 296                           ;COUNTERS
01BB 3E01      = 297            MVI A,01H      ;SET UA FLAG-ACKNOWLEDGE SNRM
01BD 32E980    = 298            STA LSTXMT
01C0 3E73      = 299            MVI A,73H      ;SET CODE FOR UA
01C2 32CE80    = 300            STA CXMT+1     ;SET LINK CONTROL
01C5 3E02      = 301    XMTRC:  MVI A,02H      ;SET BYTE COUNT
01C7 32E180    = 302            STA BYCNT
01CA 2E01      = 303    XMTRT:  MVI L,01H      ;SET FRAME COUNTER
01CC 01CD80    = 304            LXI B,CXMT     ;SET DLB POINTER
01CF DBC0      = 305            IN 0C0H        ;LOAD STATION ADDRESS
01D1 02        = 306            STAX B         ;SET FIRST BYTE
01D2 CDC700    = 307            CALL XMTDAT    ;TRANSMIT AND RETURN
01D5 C9        = 308            RET
01D6 3E08      = 309    DM:     MVI A,08H      ;SET DM FLAG(DISCONNECTED)
01D8 32E980    = 310            STA LSTXMT
01DB 3E1F      = 311            MVI A,1FH      ;SET CODE FOR DM
01DD 32CE80    = 312            STA CXMT+1     ;SET LINK CONTROL
01E0 C3C501    = 313            JMP XMTRC
01E3 3AE980    = 314    REPEAT: LDA LSTXMT     ;GET LAST TRANSMITTED
               = 315                           ;FLAGS TO FIND OUT WHAT WAS
               = 316                           ;REJECTED
01E6 E620      = 317            ANI 20H        ;MASK FOR RNR
01E8 C2C501    = 318            JNZ XMTRC      ;IF RNR, RETRANSMIT THE
               = 319                           ;TWO BYTES
01EB 3E0A      = 320            MVI A,0AH      ;ELSE SET LAST FOR ALL OF THE
               = 321                           ;THE FOLLOWING. NOTE:SETTING
               = 322                           ;LAST PUTS STATION BACK IN
               = 323                           ;RCVCTL ROUITNE AFTER RETRANS-
01ED 32E680    = 324            STA LSTRPT     ;MITTING THE REJECTED FRAME
01F0 3AE980    = 325            LDA LSTXMT     ;GET LAST XMTD FLAGS
01F3 E680      = 326            ANI 80H        ;MASK FOR I-FRAME
01F5 C20802    = 327            JNZ FRAMES     ;IF I-FRM THEN DECODE
               = 328                           ;WHICH FRAME. IF MORE THAN
               = 329                           ;ONE
01F8 3AE980    = 330            LDA LSTXMT     ;ELSE GET LAST XMTD FLAGS
01FB E610      = 331            ANI 10H        ;MASK FOR TEST
01FD CAC501    = 332            JZ XMTRC       ;IF NOT TEST THEN XMT ANY
               = 333                           ;PREVIUOS CONTROL
0200 3E05      = 334            MVI A,05H      ;ELSE SET TEST FRM BYTE CNT
0202 32E180    = 335            STA BYCNT      ;AND RETRANSMIT THE TEST FRAME
0205 C3CA01    = 336            JMP XMTRT
0208 3AC980    = 337    FRAMES: LDA CRVC+1     ;GET LINK CONTROL (REJECT)
020B E6E0      = 338            ANI 0E0H       ;MASK FOR NR, THE NEXT EXPECT-
               = 339                           ;ED FRAME BY THE PRI. STA.
               = 340                           ;FROM THIS STATION.
020D 07        = 341            RLC
020E 07        = 342            RLC
020F 07        = 343            RLC            ;MOVE NR TO LSB'S
0210 67        = 344            MOV H,A
0211 3AE480    = 345            LDA FMCNT      ;FRAME COUNT TOTAL - LAST XMT
0214 94        = 346            SUB H          ;CALCULATE FRAMES TO REPEAT
0215 6F        = 347            MOV L,A        ;SET FRAME CNTR
0216 67        = 348            MOV H,A        ;HOLD THAT FOR SETTING DLB
0217 3AE580    = 349            LDA LFRM       ;LAST FRAME ADDR XMTD(REF)
021A D628      = 350    FMSUB:  SUI 28H        ;GO BACK ONE FRAME
021C 25        = 351            DCR H          ;DECR TEMP. FRAME COUNTER
021D C21A02    = 352            JNZ FMSUB      ;IF NOT ZERO THEN GO BACK
               = 353                           ;ONE MORE FRAME
0220 4F        = 354            MOV C,A        ;ELSE SET DLB POINTER
0221 CDC700    = 355            CALL XMTDAT    ;TRANSMIT FRAME(S)
0224 C9        = 356            RET
```

```
                    = 357    ;
                    = 358
                    = 359
                    = 360 PORT:                    ;PORT SUBROUTINE
                    = 361 ;THIS SUBROUTINE PROVIDES THE INTERFACE WITH THE COM
                    = 362 ;MUNICATION SUBSYSTEM BUS AND, IN TURN, THE 1K MEMORY
                    = 363 ;IN THE CONTROLLER. THIS DRIVER FOLLOWS THE NORMAL
                    = 364 ;PORT BUFFER PROTOCOL. IT CALLS XMTDAT
                    = 365
0225 1100C0         = 366        LXI D,RCVD        ;THE FOLLOWING SEVEN SOURCE
                    = 367                          ;LINES SET UP THE STATION FOR INTER-
                    = 368                          ;RUPT BY THE PRI. STN. WHILE IN THIS
                    = 369                          ;ROUTINE AND STIL BE ABLE TO RECOVER
                    = 370                          ;IN THE TIME FOR ANY INCOMING MSG.
                    = 371                          ;THE CONDITON IS ABNORMAL. USUALLY
                    = 372                          ;IT MEANS THAT THE SEC. STN. IS
                    = 373                          ;STUCK IN A LOOP IN THIS ROUTINE.
0228 DB01           = 374        IN 01H
022A F601           = 375        ORI 01H           ;SET RXE
022C D301           = 376        OUT 01H           ;EXECUTE
022E 3E1B           = 377        MVI A,1BH         ;RESET INTERRUPT FF AND
                    = 378                          ;MASK RST 7.5 BIT SETTING.
0230 30             = 379        SIM               ;SET INTERRUPT MASKS
0231 FB             = 380        EI                ;ENABLE INTERUPT
0232 010280         = 381        LXI B,FRMA+2      ;SET DLB PNTR, 1ST FRM, PC1
0235 3AE480         = 382        LDA FMCNT         ;GET FRAME COUNT
0238 6F             = 383        MOV L,A           ;SET FRAME COUNTER
0239 0A             = 384        LDAX B            ;GET FRAME CONTROL,PC1
023A E67C           = 385        ANI 7CH           ;MASK FOR DATA BYTE COUNT
023C 0F             = 386        RRC
023D 0F             = 387        RRC               ;SHIFT TO LSB'S
023E 3C             = 388        INR A             ;BIAS UP COUNT(BYTE COUNT IN
                    = 389                          ;PC1=ACTUAL-1)
023F 32E080         = 390        STA PBYCNT        ;PUT IN PORT TRANSFER DATA
                    = 391                          ;BYTE COUNT
0242 0A             = 392        LDAX B            ;GET PC1
0243 E680           = 393        ANI 80H           ;MASK FOR R-W BIT
0245 CAD602         = 394        JZ WRITE          ;IF NOT READ THEN GO TO WRITE
0248 0D             = 395        DCR C             ;GO BACK TO LINK CONTROL
0249 3ADF80         = 396        LDA NRNS          ;GET NR & NS COUNTS(PROVIDES
                    = 397                          ;NR ACKN)
024C 67             = 398        MOV H,A           ;HOLD THAT
024D 0A             = 399        LDAX B            ;GET LINK CONTROL
024E B4             = 400        ORA H             ;FIRST FRAME RESPONSE IN LINK
                    = 401                          ;CONTROL.
024F 02             = 402        STAX B            ;NOTE THAT THE NR COUNT FROM
                    = 403                          ;PRI. STN. FOR ANY FRAME=0.
                    = 404                          ;THE NS COUNT FROM PRI. STN.
                    = 405                          ;WILL BE IDENTICAL TO THAT RE-
                    = 406                          ;QUIRED FOR THIS STN. RESPONSE
                    = 407                          ;SO IT WILL NOT BE ALTERED.
0250 79             = 408 PRTCTL:MOV A,C           ;GET DLB POINTER
0251 32E580         = 409        STA LFRM          ;SET FRAME REFERENCE
0254 0C             = 410        INR C             ;UP TO PC1 AGAIN IN DLB
0255 0A             = 411        LDAX B            ;GET PC1
0256 D300           = 412        OUT 00H           ;PUT IN PORT BUFFER(PC1 LATCH)
0258 0C             = 413        INR C             ;INCR DLB POINTER
0259 0A             = 414        LDAX B            ;GET PC2
025A D382           = 415        OUT 82H           ;PUT IN PORT BUFFER(PC2 LATCH)
025C 0C             = 416        INR C             ;INCR DLB POINTER
025D DB01           = 417        IN 01H            ;SET LD2 BIT
025F F604           = 418        ORI 04H
0261 D301           = 419        OUT 01H           ;EXECUTE PORT CONTROL
0263 E6FB           = 420        ANI 0FBH          ;CLEAR BIT 2 ONLY
0265 D301           = 421        OUT 01H           ;RESET LD2
0267 3E02           = 422        MVI A,02H
0269 D380           = 423        OUT 80H           ;SET DATA PORT(81) DIRECTION
                    = 424                          ;TO READ DATA
026B 3AE080         = 425        LDA PBYCNT        ;GET PORT TRANSFER BYTE COUNT
026E 67             = 426        MOV H,A           ;SET BYTE COUNTER
026F DB01           = 427 NRDY:IN 01H              ;GET STATION CONTROL
0271 E602           = 428        ANI 02H
```

```
0273 CA6F02   = 429           JZ NRDY          ;IF PORT NOT READY, THIS
              = 430                            ;COULD BE THE HANG-UP LOOP
              = 431                            ;IF THE PORT FAILS
0276 DB01     = 432  PRTRD:   IN 01H           ;ELSE GET STATION CONTROL
0278 F608     = 433           ORI 08H          ;AGAIN.
027A D301     = 434           OUT 01H          ;SET LD3 ONLY (BIT 3)
027C 00       = 435           NOP
027D DB81     = 436           IN 81H           ;READ DATA
027F 02       = 437           STAX B           ;STORE IN DLB
0280 DB01     = 438           IN 01H           ;CLEAR BIT 3 ONLY
0282 E6F7     = 439           ANI 0F7H
0284 D301     = 440           OUT 01H          ;RESET LD3
0286 0C       = 441           INR C            ;INCR DLB PNTR
0287 25       = 442           DCR H            ;DECR BYTE COUNT
0288 C27602   = 443           JNZ PRTRD        ;IF NOT LAST BYTE THEN GET NEXT
028B 2D       = 444           DCR L            ;ELSE DECR FRAME COUNTER
028C CAA402   = 445           JZ DEDTM         ;IF LAST FRAME THEN TRANSMIT
              = 446                            ;DATA
028F 3AE580   = 447           LDA LFRM         ;ELSE GET FRAME REFERENCE
0292 C628     = 448           ADI 28H          ;INCR TO NEXT FRAME
0294 4F       = 449           MOV C,A          ;SET DLB PNTR TO NEXT FRAME
              = 450                            ;ADDRESS
0295 3ADF80   = 451           LDA NRNS         ;NR SET BY CHKDAT
0298 C602     = 452           ADI 02H          ;INCR NS USED BY THIS STN TO
              = 453                            ;KEEP ACCOUNT NOT TO ALTER
              = 454                            ;LINK CONTROL
029A 32DF80   = 455           STA NRNS
029D 67       = 456           MOV H,A          ;HOLD THAT
029E 0A       = 457           LDAX B           ;LINK CONTROL RECEIVED
029F B4       = 458           ORA H
02A0 02       = 459           STAX B           ;SET XMT LINK CTL, NEXT FRM
02A1 C35002   = 460           JMP PRTCTL       ;GO BACK FOR NEXT FRAME
02A4 3AE080   = 461  DEDTM:   LDA PBYCNT       ;THE FOLLOWING DELAY ROUTINE
02A7 67       = 462           MOV H,A          ;IS NECESSARY TO BE CERTAIN
02A8 3E21     = 463           MVI A,21H        ;THAT THE PRIMARY STATION HAS
02AA 94       = 464           SUB H            ;TIME TO BE IN THE RECEIVE
02AB 67       = 465           MOV H,A          ;MODE BEFORE THIS STATION
02AC 25       = 466  WAIT:    DCR H            ;TRANSMITS.
02AD CAB402   = 467           JZ XMTR1         ;DEAD TIME (12.67 MICROSEC/
              = 468                            ;CYCLE) SUCH THAT THE READ
              = 469                            ;REQUESTS REQUIRE(AFTER XMT
              = 470                            ;RNR) 64 MICROSECS PLUS PER
              = 471                            ;FRAME, 508 MICROSECS PER BYTE
02B0 7C       = 472           MOV A,H          ;NOTE PROCESSOR CLOCK=3 MHZ
02B1 C3AC02   = 473           JMP WAIT
02B4 010080   = 474  XMTR1:   LXI B,FRMA       ;SET DLB POINTER TO FIRST
              = 475                            ;FRAME
02B7 3AE080   = 476           LDA PBYCNT       ;DATA BYTE COUNT
02BA C604     = 477           ADI 04H          ;PLUS LINK & PORT CONTROL
02BC 32E180   = 478           STA BYCNT        ;SET TRANSMIT BYTE COUNT
02BF 3AE480   = 479           LDA FMCNT
02C2 6F       = 480           MOV L,A          ;SET FRAME COUNTER
02C3 3E1F     = 481           MVI A,1FH        ;MASK ALL INTERRUPTS
02C5 30       = 482           SIM
02C6 F3       = 483           DI               ;DISABLE INTERUPT
02C7 DB01     = 484           IN 01H
02C9 E6FE     = 485           ANI 0FEH         ;RESET RXE
02CB D301     = 486           OUT 01H
02CD CDC700   = 487           CALL XMTDAT      ;TRANSMIT
02D0 3E80     = 488           MVI A,80H        ;SET I-FRAME FLAG
02D2 32E980   = 489           STA LSTXMT
02D5 C9       = 490           RET
02D6 79       = 491  WRITE:   MOV A,C          ;GET DLB POINTER
02D7 32E580   = 492           STA LFRM         ;SET FRAME REFERENCE
02DA 0A       = 493           LDAX B           ;GET PC1
02DB D300     = 494           OUT 00H          ;PUT IN PORT BUFFER(PC1 LATCH)
02DD 0C       = 495           INR C            ;INCR DLB POINTER
02DE 0A       = 496           LDAX B           ;GET PC2
02DF D382     = 497           OUT 82H          ;PUT IN PORT BUFFER(PC2 LATCH)
02E1 0C       = 498           INR C            ;INCR DLB POINTER
02E2 DB01     = 499           IN 01H           ;GET STATION CONTROL
02E4 F604     = 500           ORI 04H          ;SET LD2 BIT ONLY
```

```
02E6 D301      = 501           OUT 01H           ;EXECUTE PORT CONTROL
02E8 E6FB      = 502           ANI 0FBH          ;CLEAR BIT 2 ONLY
02EA D301      = 503           OUT 01H
02EC 3AE080    = 504           LDA PBYCNT        ;GET PORT TRANSFER BYTE COUNT
02EF 67        = 505           MOV H,A           ;SET BYTE COUNTER
02F0 3E03      = 506           MVI A,03H         ;SET DATA PORT(81)DIRECTION TO
               = 507                             ;WRITE DATA.
02F2 D380      = 508           OUT 80H
02F4 0A        = 509   PRTWRT:LDAX B             ;GET DATA BYTE FROM DLB
02F5 D381      = 510           OUT 81H           ;WRITE DATA
02F7 0C        = 511           INR C             ;INCR DLB PNTR
02F8 DB01      = 512           IN 01H            ;SET BIT THREE ONLY
02FA F608      = 513           ORI 08H
02FC D301      = 514           OUT 01H           ;SET LD3
02FE E6F7      = 515           ANI 0F7H          ;CLEAR BIT 3 ONLY
0300 00        = 516           NOP
0301 D301      = 517           OUT 01H           ;RESET LD3
0303 25        = 518           DCR H             ;DECR BYTE COUNT
0304 C2F402    = 519           JNZ PRTWRT        ;IF NOT LAST BYTE THEN GET
               = 520                             ;NEXT.
0307 2D        = 521           DCR L             ;ELSE DECR FRAME COUNTER
0308 C21303    = 522           JNZ NXTFRM        ;IF NOT LAST FRAME THEN GO TO
               = 523                             ;NEXT.
030B F3        = 524           DI                ;DISABLE INTERRUPT
030C DB01      = 525           IN 01H
030E E6FE      = 526           ANI 0FEH          ;RESET RXE
0310 D301      = 527           OUT 01H
0312 C9        = 528           RET
0313 3AE580    = 529   NXTFRM:LDA LFRM           ;FRAME REFERENCE
0316 C628      = 530           ADI 28H           ;ADD 40 BYTES PER FRAME
0318 4F        = 531           MOV C,A           ;SET DLB POINTER
0319 DB01      = 532   WRDY:IN 01H
031B E602      = 533           ANI 02H           ;MASK FOR RDY LINE
031D CA1903    = 534           JZ WRDY           ;IF PORT NOT READY THEN KEEP
               = 535                             ;CHECKING.
0320 C3D602    = 536           JMP WRITE
0323 C9        = 537           RET
               = 538
               = 539
               = 540
               = 541   SSTEST:                   ;CALLS XMTDAT, PORT TWICE
0324 3E01      = 542           MVI A,01H
0326 32E480    = 543           STA FMCNT
0329 3ACA80    = 544           LDA CRVC+2        ;TEST ROUTINE?
032C 32CF80    = 545           STA CXMT+2
032F 67        = 546           MOV H,A
0330 3E03      = 547           MVI A,03H         ;TOP OF CYCLE WRITE ROUTINE
0332 BC        = 548           CMP H
0333 CA6203    = 549           JZ AA
0336 3E0C      = 550           MVI A,0CH         ;BOTTOM OF CYCLE READ ROUTINE
0338 BC        = 551           CMP H
0339 CA9103    = 552           JZ BB
033C 3E30      = 553           MVI A,30H
033E BC        = 554           CMP H
033F CA0D04    = 555           JZ DD
0342 3EC0      = 556           MVI A,0C0H        ;NOT VALID TEST ROUTINE
0344 32D080    = 557           STA CXMT+3
0347 32D180    = 558           STA CXMT+4
034A DBC0      = 559   TXMT:IN 0C0H              ;STATION ADDRESS
034C 32CD80    = 560           STA CXMT
034F 3EF3      = 561           MVI A,0F3H        ;SET LINK CONTROL - TEST(MVI WHE
                                       RE?)
0351 32CE80    = 562           STA CXMT+1
0354 01CD80    = 563           LXI B,CXMT        ;SET DLB PNTR
0357 2E01     = 564           MVI L,01H         ;SET FRAME COUNT
0359 3E05      = 565           MVI A,05H         ;SET BYTE COUNT
035B 32E180    = 566           STA BYCNT
035E CDC700    = 567           CALL XMTDAT       ;TRANSMIT
0361 C9        = 568           RET
0362 010180    = 569   AA:LXI B,FRMA+1
0365 3E10      = 570           MVI A,10H         ;SET P/F=1 (FINAL)
0367 02        = 571           STAX B
0368 0C        = 572           INR C
```

```
0369 3E0B      = 573            MVI A,0BH       ;PC1, WRITE 3, STRTG 1021
036B 02       = 574            STAX B
036C 0C       = 575            INR C
036D 3EFD     = 576            MVI A,0FDH      ;PC2
036F 02       = 577            STAX B
0370 0C       = 578            INR C
0371 DBC0     = 579            IN 0C0H         ;STATION ADDRESS IN 1021
0373 02       = 580            STAX B
0374 0C       = 581            INR C
0375 3ACB80   = 582            LDA CRVC+3      ;PRI STN ERROR COUNT IN 1022
0378 02       = 583            STAX B
0379 32D080   = 584            STA CXMT+3
037C 0C       = 585            INR C
037D 3ACC80   = 586            LDA CRVC+4      ;SHIFTING BIT IN 1023
0380 02       = 587            STAX B
0381 32D180   = 588            STA CXMT+4
0384 010080   = 589            LXI B,FRMA
0387 CD2502   = 590            CALL PORT
038A AF       = 591            XRA A           ;CLEAR STATION ERROR COUNT
038B 32E280   = 592            STA ERRCNT
038E C34A03   = 593            JMP TXMT
              = 594                            ;THE FOLLOWING ACCESSES
              = 595                            ;THE COMM. SYSTEM MEMORY FOR BYTE
              = 596                            ;1023--COMPARES IT TO THE SHIFTING
              = 597                            ;BIT BYTE RECEIVED IN THIS TEST
              = 598                            ;COMMAND. IF THE SAME, IT TRANS-
              = 599                            ;MITS ERROR HISTORY TO THE PRIMARY
              = 600                            ;STATION. IF NOT THE SAME, IT SETS
              = 601                            ;AN ERROR CODE AND TRANSMITS IT TO
              = 602                            ;THE PRIMARY STATION.
0391 1100C0   = 603            BB:LXI D,RCVD   ;THE FOLLOWING SEVEN SOURCE
              = 604                            ;LINES SET UP THGE STATION FOR INTER-
              = 605                            ;RUPT BY THE PRI. STN. WHILE IN THIS
              = 606                            ;ROUTINE AND STILL BE ABLE TO RECOVER
              = 607                            ;IN TIME FOR ANY INCOMING MESSAGE.
              = 608                            ;THE CONDITION IS ABNORMAL. USUALLY
              = 609                            ;IT MEANS THAT THE SEC. STN. IS STUCK
              = 610                            ;IN A LOOP IN THIS ROUTINE.
0394 DB01     = 611            IN 01H
0396 F601     = 612            ORI 01H         ;SET RXE
0398 D301     = 613            OUT 01H         ;EXECUTE
039A 3E01     = 614            MVI A,1B        ;RESET INTERUPT FF AND
              = 615                            ;MASK RST 7.5 BIT SETTING
039C 30       = 616            SIM             ;SET INTERUPT MASKS
039D FB       = 617            EI              ;ENABLE INTERRUPT
039E 3E83     = 618            MVI A,83H       ;PC1, READ 1 BYTE AT 1023
03A0 D300     = 619            OUT 00H
03A2 3EFF     = 620            MVI A,0FFH      ;PC2
03A4 D382     = 621            OUT 82H
03A6 DB01     = 622            IN 01H
03A8 F604     = 623            ORI 04H         ;SET LD2
03AA D301     = 624            OUT 01H
03AC E6FB     = 625            ANI 0FBH        ;RESET LD2
03AE D301     = 626            OUT 01H
03B0 3E02     = 627            MVI A,02H
03B2 D380     = 628            OUT 80H
03B4 DB01     = 629            RDYN:IN 01H     ;GET STATION CONTROL
03B6 E602     = 630            ANI 02H         ;MASK FOR RDY
03B8 CAB403   = 631            JZ RDYN         ;IF PORT NOT READY, THIS
              = 632                            ;COULD BE THE HANG-UP LOOP
              = 633                            ;IF PORT FAILS.
              = 634                            ;ELSE GET STATION CONTROL
03BB DB01     = 635            IN 01H
03BD F608     = 636            ORI 08H         ;SET LD3 ONLY(BIT 3)
03BF D301     = 637            OUT 01H
03C1 00       = 638            NOP
03C2 DB81     = 639            IN 81H
03C4 320480   = 640            STA FRMA+4      ;STORE DATA FROM 1023
03C7 DB01     = 641            IN 01H
03C9 E6F7     = 642            ANI 0F7H        ;RESET LD3
03CB D301     = 643            OUT 01H
03CD 3E1F     = 644            MVI A,1FH       ;MASK ALL INTERRUPTS
```

```
03CF 30      = 645           SIM
03D0 F3      = 646           DI              ;DISABLE INTERRUPTS
03D1 DB01    = 647           IN 01H
03D3 E6FE    = 648           ANI 0FEH        ;RESET RXE
03D5 D301    = 649           OUT 01H
03D7 3AC880  = 650           LDA CRVC+3      ;SHIFTING BIT RECEIVED
03DA 67      = 651           MOV H,A
03DB 3A0480  = 652           LDA FRMA+4      ;DATA BYTE (SHFIBT IN 1023)
03DE 32D080  = 653           STA CXMT+3
03E1 BC      = 654           CMP H
03E2 CAF203  = 655           JZ TCMP
03E5 3EAA    = 656           MVI A,0AAH      ;WRITE OVER SHIFTING BIT ROUTINE
03E7 32D080  = 657           STA CXMT+3
03EA 3E58    = 658           MVI A,58H       ;ASC X
03EC 32D180  = 659           STA CXMT+4      ;CODE FOR PORT XFR ERROR
03EF C34A03  = 660           JMP TXMT
03F2 3AE280  = 661    TCMP:  LDA ERRCNT      ;STATION ERRORS - ONE CYCLE
03F5 D609    = 662           SUI 09H
03F7 FA0204  = 663           JM LTN          ;IF 9 OR LESS
03FA 3E23    = 664           MVI A,23H       ;ASCII # = G.T. 9
03FC 32D180  = 665           STA CXMT+4
03FF C34A03  = 666           JMP TXMT
0402 3AE280  = 667    LTN:   LDA ERRCNT
0405 C630    = 668           ADI 30H         ;CONVERT NO. TO ASCII
0407 32D180  = 669           STA CXMT+4
040A C34A03  = 670           JMP TXMT
040D 3AE880  = 671    DD:    LDA STAST
0410 32D080  = 672           STA CXMT+3
0413 3AE780  = 673           LDA RCVST
0416 32D180  = 674           STA CXMT+4
0419 C34A03  = 675           JMP TXMT
             = 676
             = 677
             = 678
             = 679    RCVCTL:
041C 79      = 680           MOV A,C
041D 32E580  = 681           STA LFRM        ;SET LAST FRAME ADDRESS
0420 1100C0  = 682           LXI D,RCVD      ;SET SDLC POINTER TO RECEIVER
0423 2600    = 683           MVI H,00H       ;RESET BYTE COUNTER
0425 DB01    = 684           IN 01H          ;STATION CONTROL
0427 E6EF    = 685           ANI 0EFH        ;RST CDPE ONLY
0429 F601    = 686           ORI 01H         ;SET RXE ONLY
042B D301    = 687           OUT 01H         ;EXECUTE STATION CONTROL
042D DB83    = 688    RXDA2: IN 83H
042F E601    = 689           ANI 01H         ;MASK FOR DA(?)
0431 CA2D04  = 690           JZ RXDA2        ;NO
0434 C34304  = 691           JMP GTDA2       ;YES,GET DATA
0437 DB83    = 692    DASA2: IN 83H
0439 E605    = 693           ANI 05H         ;TEST FOR DA OR SA
043B CA3704  = 694           JZ DASA2        ;NO
043E E601    = 695           ANI 01H         ;YES,WHICH
0440 CA4A04  = 696           JZ LSTAT2       ;SA
0443 1A      = 697    GTDA2: LDAX D          ;DA, LOAD DATA BYTE
0444 02      = 698           STAX B          ;STORE IN DLB
0445 0C      = 699           INR C           ;INCR DLB POINTER
0446 24      = 700           INR H           ;INCR BYTE COUNTER
0447 C33704  = 701           JMP DASA2
044A 01EC80  = 702    LSTAT2:LXI B,CSCS      ;SET DLB POINTER TO STATUS STRG
044D DB83    = 703           IN 83H          ;LOAD STATION CONTROL STATUS
044F 02      = 704           STAX B          ;CSCS
0450 0C      = 705           INR C
0451 3A00C8  = 706           LDA RCVS        ;LOAD RCEIVER STATUS
0454 02      = 707           STAX B          ;CSTA
0455 0C      = 708           INR C
0456 7C      = 709           MOV A,H         ;LOAD RCVD BYTE COUNT
0457 02      = 710           STAX B          ;CRBC
0458 DB01    = 711           IN 01H          ;LOAD STATION CONTROL
045A E6FE    = 712           ANI 0FEH        ;RESET RXE ONLY
045C F610    = 713           OPI 10H         ;SET CDPE ONLY
045E D301    = 714           OUT 01H         ;EXECUTE STATION CONTROL
0460 3AC880  = 715           LDA CRVC        ;FOR DIAGNOSTICS
0463 3AC980  = 716           LDA CRVC+1
```

```
0466 3ACA80    = 717           LDA CRVC+2
0469 C9        = 718           RET
               = 719
               = 720
               = 721  IFRMD:                          ; IFRMD SUBROUTINE
               = 722  ;THIS SUBROUTINE COMBINES THE FUNCTION OF RECEIVING
               = 723  ;AND CHECKING I-FRAMES FROM THE PRIMARY STATION.
               = 724  ;IFRMD IS CALLED ONLY AFTER A VALID SNRM IS RECEIVED
               = 725  ;AND ACKNOWLEDGED, COUNTS NR AND NS HAVE BEEN SET TO
               = 726  ;ZERO AND THE PORT IS KNOWN TO BE READY FOR A TRANSFER
               = 727  ;REQUEST. IFRMD CALLS XMTDAT.
046A 79        = 728  START2: MOV A,C
046B 32E580    = 729           STA LFRM          ; SET LAST FRAME ADDRESS
046E 2600      = 730           MVI H,00H         ; RESET BYTE COUNT
0470 1100C0    = 731           LXI D,RCVD        ; SET SDLC POINTER TO RECEIVER
0473 DB01      = 732           IN 01H            ; STATION CONTROL
0475 E6EF      = 733           ANI 0EFH          ; RST CDPE ONLY
0477 F601      = 734           ORI 01H           ; SET RXE ONLY
0479 D301      = 735           OUT 01H           ; EXECUTE STATION CONTROL
047B DB83      = 736  RXDA1:  IN 83H             ; GET STN. CONTROL STATUS
047D E601      = 737           ANI 01H           ; MASK FRO DA(?)
047F CA7B04    = 738           JZ RXDA1          ; NO
0482 C39104    = 739           JMP GTDA1         ; YES, GET DATA
0485 DB83      = 740  DASA1:  IN 83H
0487 E605      = 741           ANI 05H           ; TEST FOR DA OR SA
0489 CA8504    = 742           JZ DASA1          ; NO
048C E601      = 743           ANI 01H           ; YES, WHICH
048E CA9804    = 744           JZ LSTAT1         ; SA
0491 1A        = 745  GTDA1:  LDAX D            ; DA, LOAD DATA BYTE
0492 02        = 746           STAX B            ; STORE IN DLB
0493 0C        = 747           INR C             ; INCR DLB POINTER
0494 24        = 748           INR H             ; INCR BYTE COUNTER
0495 C38504    = 749           JMP DASA1
0498 3AE580    = 750  LSTAT1: LDA LFRM
049B C624      = 751           ADI 24H
049D 4F        = 752           MOV C,A           ; SET DLB PNTR TO STATUS STORAGE
049E DB83      = 753           IN 83H            ; LOAD STATION CONTROL STATUS
04A0 02        = 754           STAX B
04A1 0C        = 755           INR C
04A2 3A00C8    = 756           LDA RCVS          ; LOAD RECEIVER STATUS
04A5 02        = 757           STAX B
04A6 0C        = 758           INR C
04A7 7C        = 759           MOV A,H           ; LOAD RCVD BYTE COUNT
04A8 02        = 760           STAX B
04A9 DB01      = 761           IN 01H            ; LOAD STATION CONTROL
04AB E6FE      = 762           ANI 0FEH          ; RESET RXE ONLY
04AD F610      = 763           ORI 10H           ; SET CDPE ONLY
04AF D301      = 764           OUT 01H           ; EXECUTE STATION CONTROL
04B1 2C        = 765           INR L             ; INCR FRAME COUNT
04B2 7D        = 766           MOV A,L
04B3 32E480    = 767           STA FMCNT
04B6 3AE580    = 768           LDA LFRM
04B9 4F        = 769           MOV C,A
04BA 0C        = 770           INR C
04BB 0A        = 771           LDAX B            ; GET LINK CONTROL
04BC E610      = 772           ANI 10H           ; MASK FOR P/F BIT
04BE C2CA04    = 773           JNZ CHKDAT        ; IF P/F=1 THEN CHECK DATA
04C1 3AE580    = 774           LDA LFRM          ; ELSE GET NEXT FRAME
04C4 C628      = 775           ADI 28H           ; SET NEXT FRAME
04C6 4F        = 776           MOV C,A
04C7 C36A04    = 777           JMP START2
04CA 3ADF80    = 778  CHKDAT: LDA NRNS           ; STATION NR & NS COUNT
04CD E6E0      = 779           ANI 0E0H          ; MASK FOR NR
04CF 07        = 780           RLC
04D0 07        = 781           RLC
04D1 07        = 782           RLC               ; SHIFT NR TO LSB'S
04D2 67        = 783           MOV H,A           ; ESTABLISHES A STARTING FRAME
04D3 3AE480    = 784           LDA FMCNT         ; SET IN RCVDAT
04D6 94        = 785           SUB H             ; SUB NR FROM FRAME COUNT
04D7 6F        = 786           MOV L,A           ; REMAINING FRAMES TO CHECK
04D8 010080    = 787           LXI B,FRMA        ; DLB PNTR TO BEGINNING
04DB AF        = 788  FFADD:  XRA A             ; TO FIND FRAME ADDRESS
```

```
04DC BC          = 789           CMP  H           ;FIRST TIME,FRMA IF ZERO
04DD CAE804      = 790           JZ   LCCHK       ;IF COUNT ZERO
04E0 79          = 791           MOV  A,C         ;DLB POINTER
04E1 C628        = 792           ADI  28H         ;FRAME INCREMENT
04E3 4F          = 793           MOV  C,A
04E4 25          = 794           DCR  H           ;DECR CNT TO CORRESPOND
04E5 C3B804      = 795           JMP  FFADD       ;TRY NEXT FRAME
04E8 0C          = 796   LCCHK:  INR  C           ;LINK CONTROL CHECK
04E9 0A          = 797           LDAX B           ;LINK CONTROL
04EA E601        = 798           ANI  01H         ;MASK FOR I-FRM
04EC C20005      = 799           JNZ  CHKC        ;IF NOT ZERO GO TO CHKCTL
04EF 3ADF80      = 800           LDA  NRNS        ;STATION NR VS. RCVD NS
04F2 E6E0        = 801           ANI  0E0H        ;MASK FOR NR
04F4 67          = 802           MOV  H,A         ;HOLD THAT THOUGHT
04F5 0A          = 803           LDAX B           ;RECEIVED LINK CONTROL
04F6 E60F        = 804           ANI  0FH         ;MASK FOR NS & I-BIT(BIT 0-0)
04F8 07          = 805           RLC
04F9 07          = 806           RLC
04FA 07          = 807           RLC
04FB 07          = 808           RLC              ;SHIFT TO ALIGN NS WITH NR
04FC BC          = 809           CMP  H           ;NR MUST =NS & AN I-FRAME
04FD CA1E05      = 810           JZ   DPE2        ;IF EQUAL GO TO NEXT TEST
0500 3E0A        = 811   CHKC:   MVI  A,0AH       ;SET LAST TO GO TO CHKCTL
0502 32E680      = 812           STA  LSTRPT
0505 0A          = 813           LDAX B           ;BUT FIRST GET LINK CONTROL
0506 32C980      = 814           STA  CRVC+1      ;STORE WHERE CHKCTL CAN FIND
                 = 815                            ;IT
0509 3AE580      = 816           LDA  LFRM
050C C624        = 817           ADI  24H         ;MOVE DLB POINTER TO STATUS
050E 4F          = 818           MOV  C,A         ;STATUS STORAGE FOR THIS FRAME
050F 0A          = 819           LDAX B           ;GET STATION CONTROL STATUS
0510 32EC80      = 820           STA  CSCS        ;STORE FOR CHKCTL
0513 0C          = 821           INR  C
0514 0A          = 822           LDAX B           ;GET RECEIVER STATUS
0515 32ED80      = 823           STA  CSTA
0518 0C          = 824           INR  C
0519 0A          = 825           LDAX B           ;GET RECEIVED BYTE COUNT
051A 32EE80      = 826           STA  CRBC
051D C9          = 827           RET
051E 0D          = 828   DPE2:   DCR  C
051F 79          = 829           MOV  A,C
0520 32E580      = 830           STA  LFRM
0523 C624        = 831           ADI  24H
0525 4F          = 832           MOV  C,A         ;SET DLB PNTR TO STN. CTL. STA-
                 = 833                            ;TUS
0526 0A          = 834           LDAX B
0527 E608        = 835           ANI  08H         ;MASK FOR DPE
0529 CA6E05      = 836           JZ   STAT2       ;IF ZERO THEN GO TO NEXT TEST
052C 0A          = 837   REJEC2: LDAX B
052D 32E880      = 838           STA  STAST
0530 0C          = 839           INR  C
0531 0A          = 840           LDAX B
0532 32E780      = 841           STA  RCVST
0535 3ADF80      = 842           LDA  NRNS
0538 E6E0        = 843           ANI  0E0H        ;MASK FOR NR
053A F619        = 844           ORI  19H         ;SET LINK CTL REJ(NR)
053C 32CE80      = 845           STA  CXMT+1
053F 3E40        = 846           MVI  A,40H
0541 32E980      = 847           STA  LSTXMT
0544 3EA0        = 848           MVI  A,0A0H      ;SET REJECT
0546 32E680      = 849           STA  LSTRPT
0549 3E02        = 850           MVI  A,02H       ;SET BYTE COUNT
054B 32E180      = 851           STA  BYCNT
054E 2E01        = 852           MVI  L,01H       ;SET FRAME COUNT
0550 01CD80      = 853           LXI  B,CXMT      ;SET DLB PNTR
0553 DBC0        = 854           IN   0C0H        ;STATION ADDRESS
0555 02          = 855           STAX B
0556 CDC700      = 856           CALL XMTDAT      ;(CALL XMTDAT)
0559 0E00        = 857           MVI  C,00H       ;RESET DLB TO FRMA
055B 3ADF80      = 858           LDA  NRNS        ;GET VALID FRAMES RCVD COUNT
055E E6E0        = 859           ANI  0E0H        ;MASK FOR NR
0560 07          = 860           RLC              ;MOVE NR TO LS BITS
```

```
0561 07           = 861           RLC
0562 07           = 862           RLC
0563 67           = 863           MOV  H,A         ;SET UP FOR GETTING
0564 24           = 864           INR  H           ;PROPER FRAME ADDRESS
0565 25           = 865   DECNR:  DCR  H
0566 C8           = 866           RZ               ;RETURN IF DLB POINTER SET
0567 79           = 867           MOV  A,C         ;GET DLB POINTER
0568 C628         = 868           ADI  28H         ;NEXT FRAME ADDRESS
056A 4F           = 869           MOV  C,A         ;SET DLB POINTER
056B C36505       = 870           JMP  DECNR
056E 0C           = 871   STAT2:  INR  C
056F 0A           = 872           LDAX B           ;RECEIVER STATUS
0570 E6FC         = 873           ANI  0FCH        ;MASK FOR ALL STATUS FAULTS
0572 CA7B05       = 874           JZ   GETBC       ;IF NONE THEN CHECK BYTE
                  = 875                            ;COUNT
0575 E680         = 876           ANI  80H         ;MASK FOR CRC
0577 C22C05       = 877           JNZ  REJEC2      ;IF NOT ZERO THEN REJECT
                  = 878                            ;ABC  ABORT OR OVERRUN
057A FF           = 879           RST  7
057B 0C           = 880   GETBC:  INR  C
057C 0A           = 881           LDAX B           ;FRAME RECVD BYTE COUNT
057D 67           = 882           MOV  H,A
057E 3AE580       = 883           LDA  LFRM
0581 C602         = 884           ADI  02H         ;SET DLB BACK TO START OF FRAME
0583 4F           = 885           MOV  C,A         ;PLUS 2
0584 0A           = 886           LDAX B           ;PC1
0585 E680         = 887           ANI  80H         ;MASK FOR R-W BIT
0587 CA9305       = 888           JZ   WBC         ;IF ZERO-A WRITE TRANSFER
058A 3E04         = 889           MVI  A,04H       ;READ TRANSFER BYTE COUNT
058C 94           = 890           SUB  H
058D CA9E05       = 891           JZ   FFRM        ;IF NO BYTE COUNT ERROR
0590 C32C05       = 892           JMP  REJEC2
0593 0A           = 893   WBC:    LDAX B           ;PC1 - WRITE
0594 E67C         = 894           ANI  7CH         ;MASK FOR BYTE COUNT
0596 0F           = 895           RRC
0597 0F           = 896           RRC              ;SHIFT TO LSB'S
0598 C605         = 897           ADI  05H         ;CONTROL PLUS BIAS
059A 94           = 898           SUB  H
059B C22C05       = 899           JNZ  REJEC2      ;IF BYTE COUNT ERROR
059E 3ADF80       = 900   FFRM:   LDA  NRNS
05A1 C620         = 901           ADI  20H         ;INCR NR (NR+1)
05A3 32DF80       = 902           STA  NRNS
05A6 0D           = 903           DCR  C
05A7 0A           = 904           LDAX B           ;FRAME LINK CONTROL
05A8 E610         = 905           ANI  10H         ;MASK FOR P/F
05AA CAD005       = 906           JZ   NFRM        ;IF P/F=0 (NEXT FRAME)
05AD 3ADF80       = 907           LDA  NRNS
05B0 E6E0         = 908           ANI  0E0H        ;MASK FOR NR
05B2 F615         = 909           ORI  15H         ;SET LINK CONTROL RNR(NR)
05B4 32CE80       = 910           STA  CXMT+1
05B7 3E20         = 911           MVI  A,20H       ;SET RNR FLAG
05B9 32E980       = 912           STA  LSTXMT
05BC 3E02         = 913           MVI  A,02H
05BE 32E180       = 914           STA  BYCNT       ;SET BYCNT
05C1 2E01         = 915           MVI  L,01H       ;SET FRAME COUNT
05C3 01CD80       = 916           LXI  B,CXMT      ;SET DLB POINTER
05C6 DBC0         = 917           IN   0C0H        ;GET STATION ADDRESS
05C8 CDC700       = 918           CALL XMTDAT
05CB AF           = 919           XRA  A
05CC 32E680       = 920           STA  LSTRPT      ;CLEAR ERROR FLAGS
05CF C9           = 921           RET
05D0 3AE580       = 922   NFRM:   LDA  LFRM
05D3 C628         = 923           ADI  28H         ;SET DLB PNTR TO NEXT FRAME
05D5 4F           = 924           MOV  C,A
05D6 C3E804       = 925           JMP  LCCHK
                  = 926           END
```

PUBLIC SYMBOLS

EXTERNAL SYMBOLS

```
USER SYMBOLS
AA        A 0362    BB        A 0391    BUSY      A 00C7    BYCNT     A 80E1
CHECK     A 003A    CHKC      A 0500    CHKCTL    A 013C    CHKDAT    A 04CA
CRBC      A 80EE    CRVC      A 80C8    CSCS      A 80EC    CSTA      A 80ED
CTBC      A 80D2    CXMT      A 80CD    DASA1     A 0485    DASA2     A 0437
DATAIN    A 00AB    DD        A 040D    DECNR     A 0565    DEDTM     A 02A4
DELAY     A 00EC    DLYXMT    A 0135    DM        A 01D6    DPE1      A 013C
DPE2      A 051E    ERRCNT    A 80E2    FDLY      A 0161    FFADD     A 04DB
FFRM      A 059E    FLAGS     A 80E3    FMCNT     A 80E4    FMSUB     A 021A
FRAMES    A 0208    FRMA      A 8000    FRMR      A 019C    GETBC     A 057B
GETDAT    A 004A    GETDS     A 004E    GETLC     A 0176    GTDA1     A 0491
GTDA2     A 0443    IFRMD     A 046A    LCCHK     A 04E8    LFRM      A 80E5
LSTAT1    A 0498    LSTAT2    A 044A    LSTRPT    A 80E6    LSTXMT    A 80E9
LTN       A 0402    NFRM      A 0500    NRDY      A 026F    NRNS      A 80DF
NXTFRM    A 0313    PBYCNT    A 80E0    PORT      A 0225    PORTN     A 00BB
PRDY      A 01AE    PRTCTL    A 0250    PRTRD     A 0276    PRTWRT    A 02F4
RCVCTL    A 041C    RCVD      A C000    RCVS      A C800    RCVST     A 80E7
RDYN      A 03B4    REJEC1    A 0144    REJEC2    A 052C    REPEAT    A 01E3
RXDA1     A 047B    RXDA2     A 042D    SNRM      A 0196    SSTEST    A 0324
START     A 0076    START1    A 00CE    START2    A 046A    STAST     A 80E8
STAT1     A 0168    STAT2     A 056E    STOP      A 010E    TBEA      A 0100
TBEB      A 011A    TCMP      A 03F2    TSTRTN    A 00C1    TXMT      A 034A
WAIT      A 02AC    WBC       A 0593    WDM       A 80DE    WRDY      A 0319
WRITE     A 02D6    XMTD      A D000    XMTDAT    A 00C7    XMTR1     A 02B4
XMTRC     A 01C5    XMTRT     A 01CA    XMTS      A D800

ASSEMBLY COMPLETE.    NO ERRORS
```

What is claimed is:

1. In a communication system for a distributed control arrangement adapted to control the operation of a plurality of operating units of a common installation, each of said operating units being under the control of a set of subsystems adapted to perform specific control functions relative to the corresponding operating unit;

a plurality of communication nodes each corresponding to a separate one of said operating units, each of said nodes being coupled to the set of subsystems that exercise control over the corresponding operating unit;

a separate secondary station coupled to each of said nodes;

each of said nodes including a common node bus;

the secondary station and respective ones of the set of subsystems associated with a node individually constituting separate circuits external to said node, each of said external circuits including a local data processor and being adapted to communicate through said node bus;

a data link interconnecting respective nodes through the secondary station associated with each node; and a primary station coupled to said data link and including a data processor, said primary station being adapted to address respective ones of said secondary stations through said data link in accordance with a predetermined protocol and a sequence determined by said primary station;

whereby said primary station upon its own command is capable of communicating with respective ones of a selectively variable number of nodes coupled to said data link to transmit or receive information with respect to selected subsystems associated with each of said nodes, said primary station being adapted to prevent contention between competing nodes for access to said data link.

2. A system in accordance with claim 1 wherein each of said nodes further comprises:

a controller coupled to said common node bus;

a plurality of port buffers each coupled to said bus and to a separate one of said external circuits, each of said port buffers being adapted to establish a 2-stage bidirectional transfer link between its coupled external circuit and said controller wherein said port buffer is present in both stages to provide intermediate data storage and to translate between the protocol of the external circuit and the protocol of said node; and said controller including means for sequentially polling said port buffers;

whereby said controller periodically sets the conditions for each port buffer to establish its transfer link.

3. A system in accordance with claim 2 wherein one stage of each of said transfer links comprises means for providing bidirectional data transfers between the coupled external circuit and its corresponding port buffer timed by said external circuit; and wherein the second stage of each of said transfer links comprises means for providing bidirectional data transfers between said port buffer and said controller by way of said bus timed by said controller.

4. A system in accordance with claim 3 wherein said one stage of each of said transfer links is further adapted to perform data transfers from the coupled external circuit to its corresponding port buffer under port buffer control.

5. A system in accordance with claim 4 wherein said controller includes means for generating clock pulses;

said means for providing data transfers in said second stage of each of said transfer links timed by said controller including means for transferring said information in clock pulse synchronism; and wherein data transfers in said one stage of each of said transfer links may be performed asynchronously with respect to said clock pulses.

6. A system in accordance with claim 4 wherein said intermediate data storage in each of said port buffers comprises a port buffer memory;

each of said port buffers further comprising:

first bidirectional switch means connected between said port buffer memory and the corresponding external circuit;

second bidirectional switch means connected between said port buffer memory and said controller; and means for enabling said first and second switch means during mutually exclusive time intervals to stagger the data transfer operations in the respective stages of said transfer link.

7. A system in accordance with claim 6 wherein data and control information is organized into bytes, each data transfer between an external circuit and said controller being preceded by a pair of control bytes generated by said subsystem;

each of said port buffers further comprising:

latch means for temporarily storing said control bytes; and means operative during each data transfer for directing said control bytes into said latch means and for directing said data bytes into said port buffer memory through one of said switch means.

8. A system in accordance with claim 7 wherein said control bytes define at least the direction of the data transfer and the number count of data bytes to be transferred;

each of said port buffers further comprising:

means responsive to said defined direction of data transfer to determine the order in which said first and second switch means are enabled;

means operative during data transfers performed under port buffer control for counting the number of data bytes transferred;

means for comparing the count of transferred data bytes with said number count entered by said control bytes; and means for terminating the transfer of data bytes when equality of the compared counts is reached.

9. A system in accordance with claim 8 wherein said control bytes further define a starting address;

said controller comprising:

means for generating clock pulses;

a controller memory;

said means timed by said controller including a controller address counter for sequentially addressing successive controller memory locations in clock pulse synchronism, said controller address counter being responsive to said control bytes to begin said sequential addressing at said starting address; and means responsive to said defined direction of data transfer to write said data bytes into, or to read said data bytes out from, said addressed controller memory locations.

10. A system in accordance with claim 4 or 9 wherein said control bytes are loaded into each port buffer by control signals generated by the corresponding external circuit;

each of said port buffers comprising means responsive to said control signals and to said defined direction of data transfer to generate a transfer request;

said sequential polling means comprising a port address counter for generating signals adapted to address successive port buffers of said node;

means for initiating the requested data transfer if a transfer request generated by a port buffer is pending when said port buffer is addressed in sequence by said port address counter; and means for interrupting said sequential addressing of said port buffers for the duration of each data transfer;

whereby contention between competing port buffers for access to said common node bus is effectively prevented by said controller.

11. A system in accordance with claim 10 wherein said external circuits of at least one of said nodes further include at least one peripheral station adapted to communicate through said node;

said last-recited node further comprising a port buffer corresponding to said peripheral station; and each of said port buffers including means for decoding the count of said port address counter, said port buffers being substantially identical to each other except for said decoding means.

12. A communication node for enabling a set of subsystems external to said node to communicate through the latter, each of said subsystems comprising a circuit including local data processing means for performing a specific control function relative to an operating unit responsive to said set of subsystems;

said communication node comprising:

a common node bus;

a controller coupled to said bus;

a plurality of port buffers each coupled to said bus and to a corresponding one of said subsystems, each of said port buffers being adapted to establish a 2-stage bidirectional transfer link between its corresponding subsystem and said controller wherein said port buffer is present in both stages to provide intermediate data storage and to translate between the subsystem protocol and the protocol of said node; and said controller including means for sequentially polling said port buffers;

whereby said controller periodically sets the conditions for each port buffer to establish its transfer link.

13. A communication node in accordance with claim 12 wherein one stage of each of said transfer links comprises means for providing bidirectional data transfers between the coupled subsystem and its corresponding port buffer timed by said subsystem; and wherein the second stage of each of said transfer links comprises means for providing bidirectional data transfers between said port buffer and said controller by way of said bus timed by said controller.

14. A communication node in accordance with claim 13 wherein said one stage of each of said transfer links is further adapted to perform data transfers from the coupled subsystem to its corresponding port buffer under port buffer control.

15. A communication node in accordance with claim 14 wherein said controller includes means for generating clock pulses;

said means for providing data transfers in said second stage of each of said transfer links timed by said controller including means for transferring said information in clock pulse synchronism; and wherein data transfers in said one stage of each of said transfer links may be performed asynchronously with respect to said clock pulses.

16. A communication node in accordance with claim 14 wherein said intermediate data storage in each of said port buffers comprises a port buffer memory;

each of said port buffers further comprising:

first bidirectional switch means connected between said port buffer memory and the corresponding subsystem:

second bidirectional switch means connected between said port buffer memory and said controller; and means for enabling said first and second switch means during mutually exclusive time intervals to stagger the data transfer operations in the respective stages of said transfer link.

17. A communication node in accordance with claim 16 wherein data and control information is organized into bytes, each data transfer between a subsystem and said controller being preceded by a pair of control bytes generated by said subsystem;

each of said port buffers further comprising:
latch means for temporarily storing said control bytes; and
means operative in conjunction with each data transfer for directing said control bytes into said latch means and for directing said data bytes into said port buffer memory through one of said switch means.

18. A communication node in accordance with claim 17 wherein said control bytes define at least the direction of the data transfer and the number count of data bytes to be transferred;

each of said port buffers further comprising:
means responsive to said defined direction of data transfer to determine the order in which said first and second switch means are enabled;
means operative during data transfers performed under port buffer control for counting the number of data bytes transferred;
means for comparing the count of transferred data bytes with said number count entered by said control bytes; and
means for terminating the transfer of data bytes when equality of the compared counts is reached.

19. A communication node in accordance with claim 18 wherein said control bytes further define a starting address;

said controller comprising:
means for generating clock pulses;
a controller memory;
said means timed by said controller including a controller address counter for sequentially addressing successive controller memory locations in clock pulse synchronism, said controller address counter being responsive to said control bytes to begin said sequential addressing at said starting address; and
means responsive to said defined direction of data transfer to write said data bytes into, or to read said data bytes out from, said addressed controller memory locations.

20. A communication node in accordance with claim 14 or 19 wherein said control bytes are loaded into each port buffer by control signals generated by the corresponding subsystem;

each of said port buffers comprising means responsive to said control signals and to said defined direction of data transfer to generate a transfer request;
said sequential polling means comprising a port address counter for generating signals adapted to address successive port buffers of said node;
means for initiating the requested data transfer if a transfer request generated by a port buffer is pending when said port buffer is addressed in sequence by said port address counter; and means for interrupting said sequential addressing of said port buffers for the duration of each data transfer;
whereby contention between competing port buffers for access to said common node bus is effectively prevented by said controller.

21. A communication node in accordance with claim 20 wherein at least one peripheral station external to said node is adapted to communicate through said node;
said node further comprising a port buffer coupled between said bus and said peripheral station; and
each of said port buffers including means for decoding the count of said port address counter, said port buffers being substantially identical to each other except for said decoding means.

22. In a communication node:
a common node bus;
a controller coupled to said bus;
a plurallity of port buffers each coupled to said bus and to an external circuit, each of said port buffers being adapted to establish a 2-stage bidirectional transfer link between its coupled external circuit and said controller wherein said port buffer is present in both stages to provide intermediate data storage and to translate between the protocol of said external circuit and the protocol of said node;
a first stage of each of said transfer links comprising means timed by said external circuit for providing bidirectional data transfers between said external circuit and its corresponding port buffer;
the second stage of each of said transfer links comprising means timed by said controller for providing bidirectional data transfers between said controller and said port buffer;
said controller comprising:
means for sequentially polling said port buffers including a port address counter for generating a count adapted to address successive port buffers of said node; and
means operative during each data transfer for holding said port address counter at the count of the addressed port buffer for the duration of said transfer;
whereby said controller periodically sets the conditions for successive port buffers to establish a transfer link.

23. Apparatus in accordance with claim 22 wherein said controller includes means for generating clock pulses;
said means timed by said controller including means for carrying out said data transfers in said second stage in clock pulse synchronism; and
means for carrying out said data transfers in said first stage asynchronously with respect to said clock pulses.

24. Apparatus in accordance with claim 23 wherein data and control information is organized into bytes, each data transfer through said transfer link being preceded by first and second control bytes provided by said external circuit and defining at least the direction of data transfer by means of a read/write bit and the number count of data bytes to be transferred;

each of said port buffers further comprising:
a port buffer memory adapted to provide said intermediate data storage;
an information bus coupled to the corresponding external circuit and adapted to pass said control and data bytes therethrough;
first and second latch means coupled to said information bus;

means responsive to first and second control signals generated by said external circuit for loading said control bytes into said first and second latch means respectively;

first switch means coupled between said port buffer memory and said information bus;

second switch means coupled between said port buffer memory and said controller;

a transfer byte counter coupled to said port buffer memory for addressing the latter and for counting data bytes transferred thereto;

a comparator coupled to said first latch means and to said transfer byte counter, said comparator being adapted to generate a byte count equal signal when the count of data bytes actually transferred equals said number count;

third latch means for generating a transfer request signal;

means responsive when said transfer request signal is high for providing a transfer signal when the address of said port buffer is next generated in sequence by said port address counter;

a ready circuit adapted to provide a ready signal indicative of the state of readiness of said transfer link to transfer data;

means for setting said ready circuit when said byte count equal signal and said transfer signal are both high;

said third latch means being adapted to provide said high transfer signal only when said ready signal is low;

means for enabling said second switch means when said transfer signal is high; and means responsive to a third control signal generated by said external circuit for enabling said first switch means when said transfer signal is concurrently low;

whereby said first and second switch means are enabled at mutually exclusive time intervals to stagger the transfer of data in said first and second stages.

25. Apparatus in accordance with claim 24 and further including means for terminating the transfer of data bytes, said last-recited means comprising:

means for resetting said ready circuit when said second control signal, said ready signal and a read/write signal responsive to said read/write bit are concurrently high, or when said byte count equal signal is high while said transfer signal and said read/write signal are concurrently low;

means for resetting said third latch means when said byte count equal signal and said tranfer signal are concurrently high; and means for resetting and for initializing said transfer byte counter when said byte count equal signal is high or when said second control signal and said ready signal are concurrently high.

26. Apparatus in accordance with claim 25, wherein said control bytes further define a starting address and wherein said controller further comprises:

a controller memory;

a controller address counter for sequentially addressing successive controller memory locations in clock pulse synchronism, said controller address counter being coupled to said first and second latch means and being responsive to the control byte information stored therein to begin said sequential addressing at said starting address; and means responsive when said transfer signal is high for writing data bytes into said addressed controller memory locations when said read/write signal concurrently assumes one of its two states, and for reading said data bytes out of said addressed memory locations when said read/write signal concurrently assumes the opposite state.

* * * * *